United States Patent
Takahashi et al.

(10) Patent No.: US 8,001,092 B2
(45) Date of Patent: Aug. 16, 2011

(54) APPARATUS AND METHOD FOR ANALYZING AND DISPLAYING INFORMATION

(75) Inventors: Masamichi Takahashi, Kanagawa (JP);
Nobuhiro Yamasaki, Kanagawa (JP);
Masakazu Fujimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 71 days.

(21) Appl. No.: 11/251,868

(22) Filed: Oct. 18, 2005

(65) Prior Publication Data

US 2006/0212490 A1    Sep. 21, 2006

(30) Foreign Application Priority Data

Mar. 15, 2005    (JP) ................. P2005-072371

(51) Int. Cl.
*G06F 7/00* (2006.01)
*G06F 17/00* (2006.01)

(52) U.S. Cl. ........................................ 707/688

(58) Field of Classification Search .............. 707/100, 707/999.1, 688; 709/223
See application file for complete search history.

(56) References Cited

U.S. PATENT DOCUMENTS

| | | | | |
|---|---|---|---|---|
| 6,018,619 | A * | 1/2000 | Allard et al. ............... | 709/224 |
| 6,137,782 | A * | 10/2000 | Sharon et al. ............... | 370/255 |
| 6,519,571 | B1 * | 2/2003 | Guheen et al. ............... | 705/14 |
| 6,687,750 | B1 * | 2/2004 | Messinger et al. ........... | 709/224 |
| 2003/0172143 | A1 * | 9/2003 | Wakayama ................. | 709/223 |
| 2003/0236894 | A1 * | 12/2003 | Herley ....................... | 709/229 |

FOREIGN PATENT DOCUMENTS

| | | |
|---|---|---|
| JP | 5 61984 A | 3/1993 |
| JP | 7-013754 A | 1/1995 |
| JP | 3088253 B2 | 7/2000 |
| JP | 2001-298435 A | 10/2001 |
| JP | 2002-15095 A | 1/2002 |
| JP | 2002-24283 A | 1/2002 |
| JP | 2002-290471 A | 10/2002 |
| JP | 2003 016465 A | 1/2003 |
| JP | 2003-085347 A | 3/2003 |
| JP | 2003-85570 A | 3/2003 |
| JP | 2003-524825 A | 8/2003 |
| JP | 2003-271659 A | 9/2003 |
| JP | 2003-281320 A | 10/2003 |
| JP | 3506922 B2 | 12/2003 |
| JP | 2004-171042 A | 6/2004 |
| JP | 2004-192399 A | 7/2004 |
| JP | 2004-240640 A | 8/2004 |
| JP | 2004 252946 A | 9/2004 |
| JP | 2004 252947 A | 9/2004 |

OTHER PUBLICATIONS

Japanese Office Action issued Aug. 24, 2010, in Application No. 2005-072371.

(Continued)

*Primary Examiner* — Mohammad Ali
*Assistant Examiner* — Alexey Shmatov
(74) *Attorney, Agent, or Firm* — Sughrue Mion, PLLC

(57) ABSTRACT

An apparatus for analyzing and displaying usage condition of information. The apparatus analyzes and displays the usage condition outside of an information distributing system by which the information is transmitted; and includes: a usage condition collecting unit that acquires a usage condition information as to the usage condition of the information outside of the information distributing system to be evaluated; and a usage condition displaying unit that displays the usage conditions based on the usage condition information.

29 Claims, 51 Drawing Sheets

OTHER PUBLICATIONS

Tomohiro Fukuhara, et al.; "Design and Effects of the Community Analysis Function in the Public Opinion Channel"; IEICE, Nov. 1, 2003; vol. J86-D-1 No. 11; pp. 838-847.; ISSN 0913-5685.

Masamichii Takahashi, et al.; "Measuring and Visualizing Organizational Awareness of Network Communities"; Transactions of Information Processing Society of Japan; Nov. 15, 1999; vol. 40 No. 11.; pp. 3988-3999.

* cited by examiner

FIG. 14B

| INDIVIDUAL ID (MEMBER ID) | NAME | MAIL ADDRESS | ORGANIZATION ID | KIND OF OCCUPATION | JOB CLASS | 401 |
|---|---|---|---|---|---|---|
| 1 | Hoge1 | Hoge1@abc.com | ORGANIZATION A | SALES | MANAGER | |
| 2 | Hoge2 | Hoge2@abc.com | ORGANIZATION B | SYSTEM ENGINEER | REGULAR | |
| 3 | Hoge3 | Hoge3@abc.com | ORGANIZATION C | DEVELOPMENT | DISPATCHED | |
| 4 | Hoge4 | ... | ORGANIZATION D | PLANNING | EXECUTIVE | |
| 5 | Hoge5 | ... | ORGANIZATION E | STAFF | REGULAR | |
| ... | ... | ... | ... | ... | ... | |

FIG. 14C

| ORGANIZATION ID | ORGANIZATION NAME | 402 |
|---|---|---|
| 1 | ORGANIZATION A | |
| 2 | ORGANIZATION B | |
| 3 | ORGANIZATION C | |
| 4 | ORGANIZATION D | |
| 5 | ORGANIZATION E | |
| 6 | ORGANIZATION F | |
| 7 | ORGANIZATION G | |
| ... | ... | |

| ORGANIZATION COMMUNICATION ID | INDIVIDUAL SENDER ID | INDIVIDUAL RECEIVER ID | COMMUNICATION TITLE | COMMUNICATION CONTENTS | DATE | HEADER |
|---|---|---|---|---|---|---|
| 1 | 1 | 2 | CASE A | GOOD WORK TODAY | 2004/7/3 10:15 | INFORMAL ORGANIZATION |
| 2 | 1 | 2 | CASE B | GOOD MORNING | 2004/7/3 11:15 | - |
| 3 | 1 | 3 | CASE OF X COMPANY | GOOD AFTERNOON | 2004/7/4 9:15 | INFORMAL ORGANIZATION |
| 4 | 1 | 4 | RELATED TO FAILURE OF FUNCTION K | EMERGENCY SITUATION | ... | INFORMAL ORGANIZATION |
| 5 | 2 | 1 | ... | ... | ... | - |
| 6 | 2 | 3 | ... | ... | ... | INFORMAL ORGANIZATION |
| 7 | 2 | 3 | ... | ... | ... | - |
| ... | ... | ... | ... | ... | ... | - |

FIG. 15A

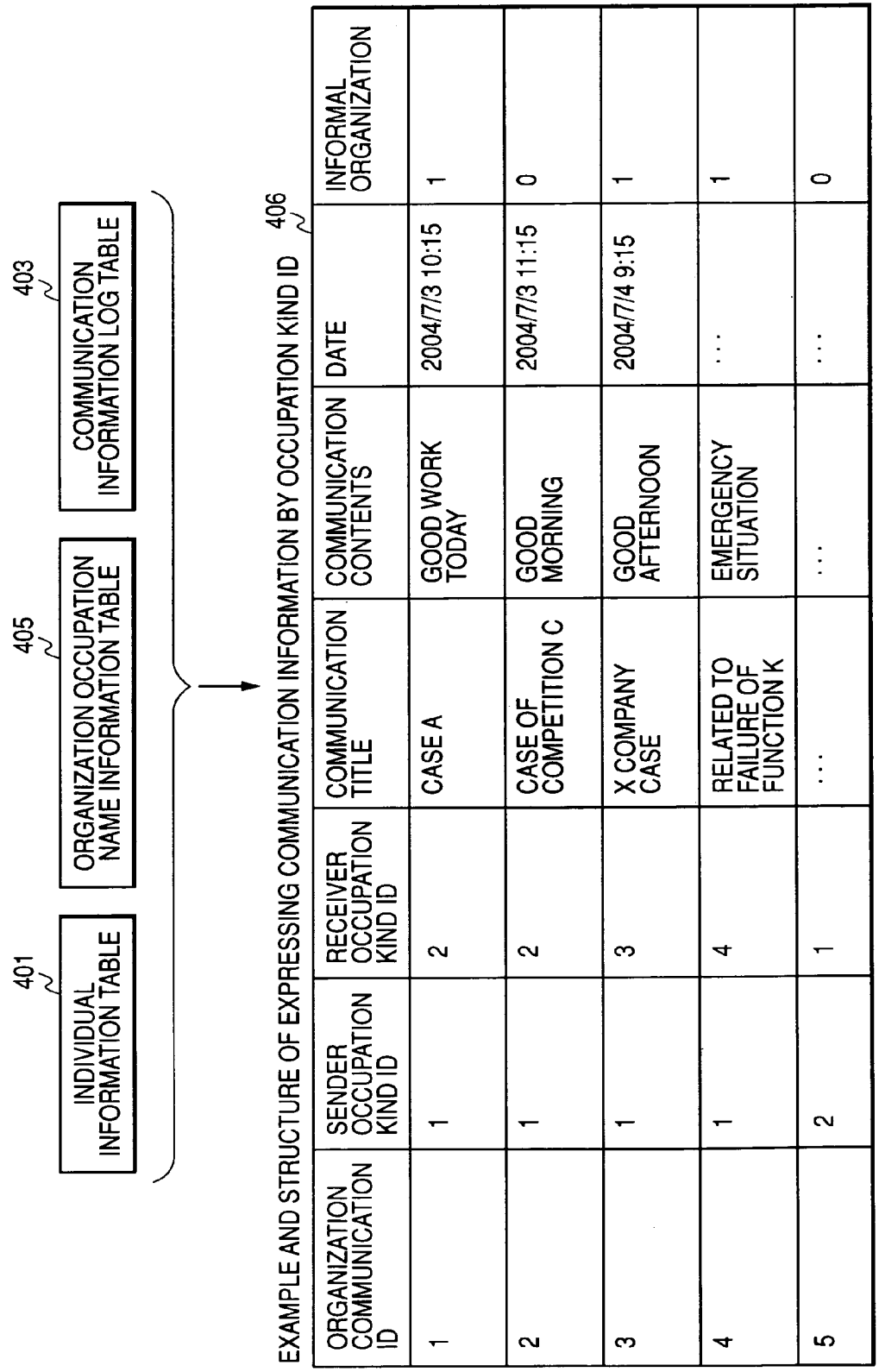

EXAMPLE AND STRUCTURE OF EXPRESSING COMMUNICATION INFORMATION BY OCCUPATION KIND ID

| ORGANIZATION COMMUNICATION ID | SENDER OCCUPATION KIND ID | RECEIVER OCCUPATION KIND ID | COMMUNICATION TITLE | COMMUNICATION CONTENTS | DATE | INFORMAL ORGANIZATION |
|---|---|---|---|---|---|---|
| 1 | 1 | 2 | CASE A | GOOD WORK TODAY | 2004/7/3 10:15 | 1 |
| 2 | 1 | 2 | CASE OF COMPETITION C | GOOD MORNING | 2004/7/3 11:15 | 0 |
| 3 | 1 | 3 | X COMPANY CASE | GOOD AFTERNOON | 2004/7/4 9:15 | 1 |
| 4 | 1 | 4 | RELATED TO FAILURE OF FUNCTION K | EMERGENCY SITUATION | ... | 1 |
| 5 | 2 | 1 | ... | ... | ... | 0 |

| OCCUPATION ID | OCCUPATION TYPE NAME |
|---|---|
| 1 | SALES |
| 2 | SYSTEM ENGINEER |
| 3 | DEVELOPMENT |
| 4 | PLANNING |
| 5 | STAFF |
| 6 | CUSTOMER ENGINEER |
| 7 | RESEARCH |
| ... | ... |

| ID | COMMUNICATION CONTENTS | |
|---|---|---|
| 1 | FUNCTION X | 407 |
| 2 | PRODUCT A | |
| 3 | COMPETITION C | |
| 4 | FUNCTION Z | |
| 5 | . . . | |
| . . . | . . . | |

| INFORMAL ORGANIZATION | COMMUNICATION CONTENTS | SENDER ID | RECEIVER ID | | CLASSIFICATION |
|---|---|---|---|---|---|
| FLAG 0 | INCLUDING INFORMATION BEING FLOWN IN 'INFORMAL ORGANIZATION' | MEMBER | MEMBER | | INDIVIDUAL COMMUNICATION |
| | | MEMBER | NOT MEMBER | | TRANSMISSION |
| | | NOT MEMBER | MEMBER | | – |
| | | NOT MEMBER | NOT MEMBER | | TRANSMISSION |
| | DOES NOT INCLUDE INFORMATION BEING FLOWN IN 'INFORMAL ORGANIZATION' | | | | EXCHANGING COMMUNICATION INFORMATION WHICH IS NOT RELATED TO 'INFORMAL ORGANIZATION' OUTSIDE OF THE INFORMAL ORGANIZATION |
| FLAG 1 | | | | | COMMUNICATING THE INFORMATION IN THE 'INFORMAL ORGANIZATION' |

FIG. 18A

| IS THE INFORMATION FLOWN FROM INFORMAL ORGANIZATION? | SENDER OCCUPATION TYPE ID | SENDER OCCUPATION TYPE | RECEIVER OCCUPATION TYPE ID | RECEIVER OCCUPATION TYPE | CLASSIFICATION OF FLOW (TRANSMISSION OR INDIVIDUAL COMMUNICATION) | INFLUENCE MEDIUM | INFLUENCE DEGREE |
|---|---|---|---|---|---|---|---|
| IN | 1 | SALES | 1 | SALES | TRANSMISSION | COMPETITION C | 3 |
| — | 1 | SALES | 2 | SE | TRANSMISSION | COMPETITION C | 5 |
| — | 1 | SALES | 1 | SALES | INDIVIDUAL COMMUNICATION | NUMBER OF LICENSE | 5 |
| IN | 1 | SALES | 3 | DEVELOPMENT | TRANSMISSION | FUNCTION X | 10 |
| — | 3 | DEVELOPMENT | 3 | DEVELOPMENT | INDIVIDUAL COMMUNICATION | FUNCTION X | 3 |
| IN | 5 | STAFF | 5 | STAFF | TRANSMISSION | FUNCTION Y | 1 |
| IN | 2 | SE | 6 | CE | TRANSMISSION | TROUBLE Z | 20 |
| — | 1 | SALES | 6 | CE | INDIVIDUAL COMMUNICATION | INSTALL | 12 |
| — | 6 | SALES | 7 | RESEARCH | INDIVIDUAL COMMUNICATION | ANALYSIS RESULT | 2 |
| IN | 8 | PLANNING | 8 | PLANNING | TRANSMISSION | CUSTOMER SATISFACTION LEVEL | 17 |
| — | 3 | DEVELOPMENT | 9 | PRODUCTION | INDIVIDUAL COMMUNICATION | NUMBER OF PRODUCTION | 20 |
| IN | 1 | SALES | 9 | PRODUCTION | TRANSMISSION | PARTS | 9 |
| — | 9 | PRODUCTION | 12 | SUPPLY | TRANSMISSION | PARTS | 3 |
| ⋮ | ⋮ | ⋮ | ⋮ | ⋮ | ⋮ | ⋮ | ⋮ |

| ANSWERER ID | OCCUPATION TYPE OF ANSWERER | CLASSIFICATION OF FLOW (UTILIZATION, TRANSMISSION, OR INDIVIDUAL COMMUNICATION) | OTHER PARTY ID | OCCUPATION TYPE OF OTHER PARTY | WHAT IS OBJECT? (INFLUENCE MEDIUM) | HOW FREQUENT? (FREQUENCY) | 'PRACTICE' USING INFORMATION | EFFECT (FOR EXAMPLE, PRICE: 10000 YEN PER UNIT) | OBJECT DRIVING EFFECT (INDIVIDUAL, ORGANIZATION: ID) |
|---|---|---|---|---|---|---|---|---|---|
| 1 | SALES | UTILIZATION | - | - | COMPETITION C | 3 | POINT OUT COMPARISON WITH COMPETITOR TO CLIENT → CONTRACT SIGNED | 200 | 12 |
| 2 | SALES | TRANSMISSION | 2 | SE | COMPETITION C | 5 | MAKE A SYSTEM FOR COMPLIMENTING FUNCTION INFERIOR TO FUNCTION OF COMPETITOR'S SYSTEM | 10 | 3 |
| 3 | SALES | INDIVIDUAL COMMUNICATION | 1 | SALES | NUMBER OF LICENSE | 5 | GIVE RELIEF TO CUSTOMER → CONTRACT SIGNED | 2000 | 4 |
| 4 | SALES | UTILIZATION | - | - | FUNCTION X | 10 | PROPOSE SOLUTION USING FUNCTION X → CONTRACT SIGNED | 30000 | 1 |
| 5 | DEVELOPMENT | INDIVIDUAL COMMUNICATION | 3 | DEVELOPMENT | FUNCTION X | 3 | REPORT BUG OF FUNCTION X | 0 | 5 |
| 6 | STAFF | TRANSMISSION | 5 | STAFF | FUNCTION Y | 1 | DISCUSS POSSIBILITY OF NEW FUNCTION Y | 20 | 9 |
| 7 | SE | UTILIZATION | - | - | TROUBLE Z | 20 | DEAL WITH TROUBLE Z | 5000 | 3 |
| 8 | SALES | INDIVIDUAL COMMUNICATION | 6 | CE | INSTALL | 12 | INQUIRE TIME REQUESTED TO INSTALL | 0 | 6 |
| 9 | SALES | INDIVIDUAL COMMUNICATION | 7 | RESEARCH | ANALYSIS RESULT | 2 | PLAN PRE-MARKETING BASED ON THE ANALYSIS RESULT | 0 | 10 |
| 10 | PLANNING | UTILIZATION | - | - | CLIENT SATISFACTION LEVEL | 17 | UNDERSTAND CUSTOMER SATISFACTORY LEVEL | 10000 | 12 |
| 11 | DEVELOPMENT | INDIVIDUAL COMMUNICATION | 9 | PRODUCTION | NUMBER OF PRODUCTION | 20 | CHECK PLAN OF PRODUCTION | 2000 | 23 |
| 12 | SALES | TRANSMISSION | 9 | PRODUCTION | PARTS | 9 | UNDERSTAND STATE OF PRODUCTION | 0 | 12 |
| 13 | PRODUCTION | TRANSMISSION | 12 | SUPPLY | PARTS | 3 | UNDERSTAND STATE OF SUPPLY | 300 | 10 |
| ... | ... | ... | ... | ... | ... | ... | ... | ... | ... |

412

| ACTIVITY ID | ACTIVITY NAME | RELATED INDIVIDUAL ID | RELATED ACTIVITY ID |
|---|---|---|---|
| 1 | ACTIVITY A | 1, 5, 7, ··· | 2, 5 |
| 2 | ACTIVITY B | 2, 4, ··· | 3 |
| 3 | ACTIVITY C | 3, 5, ··· | 4 |
| 4 | ACTIVITY D | 6, ··· | 1, 5 |
| 5 | ACTIVITY E | 9, 11, ··· | 1, 2, 4, 6 |
| 6 | ··· | ··· | ··· |
| 7 | ··· | ··· | ··· |
| ··· | ··· | ··· | ··· |

| ORGANIZATION NAME | ORGANIZATION ID | NUMBER OF MOTHER ORGANIZATION | RELATED ORGANIZATION ID | NUMBER OF MEMBER | RELATED INDIVIDUAL ID |
|---|---|---|---|---|---|
| MANAGEMENT MEETING | 1 | 0 | | 5 | 1, 2, 3, 4, 5 |
| ADMINISTRATIVE DEPARTMENT | 2 | 1 | 1 | 8 | 6, 7, 8, 9, 10, 11, ··· |
| HUMAN RESOURCES DEPARTMENT | 3 | 1 | 2 | 6 | 14, ···, ···, |
| SALES BUSINESS DEPARTMENT | 4 | 1 | 1 | 4 | 20, ···, ···, |
| THE FIRST BRANCH OFFICE | 5 | 1 | 4 | 12 | 24, ···, ···, |
| THE SECOND BRANCH OFFICE | 6 | 1 | 4 | 11 | 36, ···, ···, |
| ACCOUNTING DEPARTMENT | 7 | 1 | 2 | 3 | 47, ···, ···, |
| DEVELOPING DEPARTMENT | 8 | 1 | 1 | 7 | 50, ···, ···, |

FIG. 28A

| PROJECT ID | PROJECT NAME | RELATED ACTIVITY ID | ORGANIZATION ID ACCORDING TO RELATED FUNCTION | RELATED INDIVIDUAL ID | OBJECT OF PROJECT |
|---|---|---|---|---|---|
| 1 | PROJECT X | A1, B1, C1, D1 | 1, 2, 3, 4 | 1, 5, 7, ... | PRODUCT X |
| 2 | PROJECT Y | A2, B2, C2, D2 | 1, 2, 3, 4 | 2, 4, ... | PRODUCT Y |
| 3 | PROJECT Z | A3, B3, D3 | 1, 2, 4 | 3, 5, ... | SERVICE Z |
| 4 | PROJECT ε | B4, C4, D4 | 2, 3, 4 | 6, ... | PRODUCT ε |
| ... | ... | ... | ... | ... | |

| ACTIVITY ID | ACTIVITY NAME | RELATED INDIVIDUAL ID | RELATED ACTIVITY ID |
|---|---|---|---|
| 1 | ACTIVITY A | 1, 5, 7, ··· | 2, 5 |
| 2 | ACTIVITY B | 2, 4, ··· | 3 |
| 3 | ACTIVITY C | 3, 5, ··· | 4 |
| 4 | ACTIVITY D | 6, ··· | 1, 5 |
| 5 | ACTIVITY E | 9, 11, ··· | 1, 2, 4, 6 |
| 6 | ... | ... | ... |
| 7 | ... | ... | ... |
| ... | ... | ... | ... |

FIG. 36

| SENDER ACTIVITY ID \ RECEIVER ACTIVITY ID | 1 | 2 | 3 | 4 | 5 | ... |
|---|---|---|---|---|---|---|
| 1 | – | PLAN | – | – | TROUBLE INFORMATION | – |
| 2 | – | – | DEMAND | – | – | ... |
| 3 | – | – | – | DESIGN | – | ... |
| 4 | (REQUEST FOR DEALING WITH FAILURE) | – | – | – | – | ... |
| 5 | MARKET INFORMATION | COMPETITION INFORMATION | VENDER INFORMATION | DESIGN CHANGE | – | ... |
| ... | ... | ... | ... | ... | ... | – |

| ACTIVITY ID | ACTIVITY NAME | RELATED INDIVIDUAL ID | RELATED ACTIVITY ID |
|---|---|---|---|
| 1 | ACTIVITY A | 1, 5, 7, ··· | 2, 5 |
| 2 | ACTIVITY B | 2, 4, ··· | 3 |
| 3 | ACTIVITY C | 3, 5, ··· | 4 |
| 4 | ACTIVITY D | 6, ··· | 1, 5 |
| 5 | ACTIVITY E | 9, 11, ··· | 1, 2, 4 |
| 6 | ··· | ··· | ··· |
| 7 | ··· | ··· | ··· |
| ··· | ··· | ··· | ··· |

| INFORMAL ORGANIZATION | COMMUNICATION CONTENTS | RELATION BETWEEN SENDER ACTIVITY ID AND RECEIVER ACTIVITY ID | CLASSIFICATION |
|---|---|---|---|
| FLAG 0 | INCLUDING INFORMATION IN 'FLOW OF INFORMATION OUTSIDE OF THE INFORMAL ORGANIZATION' | THE RELATION BETWEEN SENDER ACTIVITY ID AND RECEIVER ACTIVITY ID IS FORMAL (MATCH WITH RELATED ACTIVITY ID) | A. 'FLOW OF INFORMATION OUTSIDE OF THE INFORMAL ORGANIZATION' ON THE 'FORMAL ORGANIZATION STRUCTURE' |
| | | THE RELATION BETWEEN SENDER ACTIVITY ID AND RECEIVER ACTIVITY ID IS NOT FORMAL (NOT MATCH WITH RELATED ACTIVITY ID) | B. INFORMATION OF CORRESPONDING 'INFORMAL ORGANIZATION' IN FLOW OF INFORMATION OUTSIDE OF THE INFORMAL ORGANIZATION' (CORRESPONDING TO INFORMATION FOCUSED ON POINT 1) |
| | NOT INCLUDING INFORMATION IN 'FLOW OF INFORMATION OUTSIDE OF THE INFORMAL ORGANIZATION' | THE RELATION BETWEEN SENDER ACTIVITY ID AND RECEIVER ACTIVITY ID IS FORMAL (MATCH WITH RELATED ACTIVITY ID) | C. 'FLOW OF INFORMATION ON THE FORMAL ORGANIZATION STRUCTURE' IN THE 'FORMAL ORGANIZATION STRUCTURE' |
| | | THE RELATION BETWEEN SENDER ACTIVITY ID AND RECEIVER ACTIVITY ID IS NOT FORMAL (NOT MATCH WITH RELATED ACTIVITY ID) | D. FLOW OF INFORMATION WHICH IS NOT RELATED TO THE 'FORMAL ORGANIZATION STRUCTURE' OR THE 'INFORMAL ORGANIZATION' |
| FLAG 1 | | | E. INFORMATION COMMUNICATION IN THE 'INFORMAL ORGANIZATION' |

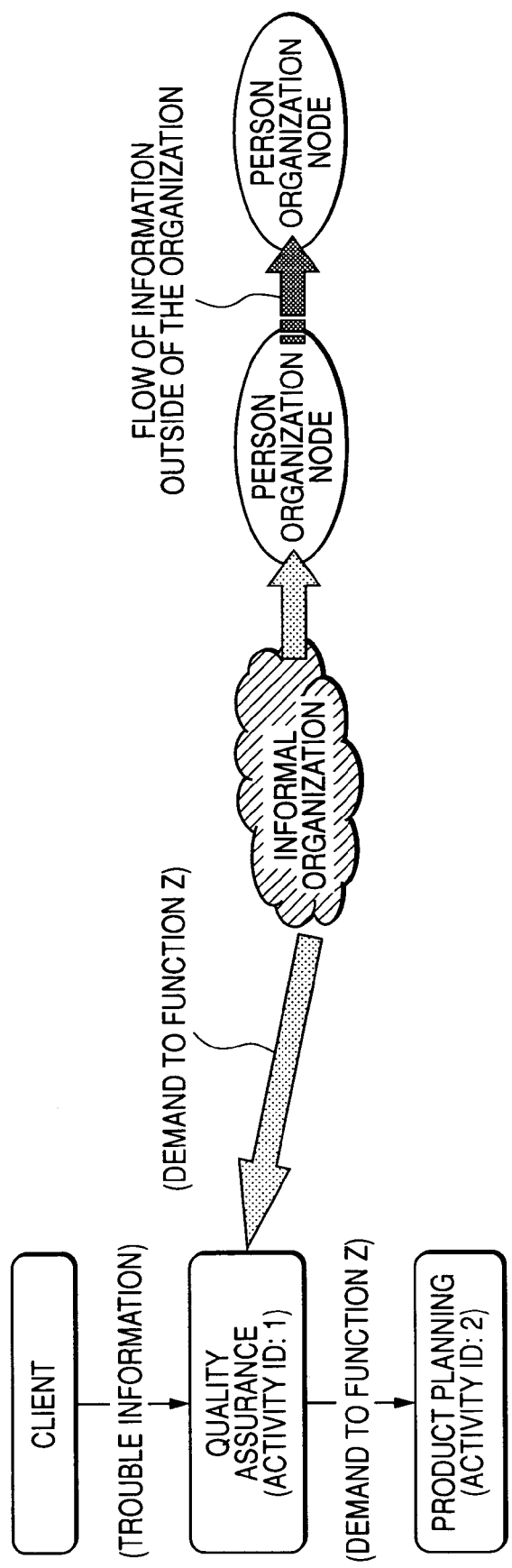

| THE INFORMATION IS FLOWN FROM THE INFORMAL ORGANIZATION? | SENDER ACTIVITY ID | RECEIVER ACTIVITY ID | THROUGH WHAT? (INFLUENCE MEDIUM) | HOW MUCH? (INFLUENCE DEGREE) |
|---|---|---|---|---|
| 1 | - | 1 | DEMAND TO FUNCTION Z | 30 |
| 1 | - | 1 | TRICK OF FUNCTION X | 15 |
| 1 | - | 2 | DEMAND TO FUNCTION Y | 23 |
| 1 | - | 3 | TRICK OF FUNCTION Y | 72 |
| - | 1 | 2 | DEMAND TO FUNCTION Z | 10 |
| - | 1 | 2 | TRICK OF FUNCTION X | 7 |
| - | 1 | 3 | TROUBLE INFORMATION | 15 |
| - | 2 | 2 | DEMAND TO FUNCTION Y | 21 |
| - | 2 | 2 | TRICK OF FUNCTION Y | 5 |
| - | 2 | 1 | PLANNING NEXT PRODUCT | 2 |
| - | 2 | 1 | PLANNING NEW FUNCTION | 3 |
| ... | ... | ... | ... | ... |

| THE INFORMATION IS FLOWN FROM THE INFORMAL ORGANIZATION? | SENDER ACTIVITY ID | RECEIVER ACTIVITY ID | THROUGH WHAT? (INFLUENCE MEDIUM) | HOW MUCH? (INFLUENCE DEGREE) | PRACTICE (ACTIVITY) USING INFORMATION |
|---|---|---|---|---|---|
| 1 | - | 1 | DEMAND TO FUNCTION Z | 30 | LEARN HOW TO USE WHICH IS NOT ASSUMED IN FUNCTION Z |
| 1 | - | 1 | TRICK OF FUNCTION X | 15 | LEARN HOW TO USE WHICH IS NOT ASSUMED IN FUNCTION X |
| 1 | - | 2 | DEMAND TO FUNCTION Y | 23 | REFER TO CLIENT NEEDS → IDEA OF NEXT PRODUCT AND FUNCTION |
| 1 | - | 3 | TRICK OF FUNCTION Y | 72 | OBSERVE HOW THE DEVELOPED PRODUCT IS USED → REFLECTING TO THE PRODUCT |
| - | 1 | 2 | DEMAND TO FUNCTION Z | 10 | TRANSFER TO PRODUCT PLANNING DEPARTMENT |
| - | 1 | 2 | TRICK OF FUNCTION X | 7 | TRANSFER TO PRODUCT PLANNING DEPARTMENT |
| - | 1 | 3 | TROUBLE INFORMATION | 15 | TRANSFER TO DEVELOPING DEPARTMENT |
| - | 2 | 2 | DEMAND TO FUNCTION Y | 21 | CONFERENCE FOR NEXT PRODUCT PLANNING |
| - | 2 | 2 | TRICK OF FUNCTION Y | 5 | CONFERENCE FOR NEW FUNCTION PLANNING |
| - | 2 | 1 | PLANNING NEXT PRODUCT | 2 | TRANSFER TO DEVELOPING DEPARTMENT |
| - | 2 | 1 | PLANNING NEW FUNCTION | 3 | TRANSFER TO DEVELOPING DEPARTMENT |
| ... | ... | ... | ... | ... | ... |

APPARATUS AND METHOD FOR ANALYZING AND DISPLAYING INFORMATION

BACKGROUND OF THE INVENTION

1. Field of the Invention

The present invention relates to a technique for analyzing and displaying usage conditions of information derived to an information distributing system, such as electronic bulletin board systems or mailing lists, in an organization such as an enterprise, and particularly, to the technique which is suitable to analyze and display the usage conditions of the information outside the information distributing system assumed that users voluntarily participate in the system.

2. Background Art

At first, the terminology used in the present invention will be defined referring to FIG. 1.

FIG. 1 shows an organization chart of a human organization A as see from a traversing organization which is not prescribed in an organizational chart. The human organization A, as shown in right side of FIG. 1, has hierarchical architecture and members are included in corresponding organization nodes or terminal organization nodes, respectively.

The structure prescribed in advance such as an information flow chart, a process chart, an organizational chart, a location chart (physical arrangement), and a matrix organizational is referred to as 'a formal organization structure' (denoted by reference numeral 1 in FIG. 1). The flow of the information in the above structure is referred to as 'flow of information on formal organization structure' (denoted by reference numeral 2 in FIG. 1). In addition, 'formal organization structure' may be regarded as an organization expression describing contents of the organization from a specific viewpoint. Typically, the organization expression is one of the information flow chart, the process chart, organization chart, the location chart, or the matrix organization.

In the business organization, the structure, which is not prescribed in advance, such as a community or an organization with voluntary participation is referred to as 'informal organization' (denoted by reference numeral 3 in FIG. 1). The flow of the information in the informal organization is referred to as 'flow of the information in the informal organization' (denoted by reference numeral 4 in FIG. 1). The flow of the information outside of the informal organization is referred to as 'flow of the information outside of the informal organization' (denoted by reference numeral 5 in FIG. 1). The concept of 'the flow of the information outside of the informal organization' is used limitedly in the information of 'the informal organization'.

An information distributing system such as the electronic bulletin board or mailing list corresponds to 'the informal organization' under the condition of the voluntary participation. The information distributing system may be anything so long as the boundary is specified at a predetermined point of time. An extent of the information (message or electronic message) may be specified by a header, a title, or a mail account which is included in the information. Also, a group of contributors or a group of contributors in a predetermined period may be understood as an area of the information distribution system.

In recent years, there has been paid attention to the existence and effect of the flow of the information generated from 'the informal organization', other than the flow of the information on the formal organization structure prescribed by the organization of the corresponding business enterprise in advanced. Since the communication in the business enterprise is supported by IT (Information Technology), it is possible to understand and objectively analyze the communication from log of electronic messages like E-mails.

However, according to the related art, since the only 'flow of the information on the informal organization' is recognized using the feature that 'the flow of the information on the informal organization' is accumulated as the log, the activity of the informal organization can be known. An entire image visualizing what result is derived from the flow of the information in the informal organization can not be acquired because anything other than 'the flow of the information in the informal organization' is not recorded as the log. There is a technique that simply visualizes the flow of the information on a network diagram of the human or the organization. But, it is difficult to understand overall flow of the information when the network diagram is getting complicated according to an increase of the nodes since the flow of the information is not classified. Further, it is not possible to recognize at a glance what effect is derived by 'the flow of the information on the informal organization' since the effect of the flow of the information can not be described.

It is desired to be understood the structure, frequency, and the effect of 'the flow of the information outside the informal organization' by classifying 'the flow of the information outside the informal organization' such as 'utilization', 'distribution', and 'individual communication' and visualizing the effect according to the result of the classification.

As relationship between the classification and the effect of 'the flow of the information outside the informal organization', it is understood, for example, that the 'utilization' contributes to increase influence of the information, the 'distribution' contributes to increase the range of the information, and the 'individual communication' contributes to improve the quality of the information. If 'the flow of the information outside the informal organization' is classified and displayed, people can understand which information acquires great majority, and also understand the amount of the effect according to the frequency by the classification.

In recent years, 'the flow of the information on the formal organization' previously determined on the business organization can be managed by an information system such as an eCRM (electronic Customer Relationship Management) or an SFA (Sales Force Automation). For example, an organizational chart or the information flowchart is determined in most of the organizations. Accordingly, it is possible to understand whether the information between the organizations or processes (activities) is formally exchanged by supporting by the information system.

On the contrary, research on the communication in the business organization indicates that there exists the flow of the information according to association between persons who are not authorized in advance on the organization ('flow of the information on the informal organization' and 'the flow of the information outside of the informal organization') and such flows of the information are indispensable to perform the operation smoothly.

The technique according to the related art specifies and visualizes only the flow of the information on the formal organization but it does not specify the influence of 'the flow of the information outside of the informal organization' on the 'formal organization structure'. Accordingly, it is impossible to reasonably evaluate 'the informal organization' in the business organization and manage 'the informal organization' as management resources.

Consequently, it is desired to specify and visualize the relation which part (component) of the 'formal organization' refers to 'the informal organization' through 'the flow of the information outside of the informal organization', by matching 'the flow of the information on the formal organization' and 'the flow of the information on the informal organization'. It explains how 'the information on the informal organization' influences 'the formal organization structure'. And it is possible to consider that 'the information of the informal organization' should be inserted to the formal organization structure and to determine the function thereof. Accordingly, the informal organization can be treated as the management resource.

SUMMARY OF THE INVENTION

The present invention considers the following. For example, focused on 'a flow of information outside an informal organization' on 'an informal organization', it is an object of the present invention to understand the structure, frequency, and effect of 'the flow of information outside of an informal organization' by classifying 'the flow of information outside of an informal organization' into 'utilization', 'transmission', and 'individual communication' and visualizing the effect according to the classification.

More specifically, it is another object of the present invention to specify and show which part (component member) of the formal organization refers the informal organization through 'the flow of information outside of the informal organization' on 'the informal organization' by matching 'the flow of the information on the formal organization structure' of 'the formal organization structure' and 'the flow of information on the informal organization' of 'the informal organization'.

The invention provides an apparatus for analyzing and displaying usage condition of information, wherein the apparatus analyzes and displays the usage condition outside of an information distributing system by which the information transmitted, including: a usage condition collecting unit that acquires a usage condition information as to the usage condition of the information outside of the information distributing system to be evaluated; and a usage condition displaying unit that displays the usage conditions based on the usage condition information.

The invention may provide an apparatus for analyzing and displaying information including: an information distributing unit configured to distribute information including first type information and second type information that corresponds to the first type information; an information distribution detecting unit configured to detect a transmission of the second type information via the information distributing system when the first type information is transmitted via the information distributing system; and a displaying unit configured to display the transmission of the second type information via the information distributing system based on detected result of the information distribution detecting unit.

The invention may provide a method for analyzing and displaying usage condition of information, wherein the method analyzes and displays the usage condition outside of an information distributing system by which the information is transmitted, the method including: acquiring a usage condition information as to the usage condition of the information outside of the information distributing system to be evaluated; and displaying the usage conditions based on the usage condition information.

The invention may provide a program product for enabling a computer to analyze and display a usage condition of information outside of an information distributing system by which the information is transmitted, including: software instructions for enabling the computer to perform predetermined instructions; and a computer readable medium bearing the software instructions; wherein the predetermined instructions includes: acquiring a usage condition information as to the usage condition of the information outside of the information distributing system to be evaluated; and displaying the usage conditions based on the usage condition information.

BRIEF DESCRIPTION OF THE DRAWINGS

The present invention may be more readily described with reference to the accompanying drawings:

FIG. 14B is a view illustrating a structure and an embodiment of an individual information table;

FIG. 14C is a view illustrating a structure and an embodiment of an organization name information table;

FIG. 14D is a view illustrating a structure and an embodiment of a communication information log table;

FIG. 15A is a view illustrating an embodiment for analyzing communication information according to a unit from log information by occupation;

FIG. 16B is a view illustrating an embodiment of a list of information which flows in an informal organization;

FIG. 17A is a view illustrating criteria for classification of communication information according to a unit;

FIG. 18A is a view illustrating an embodiment of communication information according to a unit after adding classification result;

FIG. 20 is a view illustrating an embodiment of questionnaire result table for visualizing 'flow of information outside of informal organization';

FIG. 27A is a view illustrating an embodiment of an organization information table to write an organizational chart;

FIG. 28A is a view illustrating an embodiment of an organization information table to write a matrix type organization;

FIG. 35 is a view illustrating an embodiment of information being flown a 'formal organization structure' using well-known knowledge and illustrating an organization information table as the well-known knowledge;

FIG. 36 is a view illustrating an embodiment of information being flown a 'formal organization structure' using well-known knowledge and illustrating a table for information being flown the 'formal organization structure';

FIG. 37B is a view illustrating an embodiment of organization information table (process);

FIG. 39A is a view illustrating classification criteria of FIG. 38;

FIG. 39B is a view illustrating classification result according to classification criteria of FIG. 38;

FIG. 40A is a view illustrating an embodiment of information indicating finish of classification among process activities;

FIG. 41A is a view illustrating an embodiment of writing information indicating finish of classification among process activities with 'practice' acquired from result of a questionnaire;

DETAILED DESCRIPTION OF THE PREFERRED EMBODIMENTS

Figure 1:
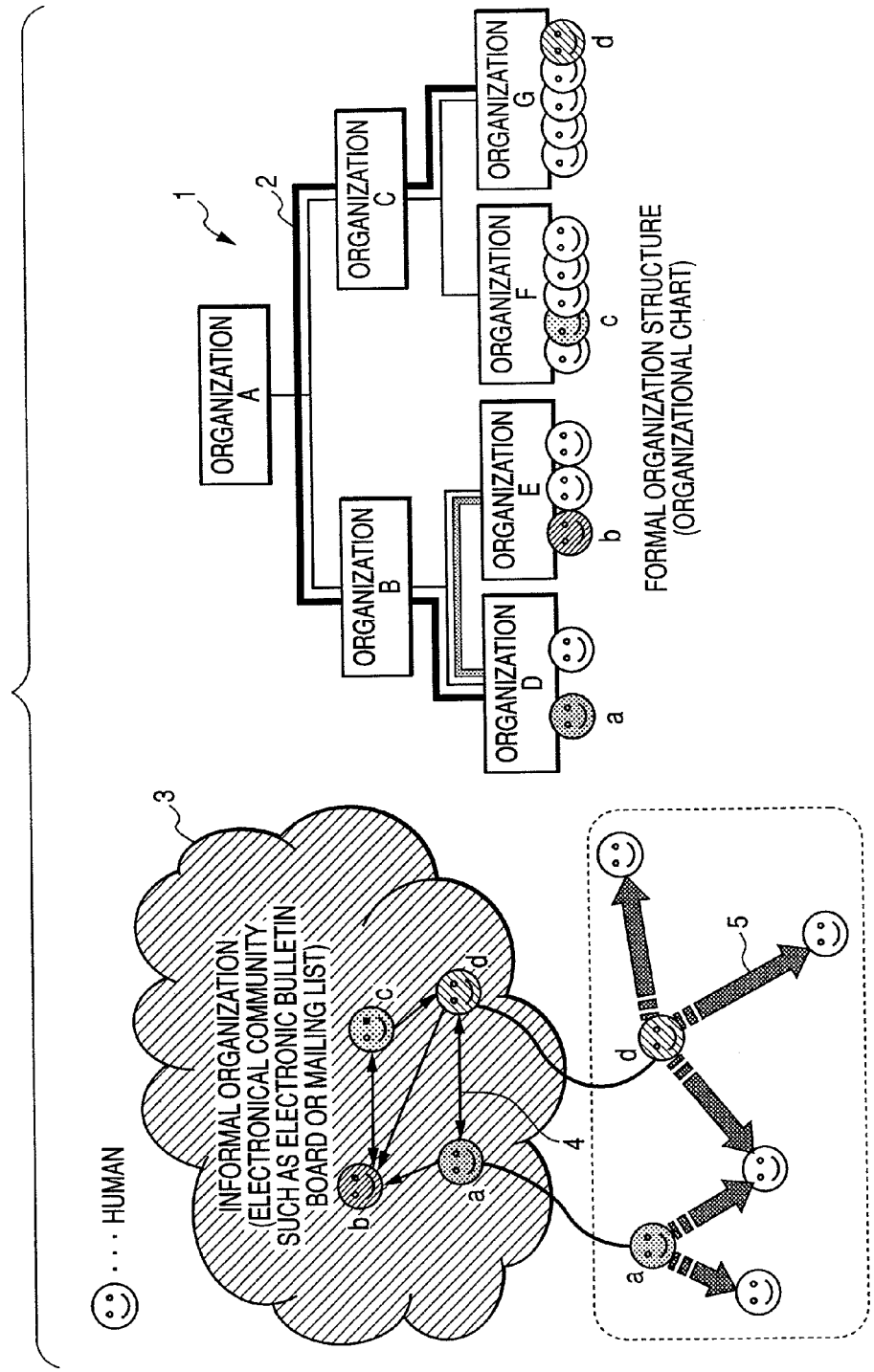
FIG. 1 is a view illustrating an 'informal organization', 'formal organization structure' and flow of information related to above organizations according to the present invention.

The present invention is explained as following.
[General Structural Example]
The overview of the present invention is explained according to a general structural example.

According to the general structural example of the present invention, 'the flow of the information on the formal organization structure', 'the flow of the information on the informal organization' and 'the flow of the information outside of the informal organization' are specified and extracted from an organization such as a business organization. At first, 'the flow of the information outside of the informal organization' is classified and displayed. Next, it is analyzed and displayed how the information in 'the flow of the information on the informal organization' affects 'formal organization structure' through 'the flow of the information outside of the informal organization'.

The 'flow of the information outside of the informal organization' is classified And visualized as follows.

The 'informal organization' is expressed by a cloud node (abbreviated to as IN node. Informal Network). An attribute related to a person such as an occupation (sales, development, SE, staff) and a job-rank of the organization (regular employee, manager, etc.) and an organization name are expressed by a circle node (person organization node). The person or the organization related (accessing) to the information of 'the informal organization' is specified by analyzing logs or questionnaires. The IN node and the person organization node are connected by a line (like an arrow). 'The flow of the information outside of the informal organization' is classified based on the flow outside of 'the informal organization' through the related (accessing) person and organization.

Hereinafter, specification and classification of 'the flow of the information outside of the informal organization' are explained below with two methods.

The 'flow of the information outside of the informal organization' is classified into 'transmission' and 'individual communication' by analyzing the log.

'The flow of the information outside of the informal organization' is classified into 'transmission', 'individual communication' and 'utilization' by analyzing the questionnaires.

'Utilization', which is one of 'the flow of the information outside the informal organization' and is not classified by log analysis, is specified by combining the questionnaires.

The classification is one form of the embodiment according to the present invention. The classification can be broken up or put together according to definition of the classification. For example, the transmission and the individual communication can be classified as same transmission, or the utilization can be classified more detailed such as utilization without modification, utilization after checking reliability, utilization after edition, utilization by excerpting some parts, storing into trouble database, adding to proposal for customer, and writing into development requesting sheet.

The classified 'flow of the information outside of the informal organization' is represented by an arrow corresponding to the classification of the flow.

According to analysis of the questionnaire, an activity generated by 'the flow of the information outside of the informal organization' can be specified as 'practice'. The 'practice' can be displayed beside of the arrow which visualizes 'the flow of the information outside of the informal organization'.

The relationship between 'the flow of the information outside of the informal organization' and the 'formal organization structure' is analyzed and displayed as follows.

The 'formal organization structure' is displayed by the information flow chart, process, organizational chart, location (physical arrangement), and matrix type organization. Each 'formal organization structure' consists of multiple component materials. For example, the information flow chart or the organizational chart includes a person or an organization as a component material for information flow. In a process, each activity is the component material.

The information in 'the flow of the information on the formal organization structure' of 'the formal organization structure' is specified.

In the case that the exchange of information in the 'formal organization structure' is supported by an electronic system, the information (data) which flows on the corresponding electronic system, is monitored and recorded as a log to show what data flows to which component material of the 'formal organization structure'.

In the case that the exchange of information in the 'formal organization structure' is not supported by an electronic system, the information which is flown or information which is expected to be flown (well-known information related to information flow associated with design for the organizational chart or business process chart: ISO9000 series information) is used as a substitution for the log.

A component material of 'the informal organization structure' in which 'the information of the informal organization' flows is determined.

It is determined if the information of the informal organization flows on the 'formal organization structure' by matching the information which flows in 'the informal organization' with 'the flow of the information on the formal organization structure'.

In the case that the information of the informal organization flows on the 'formal organization structure', a component material in which the information of the informal organization flows on the 'formal organization structure', is specified.

The person organization nodes are connected to the component materials of the 'formal organization structure' by lines through the informal organization based on the fact that 'the information of the informal organization' flows on the component materials of the 'formal organization structure'.

As described above, a practice (practical activity) generated by a component material of the formal organization structure in which information flowing in 'the flow of the information on the informal organization' is specified by analyzing the questionnaire. The practice (practical activity) and the effect of it can be written together with the person organization nodes connected to the component materials of the 'formal organization structure'.

'The informal organization' and 'the formal organization structure' can be analyzed or displayed in plural.

The case that one 'informal organization' influences to a plurality of 'formal organization structures', or a plurality of 'informal organizations' influence to one 'formal organization structure' can be analyzed or displayed. Of course, a plurality of 'informal organizations' influence to a plurality of 'formal organization structures' also can be analyzed or displayed.

[Complementary Explanation of the Invention]

In addition, the present invention is explained in more details.

According to an aspect of the present invention, an apparatus for analyzing and displaying information usage conditions, which analyzes and displays the information usage conditions outside of an information distributing system of the information transmitted by the information distributing system, comprises: a usage conditions collecting unit for acquiring the information usage conditions, which shows the usage conditions of the information transmitted by the information distributing system outside of the information distributing system to be evaluated; and a usage condition displaying unit for displaying the usage conditions based on the usage condition information acquired by the usage conditions collecting unit.

The apparatus for analyzing and displaying the information usage conditions assumes an information distributing unit such as a mail server (SMTP server, POP server, and so on) and HTTP server. According to the information distributing unit, the information distributing system is constructed.

The information distributing system is an information exchange unit such as virtual information exchange community or space like electronic bulletin board system or a mailing list. The information distributing system can be anything so long as the boundary can be specified. The device for analyzing and displaying the information is generally realized as an application on a predetermined server or displays the usage conditions on the web-based system. If an environment capable of acquiring the information usage condition is provided, it may be implemented as an application on the client device. The device for analyzing and displaying the information usage conditions may be compositively formed by a plurality of computers.

The information distributing system to be evaluated is generally informal because it assumes voluntary participation. However, in a business organization, a formal electronic bulletin board system or mailing list exists. Accordingly, it can be the evaluating object. In addition, though 'the informal organization' means the human organization assumed of voluntary participation, from another viewpoint, it is understood as an organization which is not prescribed in an organizational chart defining contents of the human organization.

In this constitution, the information distributing system to be evaluated can be exactly evaluated by checking how the information of 'the informal organization' is used outside of the information distributing system.

The information distributing system to be evaluated may be one that can browse posted information, and may be an electronic bullet in board system or a mailing list system. The evaluating object unit of the information distributing system may be one electronic bulletin board system or one mailing list system, or may be a thread of the system or a subject in the mailing list.

The usage condition displaying unit displays categorized usage condition like (a) individual communication to a transmitting source of the corresponding information, which transmits the information using the corresponding information distributing system at outside of the information distributing system to be evaluated, (b) transmission of information to except for the transmitting source which transmits the corresponding information using the corresponding information distributing system at outside of the information distributing system to be evaluated, and (c) utilization of the corresponding information by the receiver who received the corresponding information using the information distributing system.

The usage conditions may be one of the (a) individual communications, (b) information transmission besides to the transmitting source, or the (c) utilization by the transmitting destination of the corresponding information.

The usage condition displaying unit may display nodes, respectively, for the information distributing system to be evaluated, the transmitting source transmitting the information using the information distributing system to be evaluated, and an individual communicating unit, which individually communicates to the corresponding transmitting source after receiving the information using the information distributing system, so as to display the individual communication as the usage conditions by drawing the arc from a node of the individual communicating unit to a node of the corresponding transmitting source. The node may be formed of any shapes. A plurality of shapes may be used in order to distinguish the type of nodes.

The usage condition displaying unit may display the nodes, respectively, for the information distributing system to be evaluated, a transmitting source for receiving information using the information distributing system to be evaluated and transmitting the information to other transmitting destination, which is different from the corresponding transmitting source at outside of the corresponding information distributing system, and other transmitting destination which is different from the transmitting source of the corresponding information, and displays the distribution of the information corresponding to the corresponding information except for the transmitting source of the corresponding unit at outside of the information distributing system by drawing arc from the transmitting source node of corresponding node to the transmitting destination node of the corresponding information.

The usage condition displaying unit displays the information distributing system to be evaluated and the transmitting destination receiving and applying the information using the information distributing system as nodes so as to display the information usage conditions with the arc drawn from the corresponding transmitting destination to the starting point.

Conventionally, the arc is an arrow. The usage condition acquiring unit may calculate and display frequencies of usage in attributes of the corresponding arc.

The information distribution inside of the information distributing system includes the information transmission to corresponding information distributing system by the transmitting source and information receiving from the corresponding information distributing system by the transmitting destination; expresses the information distributing system, the transmitting source, and the transmitting destination as nodes; draws the arc from a transmitting source node to the information distributing system node for displaying the information transmission; and expresses the information receiving by drawing arc from an information distributing system node to the transmitting destination node.

The usage condition acquiring unit, which includes an information transmission detecting unit for detecting if the information transmitted by the information distributing system is transmitted to the outside of the information distributing system, (a) acquires the information usage conditions related to the individual communication to the transmitting source which transmits the information using the information distributing system outside of the information distributing system, and (b) acquires the information usage conditions related to information transmission corresponding to other transmitting destination besides the transmitting source which transmits information using the corresponding information distributing system.

In this case, it is assumed that the attribute or body of the information is recorded as log. According to the attribute of the information, the sender information and the receiver information may be acquired.

The information transmission detecting unit, conventionally, determines the corresponding relation based on common words or common conception included in the information. A method for determining the corresponding relation may use a method used in JP-A-2004-252946.

The information transmission detecting unit, conventionally, determines the corresponding information based on a keyword representing the information transmitted by using the information distributing system to be evaluated. A method used in JP-A-2004-252946 may be employed to determine the relation. The method using keyword is not limited in the case of having same spelling and is desired to be mapped using the semantic network or ontology, and so on. In this case, the keyword, for example, is selected from the words or the concepts included in the information transmitted using the information distributing system to be evaluated.

The information transmission detecting unit determines the effect of the information distributing system on the outside of the information distributing system to be evaluated based on the frequency of the keywords in the information transmitted to the outside of the information distributing system.

The usage conditions collecting unit may collect information usage conditions corresponding to (a) individual communication to the transmitting source which transmits the information using the information distributing unit outside of the information distributing system, (b) information transmission to other transmitting destination besides the transmitting source which transmits information using the corresponding information distributing system, and (c) utilization of corresponding information by the transmitting destination which receives the corresponding information using the corresponding information distributing system. In this case, a method used in JP-A-2004-252947 may be employed.

The usage condition displaying unit is desirable to display a representation of the human organization related with the information usage conditions. The organization representation is called as 'formal organization structure'. The organization representation describing the corresponding human organization is displayed by at least one of an information flowchart, a process chart, an organizational chart, a location chart, or a matrix type organizational chart.

In this constitution, the information distributing system to be evaluated, which is conventionally 'the informal organization', can be related with the representation of the organization or 'the formal organization structure' and the effects to each other can be understood. Therefore, ideas for embedding information distributing system into the business of the enterprise or changing the flow of business process can be obtained.

The information distributing system to be evaluated includes the organization that is organized by voluntary participation in the human organization, that is to say 'informal organization'. In this case, nodes, for example, may display a plurality of information distributing systems, and arcs such as arrows may show the information flow among them.

The information distributing system to be evaluated may be plural. The transmitting source and the transmitting destination of the information may represent one user or one user group. The transmitting source and the transmitting destination also may be represented by an organization name or an occupation.

According to another aspect of the present invention, an apparatus for analyzing and displaying information comprises an information distributing unit for distributing the information; a information distribution detecting unit for detecting that the second type information corresponding to the first type information transmitted by the information distributing system is transmitted from the corresponding information distributing system; and a displaying unit for displaying that the second type information which corresponds to the first type information transmitted by the information distributing unit is transmitted by the information distributing unit based on detected result of the information distribution detecting unit.

The apparatus for analyzing and displaying the information is assumed of an information distributing unit such as a mail server (SMTP server, POP server, and so on) and HTTP server. According to the information distributing unit, the information distributing system is constructed. The information distributing system is an information exchange unit such as virtual information exchange community or space or a mailing list. The information distributing system is an information exchange unit such as virtual information exchange community or space like electronic bulletin board system or a mailing list. The apparatus for analyzing and displaying the information, conventionally, is implemented as an application on a predetermined server, for example, displays analysis result of the information on the web-based system. If the environment capable of acquiring information distributing state is prepared, it may be implemented as an application on the client device. Also, it may be compositively formed by a plurality of computers.

In this configuration, it is understood how the first type information is used in the second type information.

The information distributing unit includes an information distributing unit capable of reading contributed information, and the first type information is contributed to the information distributing unit which opens the contributed information to the public or the subscribers of the information distribution unit. The information distributing unit which opens the contributed information to the public or the subscribers of the information distribution unit is, for example, an electronic bulletin board system or a mailing list system.

The first type information is, conventionally, transmitted using the informal organization, that is to say organization for communication assumed of voluntary participation and the second type information is transmitted on the outside of the informal organization.

The type of information transmission outside of the informal organization includes distribution, utilization, and individual communication and may be discriminated and displayed according to the classification.

The organization representation describing the contents of the human organization is displayed by correlating the transmission of the second type of information.

The present invention may be implemented by a method as well as the apparatus or the system. Also the part of the invention may be constructed by software. It is proper that the software product being used in a computer is included in a technological scope of the present invention.

The above-mentioned embodiments and other embodiments will be described following embodiments.

According to the embodiment of the present invention, an information distributing system, typically, an external usage conditions of information of an 'informal organization' is understood so as to exactly evaluate the corresponding information distributing system. In addition, in detailed construction, the information distributing system of an evaluating object, conventionally, 'informal organization' can be corresponded to an organization representation, that is to say 'formal organization structure' so as to understand mutual influence.

Hereinafter, the details of the embodiments of the present invention will be described.

[Implementation of the Embodiment]

Figure 2:
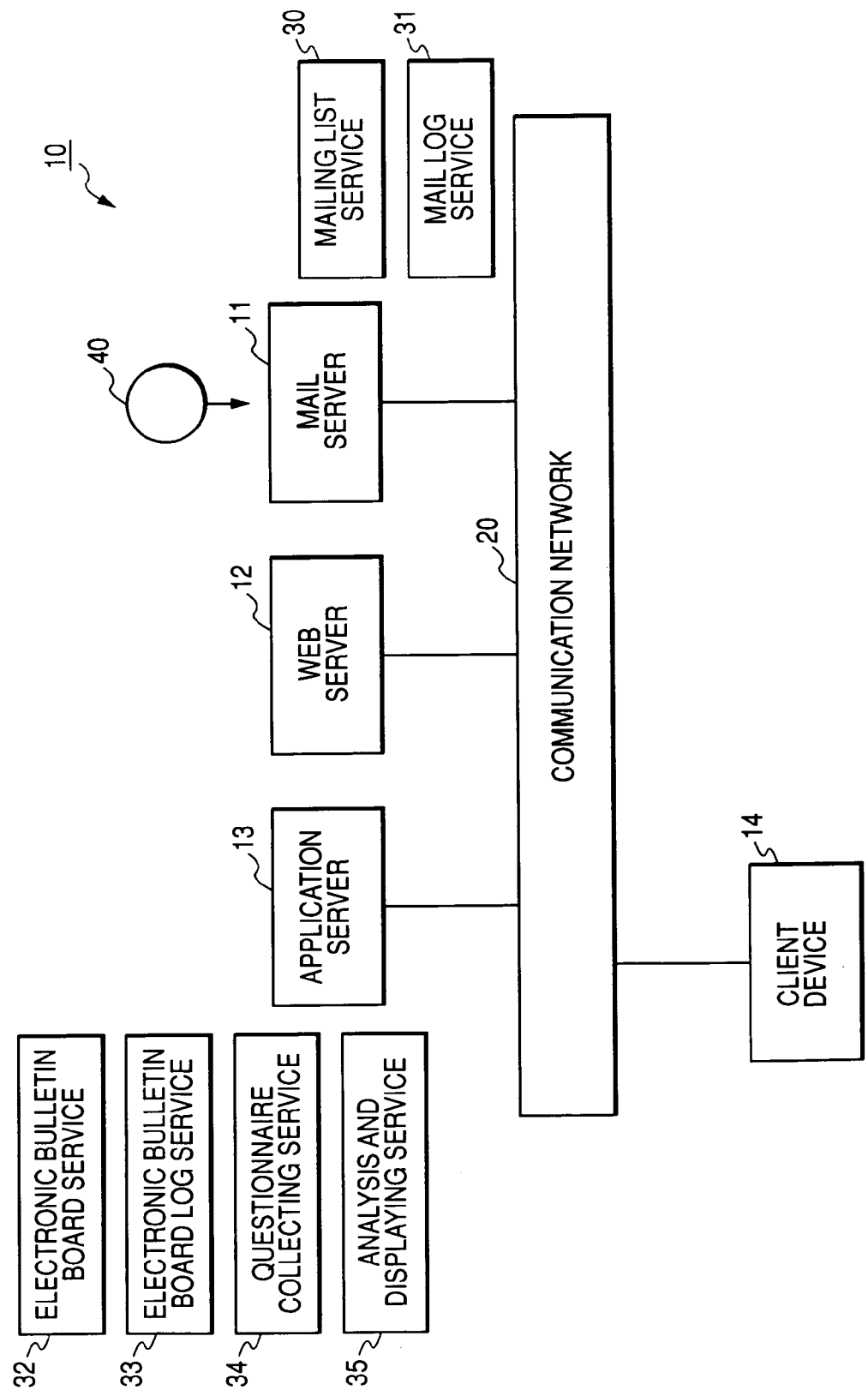
FIG. 2 is a view illustrating an embodiment according to the present invention.

FIG. 2 shows a system for analyzing and displaying information according to an embodiment of the present invention. In this embodiment, the system for analyzing and displaying information consists of a server computer connected to the communication network and a client device, but the present invention is not limited above-mentioned devices and may employee various components. In FIG. 2, a system 10 for analyzing and displaying information connects a mail server 11, a web server 12, an application server 13, and a client device 14 through the communication network 20. Each device may be plural or be connected to one computer. The communication network 20 may be constructed with wire or wireless communication device such as LAN, WAN and so on. The client device 14 is connected to the communication network 20 by wire or wireless according to the environment and may use a personal computer, an intelligent cellular phone, or an intelligent electric household appliance.

The mail server 11 may perform an SMTP service or a POP service, and also may perform a mailing list service 30 and a mail log service 31. The mailing list service 30 is assumed that users participate voluntarily and consists of 'informal organization'. The mail log service 31 stores and manages information history of mail communication information including information exchanged by the mailing list service 30 as described below.

The web server 12 performs HTTP service. The application server 13 provides web-based service using the HTTP service of the web server 12, such as an electronic bulletin board service 32, an electronic bulletin board log service 33, a questionnaire collecting service 34, and an information analyzing and displaying service 35. The electronic bulletin board service 32 is also assumed that the users participate voluntarily and consists of 'informal organization'. The electronic bulletin board log service 33 stores and manages information history of the information exchanged by the electronic bulletin board service 32. The questionnaire collecting service 34 addresses the questionnaire to the users or the members of the mailing list service 30 or the electronic bulletin board service 32 about the way information is acquired by the mailing list service 30 or the electronic bulletin board service 32, that is, acquired using 'the informal organization' and manages the questionnaire result. The questionnaire collecting service 34 may be totally or partially performed by manpower.

The analyzing and displaying service 35 analyzes and displays how the information flowing on 'the informal organization' to be used outside of 'the informal organization' or how the information flowing on 'the informal organization' to be used in the 'formal organization structure'.

Specifically, as described later, the information analyzing and displaying service 35 analyzes how the information transmitted by the mailing list service 30 or the electronic bulletin board service 32, which mean 'the informal organization', is used outside of the mailing list service 30 or the electronic bulletin board service 32 by using the log information of the mail log service 31, the log information of the electronic bulletin board log service 33, or the collected questionnaire result of the questionnaire collecting service 34. And then, the information analyzing and displaying service 35 displays the analyzed result. The analyzed result, for example, is displayed in a web-based system using the web server 12.

The client device 14 receives the mailing list service 30, the electronic bulletin board service 32, the questionnaire collecting service 34, and the information analyzing and displaying service 35 through the client application, for example, a mailer or a web browser.

Hereinafter, the mailing list service 30 is used as an example of 'the informal organization' but other 'informal organizations' such as the electronic bulletin board service 32 have the same process.

Each service performed in the mail server 11, the web server 12, the application server 13, and the client device 14 is implemented by installing a program. For example, the mail server 11 performs the mailing list service 30 or mail log service 31 after installing the program 40. It is same in other computers.

[Functional configuration of Embodiment]

Figure 3:
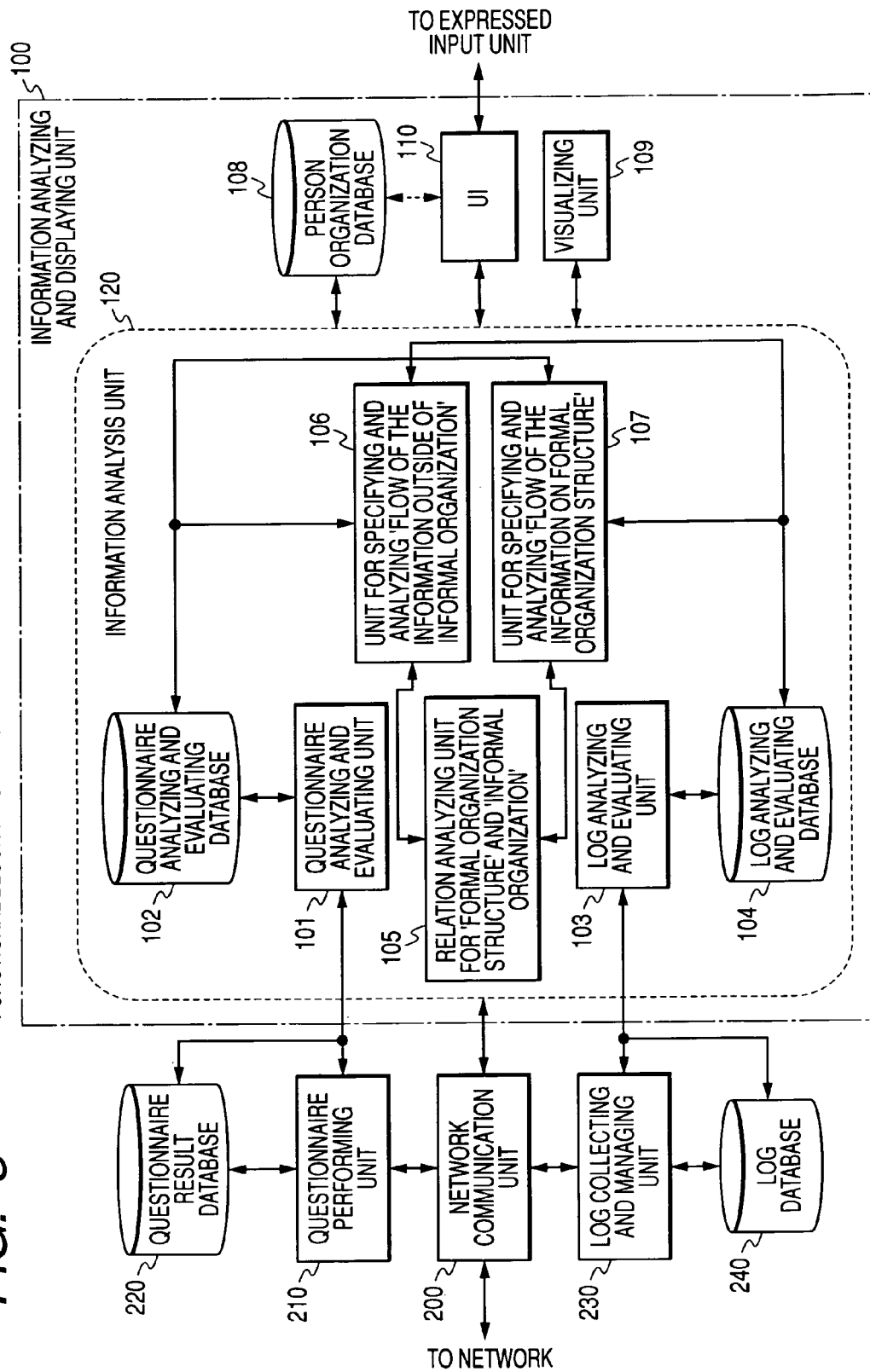
FIG. 3 is a block diagram illustrating functional blocks of the embodiment according to the present invention.

FIG. 3 shows configuration of a main part of the system for analyzing and displaying the information 10 with functional block. The main part of the system for analyzing and displaying the information 10 includes an information analyzing and displaying unit 100, a network communication unit 200, a questionnaire performing unit 210, a questionnaire result database 220, a log collecting and managing unit 230, and a log database 240. The information analyzing and displaying unit 100 corresponds to the information analyzing and displaying service 35 in FIG. 2. The network communication unit 200 corresponds to the communication network 20, the mailing list service 30, and the electronic bulletin board service 32 in FIG. 2. The questionnaire performing unit 210 and the questionnaire result database 220 correspond to the questionnaire collecting service 34 in FIG. 2. The log collecting and managing unit 230 and a log database 240 correspond to the mail log service 31 and the electronic bulletin board log service 33 in FIG. 2.

The information analyzing and displaying unit 100 includes an information analyzing unit 120, PERSON ORGANIZATION database 108, a visualizing unit 109, and a user interface 110. The information analyzing unit 120 includes a questionnaire analyzing and evaluating unit 101, a questionnaire analyzing and evaluating database 102, a log analyzing and evaluating unit 103, a log analyzing and evaluating database 104, a relation analyzing unit for 'formal organization structure' and 'informal organization' 105, an unit for specifying and analyzing 'flow of the information outside of the informal organization' 106, and an unit for specifying and analyzing 'flow of the information on formal organization structure' 107.

Hereinafter, operations of each configuration based on the information analyzing and displaying unit 100 are described.

[Overall operation of Embodiment]

Figure 4:
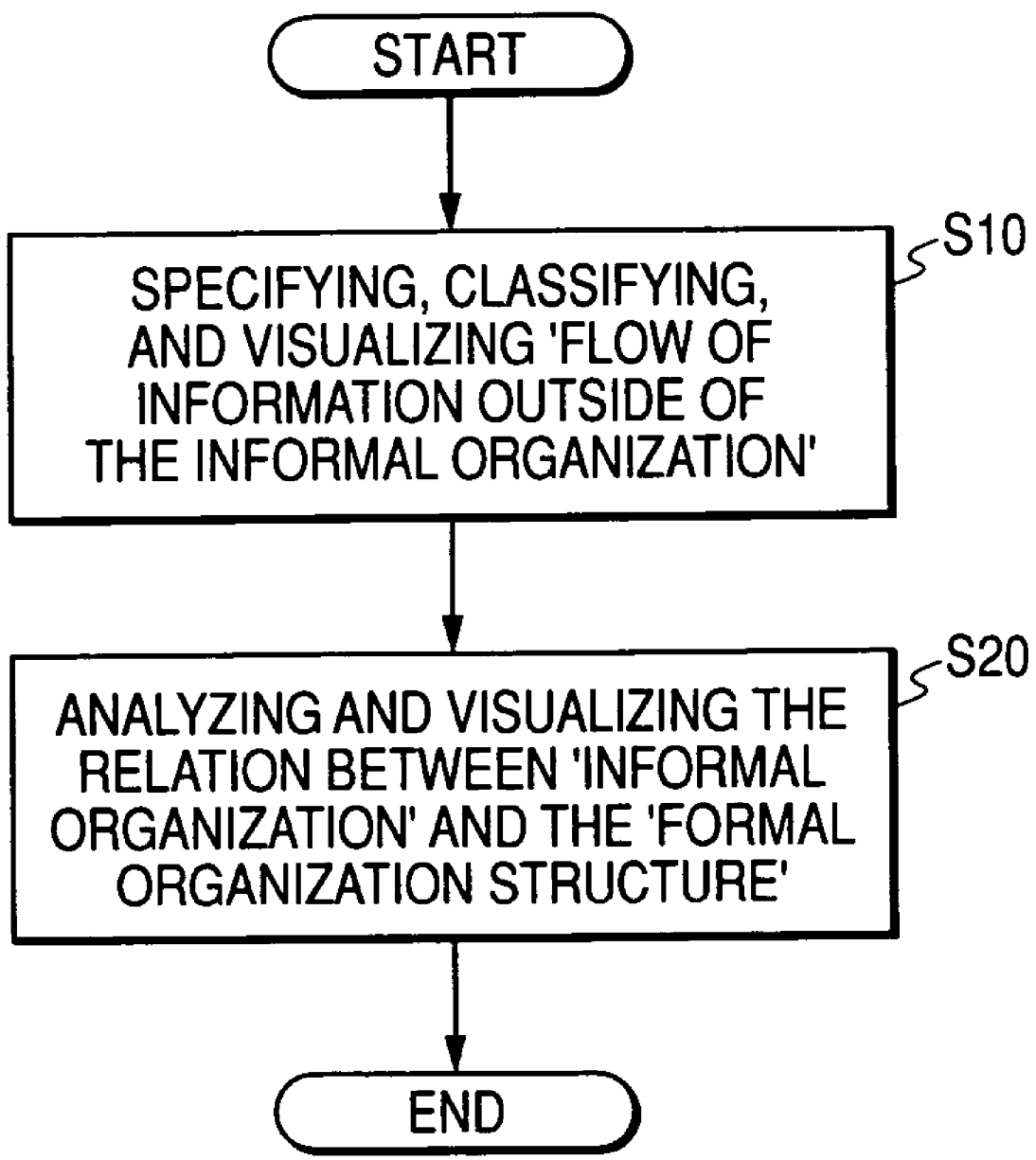
FIG. 4 is a flowchart illustrating general operation of the embodiment according to the present invention.

FIG. 4 is a schematic view of the operation of the information analyzing and displaying unit 100. The information analyzing and displaying unit 100 executes step S10 classifying and visualizing the effect of 'the flow of information outside of the informal organization' and step S20 analyzing and visualizing the relationship between 'the informal organization' and the 'formal organization structure'.

In addition, it does not matter to execute the both two steps or only one of the steps or the both two steps as a merged step. At a flow chart of FIG. 4 or other flow charts, order of steps may be sequential but it does not need to exactly determine the order.

Figure 22:
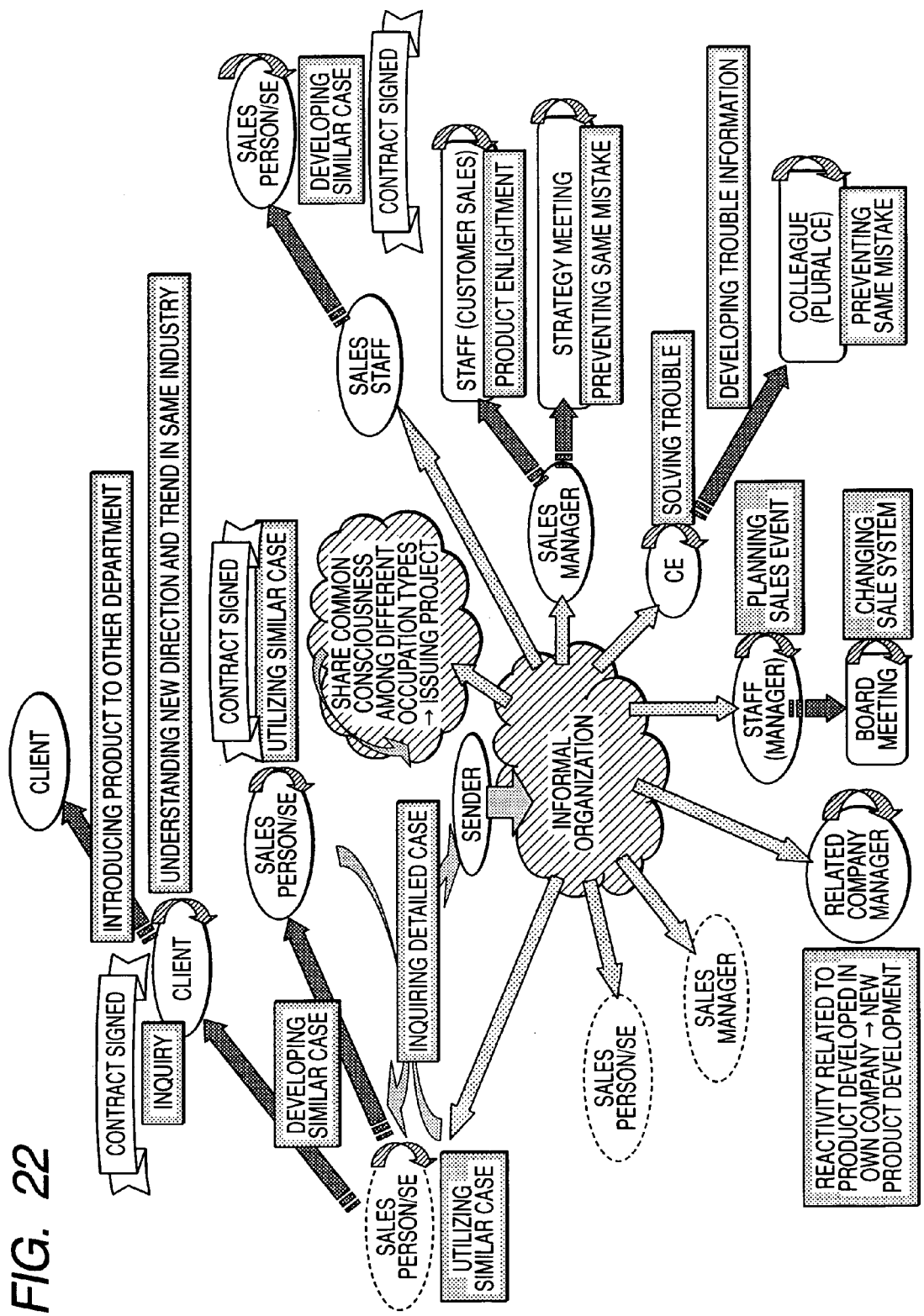
FIG. 22 is a view illustrating an embodiment of detailed visualization of 'flow of information outside of informal organization'.
Figure 42:
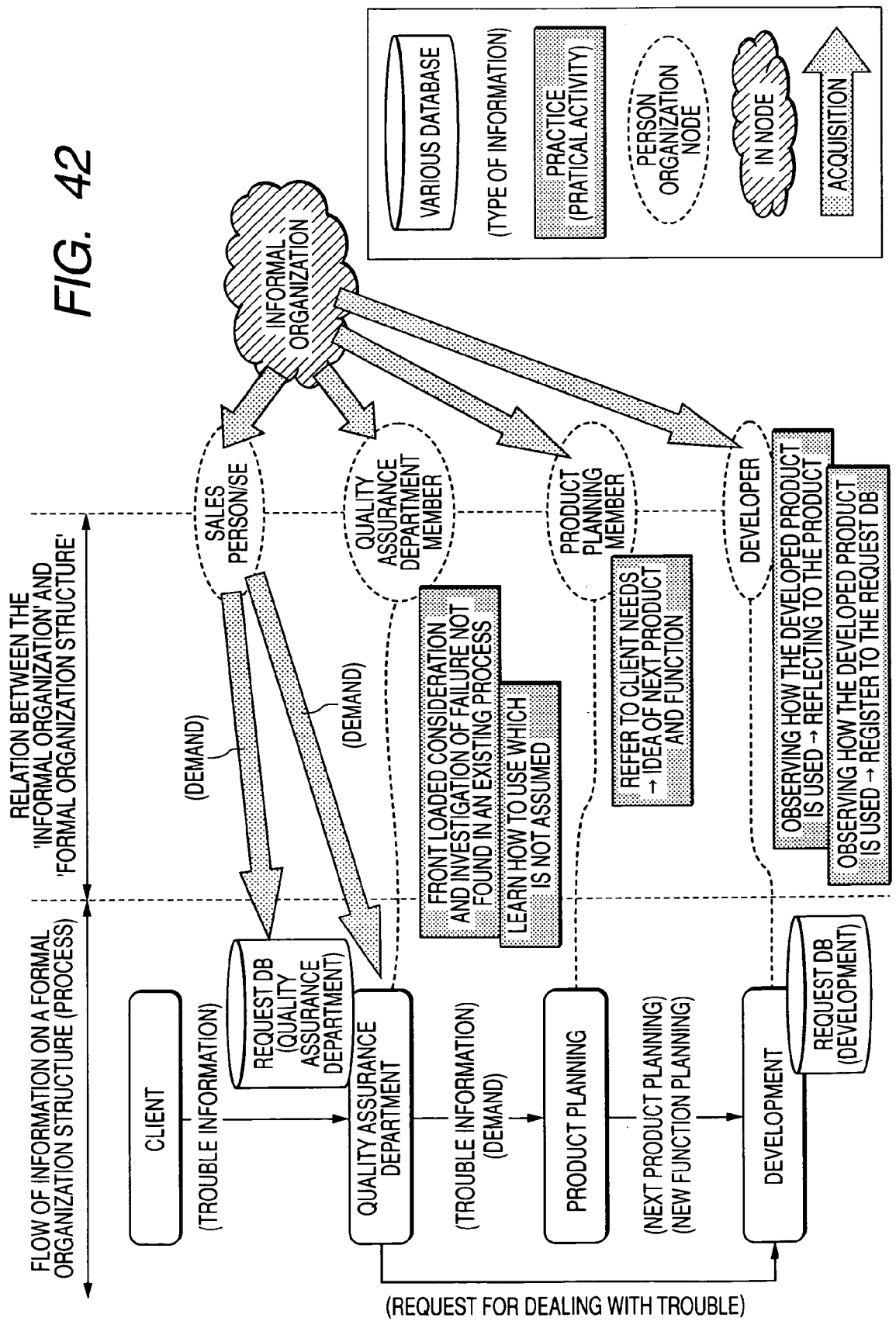
FIG. 42 is a view illustrating an embodiment visualizing 'flow of information outside of informal organization' being flown in 'formal organization structure'.

According to step S10 classifying and visualizing the effect of 'the flow of information outside of the informal organization', for example, the representation shown in FIG. 22 are visualized. According to step S20 analyzing and visualizing the relationship between 'the informal organization' and the 'formal organization structure', for example, the representation shown in FIG. 42 are visualized. FIG. 22 and FIG. 42 are explained afterward.

Figure 5:
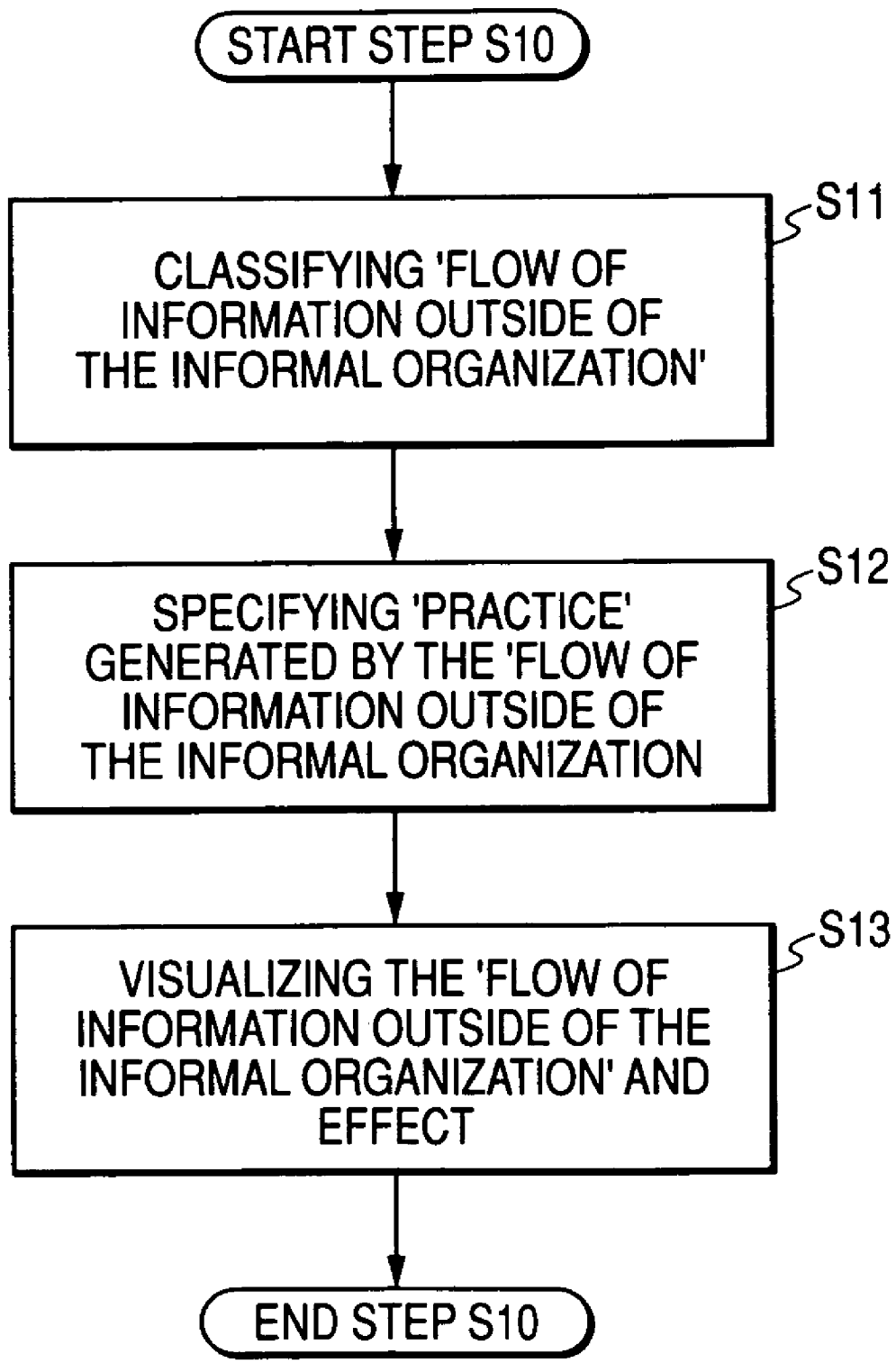
FIG. 5 is a flowchart illustrating operations for specifying, classifying and visualizing 'flow of information outside of an informal organization' of the embodiment according to the present invention.

FIG. 5 shows detailed embodiment for specifying, classifying, and visualizing 'the flow of information outside of the informal organization' (step S10). In FIG. 5, 'the flow of information outside of the informal organization' is classified (step S1), 'practice' generated by 'the flow of information outside of the informal organization' is specified (step S12), and 'the flow of information outside of the informal organization' and the effect thereof are visualized (S13).

Figure 6:
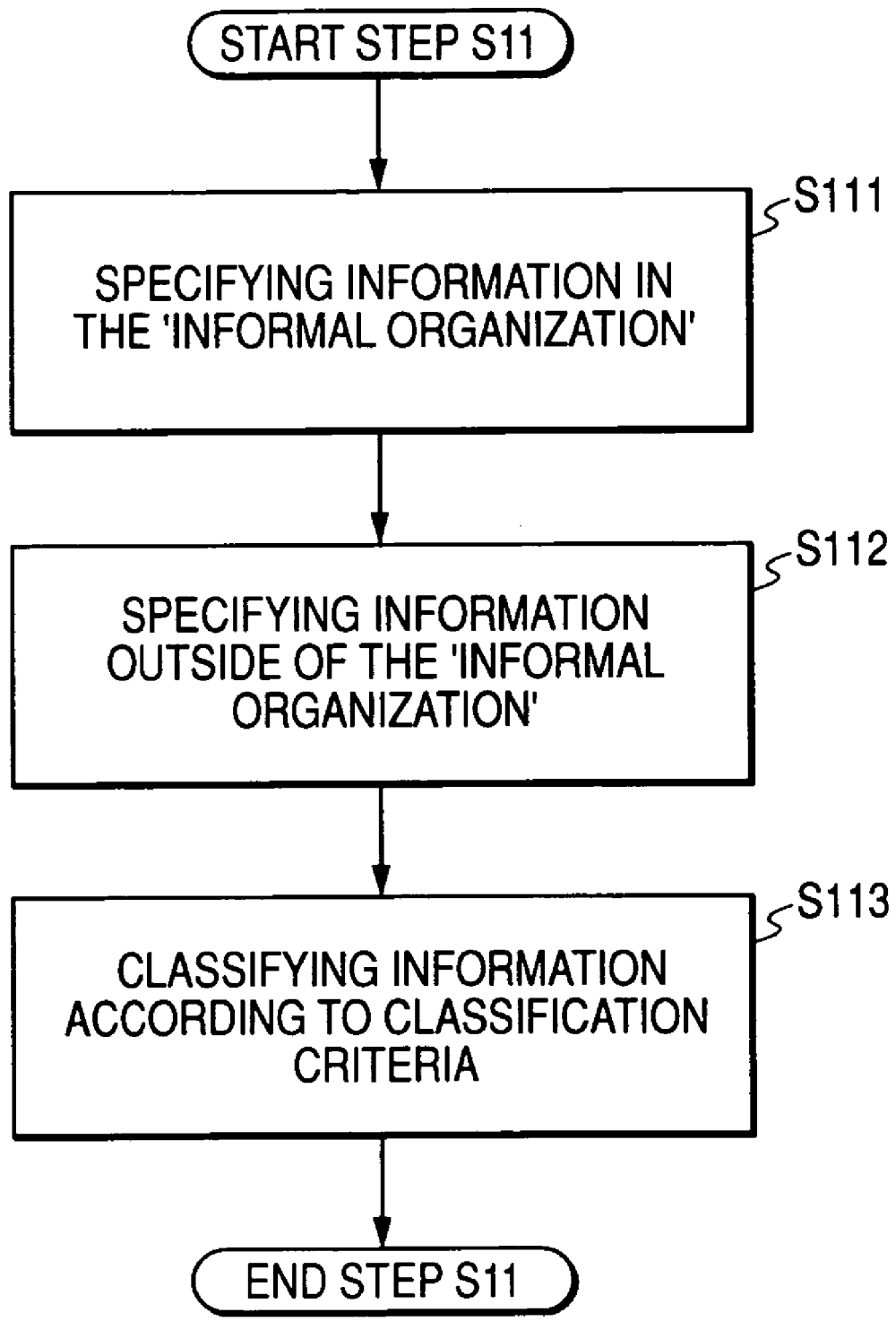
FIG. 6 is a flowchart illustrating steps for classifying 'the flow of information outside of an informal organization' in FIG. 5.

FIG. 6 shows a detailed embodiment of classifying and processing 'the flow of information outside of the informal organization' of step 511 in FIG. 5. In FIG. 6, 'the flow of information in the informal organization' is specified (step S111), the flow of information outside of 'the informal organization' is specified (step S112), and 'the flow of information outside of the informal organization' is classified into incoming, transmission, and individual communication (step S113).

Figure 7:
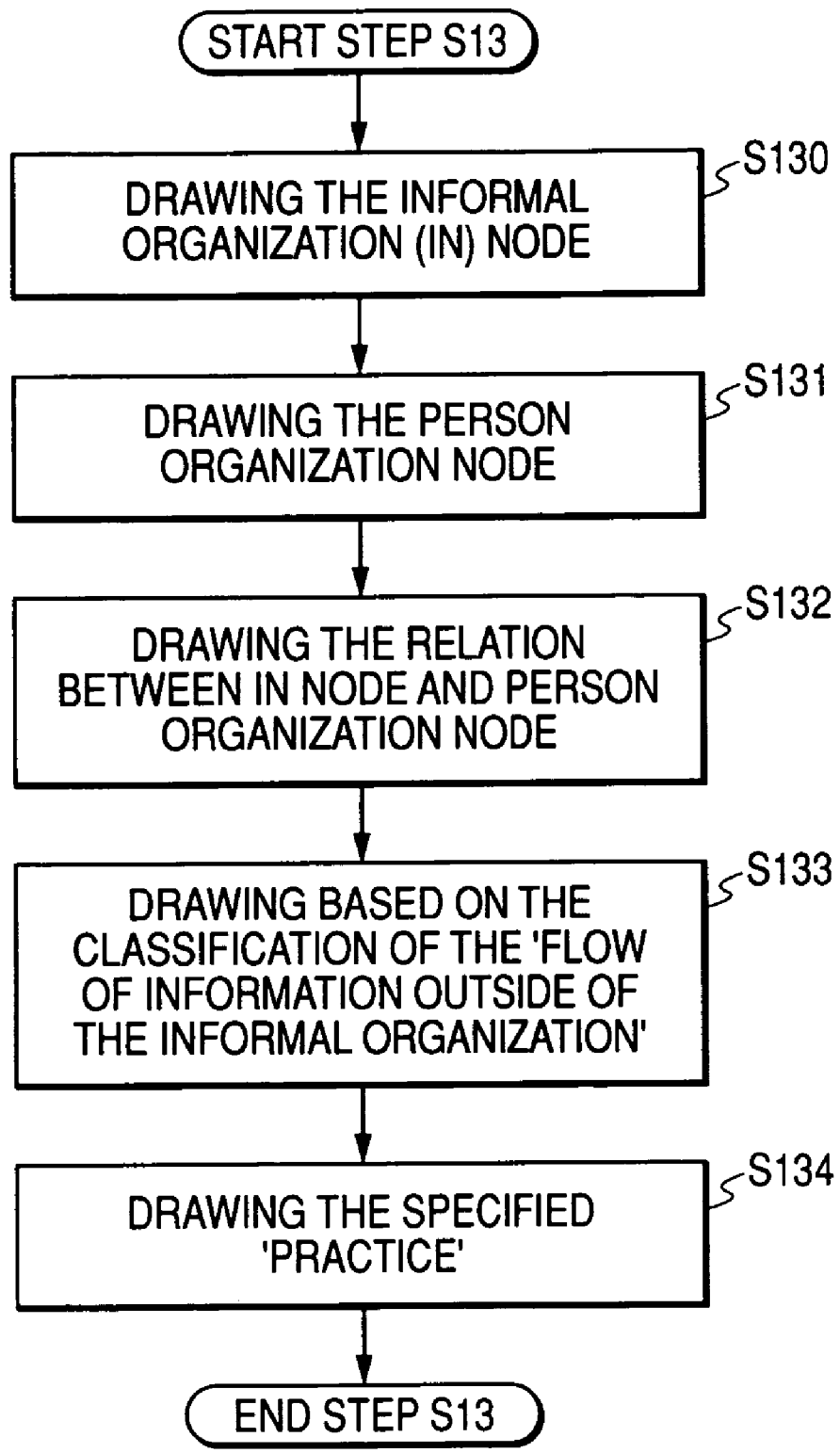
FIG. 7 is a flowchart illustrating steps for visualizing effect according to 'flow of information outside of an informal organization' in FIG. 5.

FIG. 7 shows a detailed embodiment of step S13 in FIG. 5, visualizing 'the flow of information outside of the informal organization' and the influence. In FIG. 7, 'the informal organization' is drawn (S130), the human organization node is drawn (S11), the relationship between the node of 'the informal organization' and the node of the human organization is drawn (S132), 'the flow of information outside of the informal organization' is drawn based on the classification (S133), and the specified 'practice' is drawn (S134).

Figure 8:
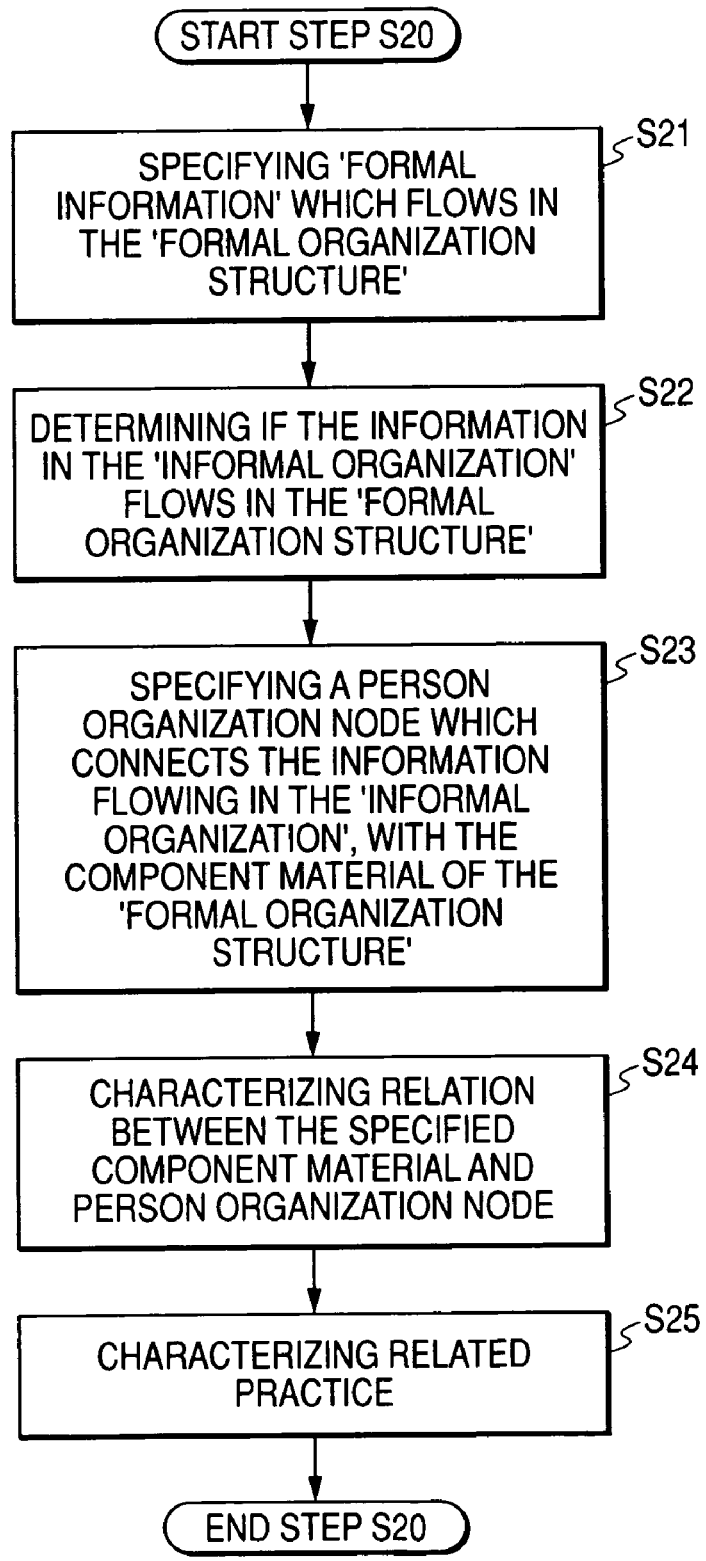
FIG. 8 is a flowchart illustrating operations for analyzing and visualizing relations between 'formal organization structure' and 'informal organization' of the embodiment according to the present invention.

FIG. 8 shows a detailed embodiment of analyzing and visualizing the relationship between 'the informal organization' and the 'formal organization structure' (S20). In FIG. 8, the 'formal information' which flows in the 'formal organization structure', is specified (S21). It is determined if the information in 'the informal organization' flows in the 'formal organization structure' (S22). The human organization node which connects the information flowing in 'the informal organization', with the component material of the 'formal organization structure' is specified (S23). The relationship between the specified component material and human organization node is drawn (S24) and related practice is drawn (S25).

[Specification, Classification, and Visualization of 'Flow of Information Outside of the Informal Organization']

Next, the specification, the classification, and the visualization of 'the flow of information outside of the informal organization' (S10) will be explained.

[Embodiment of Expressed Component]

At first, each embodiment of expressed component and visualization for indicating 'the flow of information outside of the informal organization' is explained with a simple example. It is also to be understood that the technical scope of the invention is not limited to the above described embodiment, and various modifications may be made to the respective embodiments without regarding from the scope and sprit of the present invention.

Figure 9:
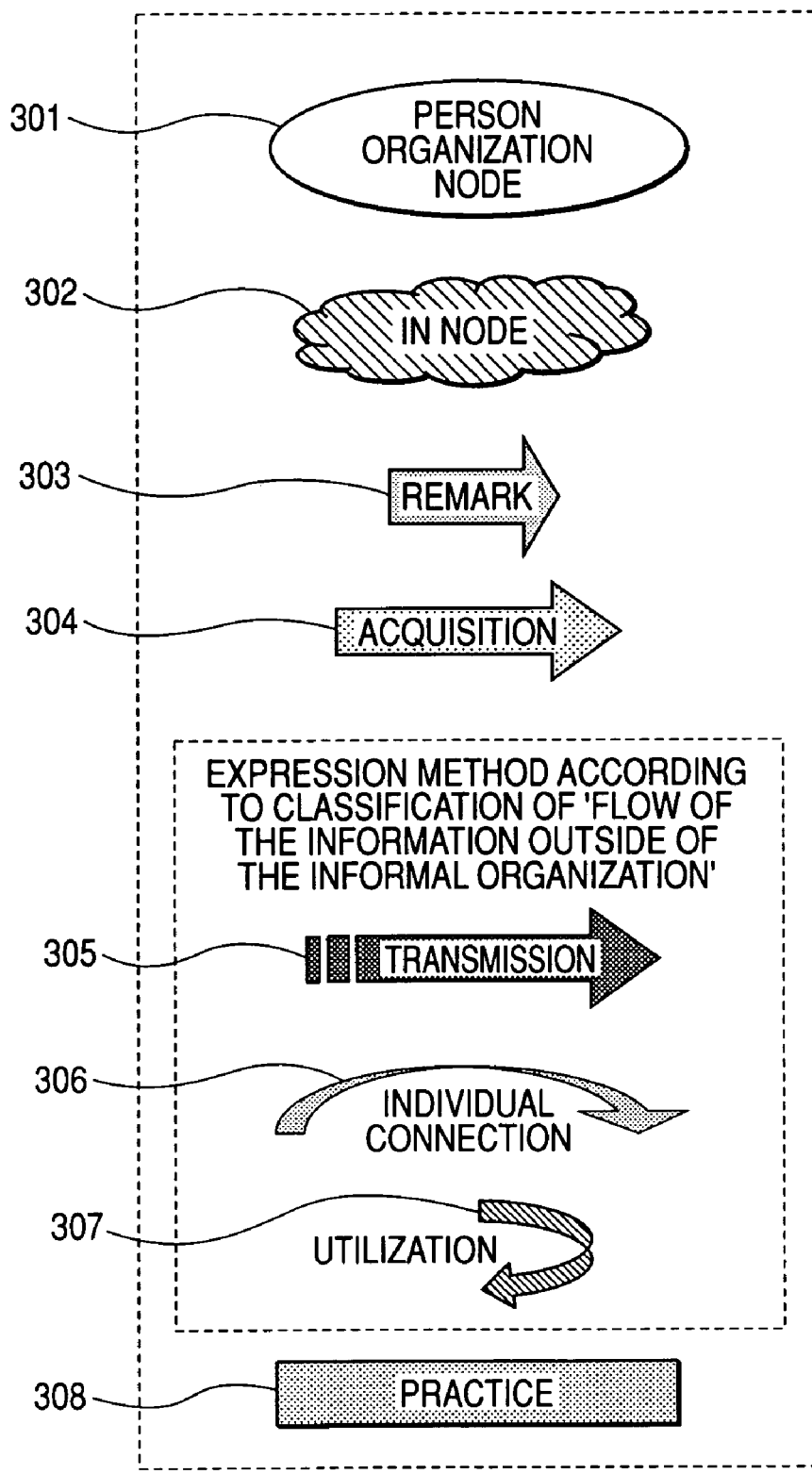
FIG. 9 is a view illustrating indication component materials being used when visualizing 'flow of information outside of an informal organization' of the embodiment according to the present invention.

FIG. 9 shows an embodiment of the component material used in the visualization. In FIG. 9, the expressed component material 301 individually or collectively expresses entity (person) which transmits or receives the information. In the case of expressing a person individually it is possible to adhere label to name, included organization name, kind of occupation. The label may be a blank. In the case of expressing an organization, a label such as the name of the organization is adhered. A line means individual expression of the entity, and double line means collective expression of the entity. The expressed component material 302 expresses 'informal organization'. In this embodiment, it has a cloud shape and includes a label like 'IN node' expressing 'the informal organization'. The expressed component material 303 expresses a 'remark (contribution)' sent by a member of 'the informal organization' in 'the informal organization'. The expressed component material 304 expresses an 'acquisition of the remark (contribution)' acquired by a member of 'the informal organization' in 'the informal organization'. The expressed component materials 305 to 308 show the information usage conditions according to the classification of 'the flow of the information outside of the informal organization'. The expressed component material 305 shows that the information is transmitted from a member of 'the informal organization' or a user who is not a member of 'the informal organization' to the user who is not a member of 'the informal organization'. The expressed component material 306 shows that the member of 'the informal organization', who acquired the information using 'the informal organization', communicates without using 'the informal organization' individually to the member who sent the information, for example, the 'individual communication' using an e-mail. The expressed component material 307 shows that the user who acquired the information uses the 'utilization' and the expressed component material 308 shows the practice as an embodiment of the 'utilization'.

Figure 10:
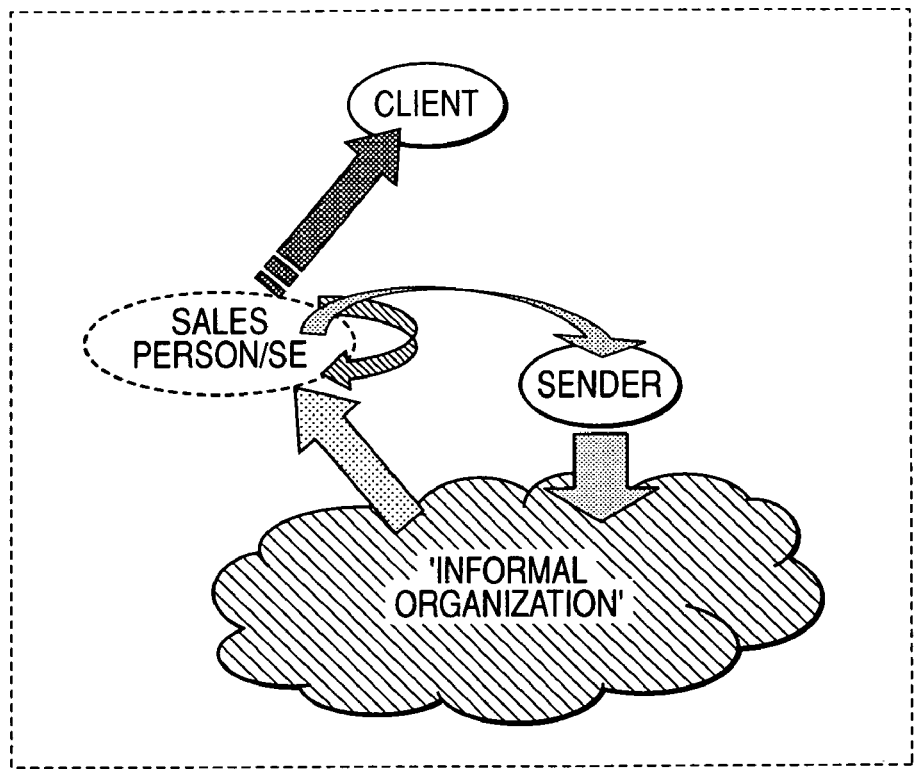
FIG. 10 is a view illustrating an embodiment for visualizing 'flow of information outside of an informal organization' using indication component material in FIG. 9.
Figure 11:
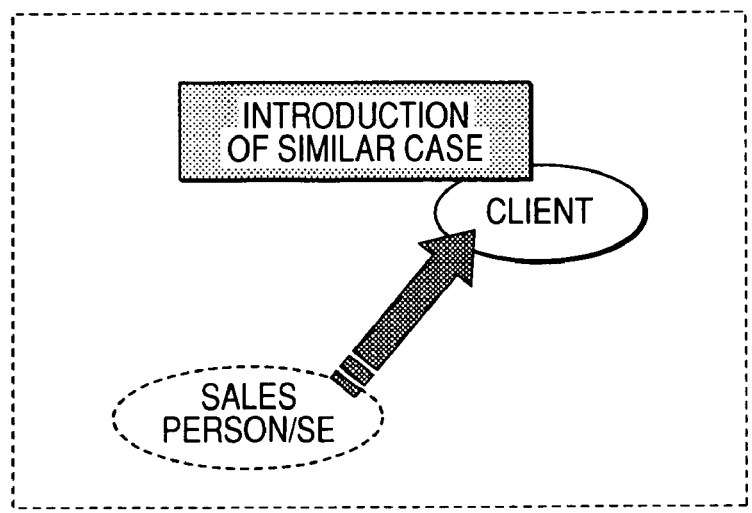
FIG. 11 is another view illustrating an embodiment for visualizing 'flow of information outside of an informal organization' using indication component material in FIG. 9.
Figure 12:
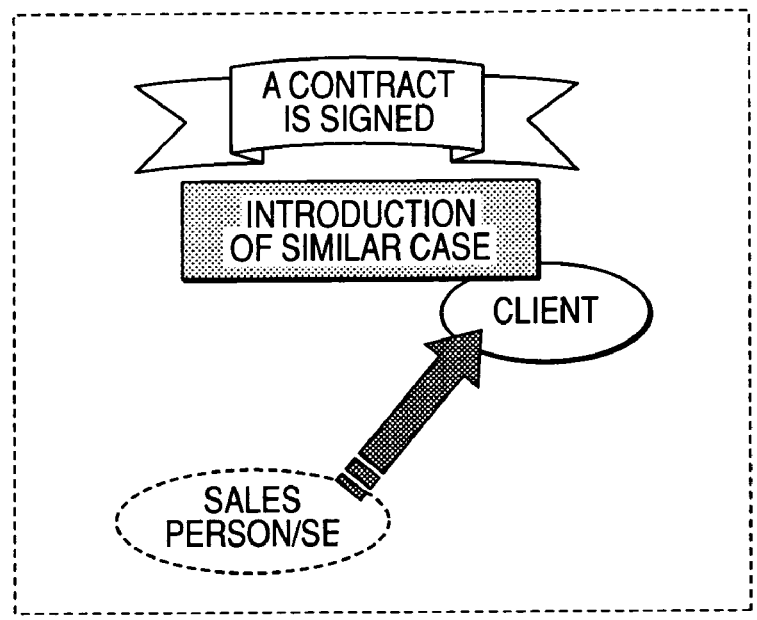
FIG. 12 is another view illustrating an embodiment for visualizing 'flow of information outside of an informal organization' using indication component material in FIG. 9.
Figure 13:
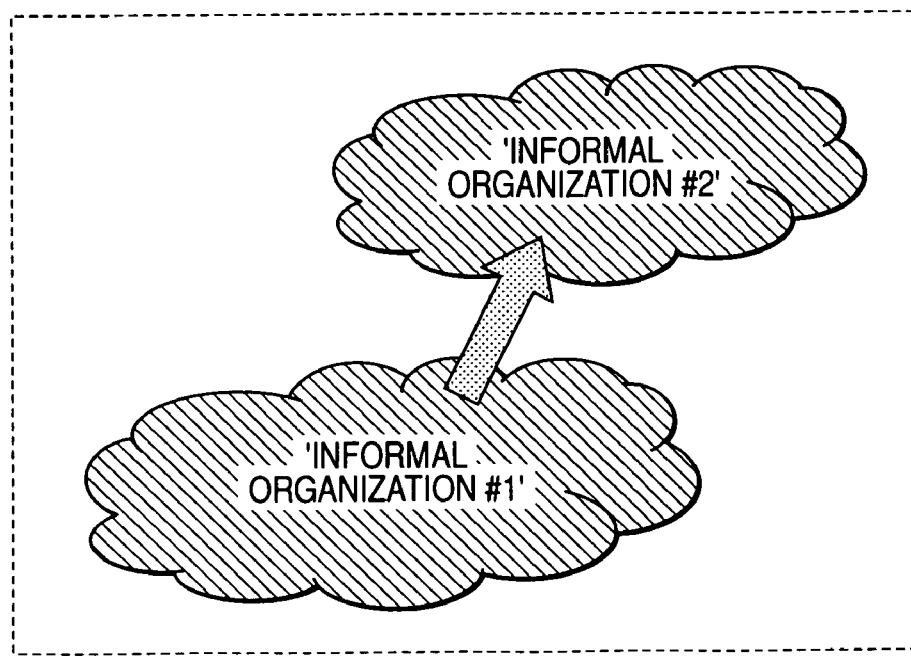
FIG. 13 is another view illustrating an embodiment for visualizing 'flow of information outside of an informal organization' using indication component material in FIG. 9.

The information shown in FIG. 10 to FIG. 13 is explained using the above expressed component material. FIG. 10 visualizes 'the flow of the information outside of the informal organization' according to the classification. In this example, 'sales person/SE' (member) acquires the 'remark' from a 'sender' (member) at 'the informal organization', executes the 'individual communication' to the 'sender', executes the 'utilization', and executes 'transmission' to a 'client' (not member). The example in FIG. 11 shows creation of the 'practice' from 'the flow of the information outside of the informal organization' at the person organization node. In this example, a 'similar case' is introduced based on the information acquired using 'the informal organization' to 'the client'. FIG. 12 shows an event followed by the 'practice' in FIG. 11, for example, the event including 'A contract is signed'. FIG. 13 shows an example that additional 'informal organization' is created from 'the flow of the information outside of the informal organization'.

[Method for Specifying, Classifying, and Visualizing 'Flow of the Information Outside of the Informal Organization']

Next, the specification, classification, and visualization of 'the flow of the information outside of the informal organization' are explained. It is explained with the example of specifying, classifying, and visualizing 'the flow of the information outside of the informal organization' by analyzing the log of the information transmitted from the mailing list and the example of specifying, classifying, and visualizing 'flow of the information outside of the informal organization' by analyzing and evaluating the questionnaire. Meanwhile, a method of JP 2004-252946 is employed as a method for analyzing the log of the information. The present invention uses the same method for extracting data and data structure in JP-A-2004-252946. The method for analyzing and evaluating the questionnaire uses the method included in JP-A-2004-252947. The present invention uses the same method for extracting data and data structure in the JP-A-2004-252947.

The classification explained here is an embodiment. According to the definition of the classification, it may be summarized or divided in particulars.

[Embodiment Using Log]

At first, a method for specifying and classifying 'the flow of the information outside of the informal organization' extracted from 'the informal organization' using the log is explained.

For example, a method for specifying information exchange using the mailing list as 'the informal organization' is described as specifying an exchange with an identifier (generally, added to a title or a header of the information) added to the e-mail being flown in the mailing list, or an exchange through a mailing list server.

The information of 'the informal organization' so-called specified mailing list is determined if it is flown outside of the mailing list and the information is specified and classified as 'the flow of the information outside of the informal organization'.

Hereinafter, an embodiment analyzing and displaying the flow of the information focused on the organization and an embodiment analyzing and displaying the flow of the information focused on occupation are explained.

Figure 14A:
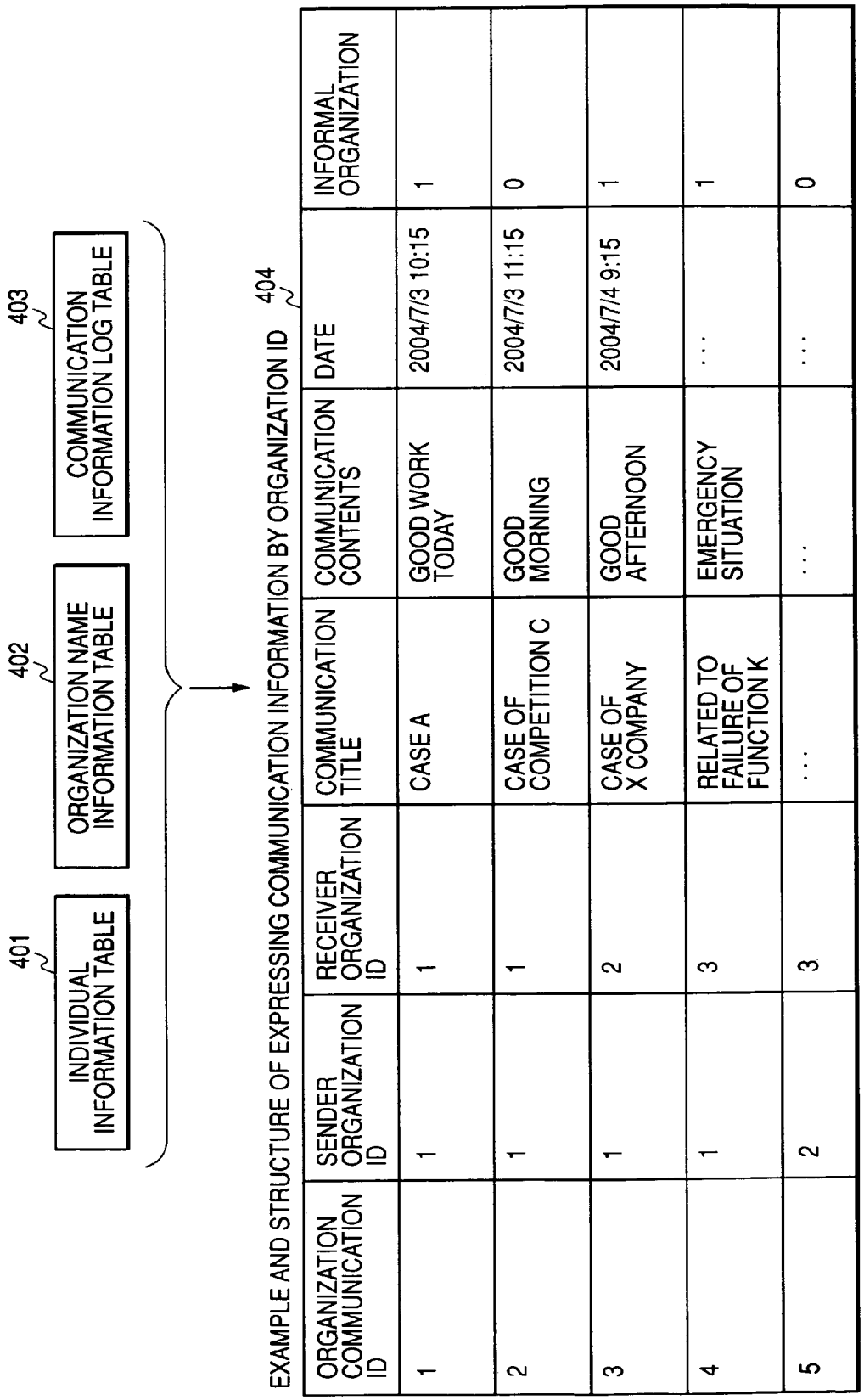
FIG. 14A is a view illustrating an embodiment for analyzing communication information according to a unit from log information focused on an organization.

In the case of analyzing and displaying the flow of the information focused on organization, as shown FIG. 14A, every individual information table 401, organization name information table 402, and communication information log table 403 constitute a communication information table according to organization ID 404. The individual information table 401, organization name information table 402, and communication information log table 403 are shown in FIG. 14B, FIG. 14C, and FIG. 14D, respectively. The individual information table 401 and the organization name information table 402 are acquired from the person organization database 108 in FIG. 3. The communication information log table 403 is acquired from the log database 240. The communication information log table 403 is the common communication information log of the e-mail. Identifying 'the informal organization', as shown by broken lines in FIG. 14D, uses letter strings given by the mailing list server such as 'xxx-interchange' in the header or the communication title. The communication information table according to organization ID 404 assigns flag '1' to a communication information in 'the informal organization' and assigns flag '0' to others.

Figure 15B:
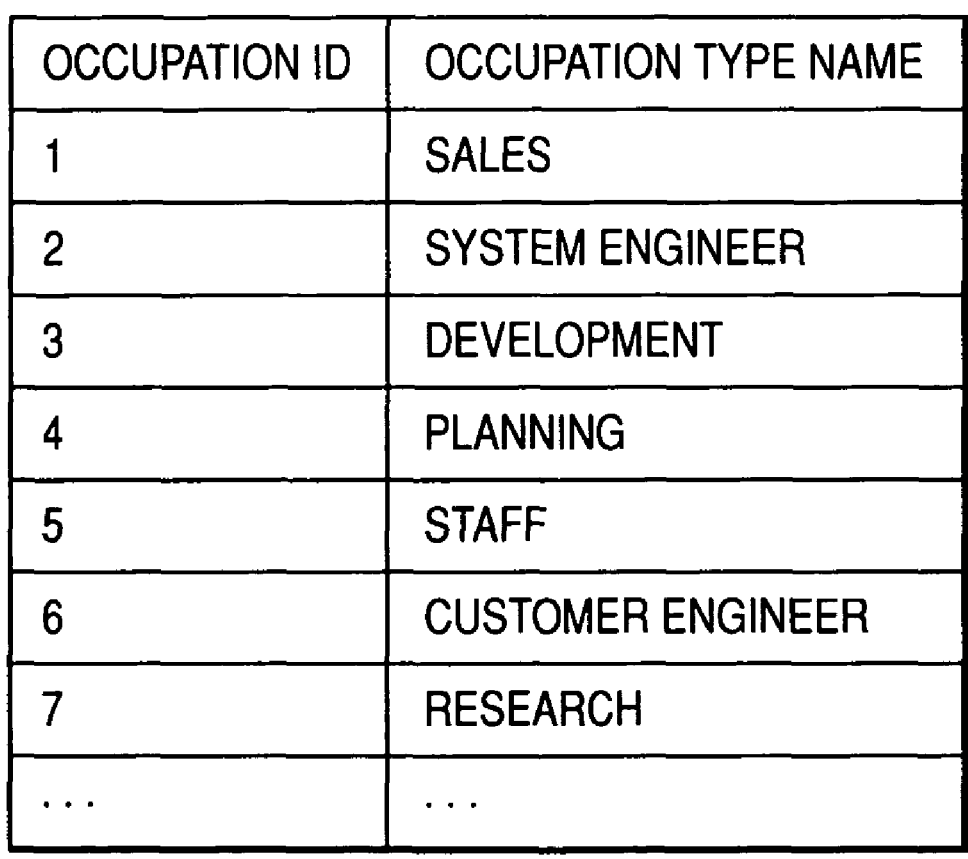
FIG. 15B is a view illustrating a structure and an embodiment of a table for occupation names of an organization.

In the case of analyzing and displaying the information focused on the kind of the occupation, as shown in FIG. 15A, each individual information table 401, organization occupation name information table 405, and communication information log table 403 constitute a communication information table according to occupation ID 406. The organization occupation name information table 405 is the same as that shown in FIG. 15B. Further, the individual information table 401 and the communication information log table 403 are the same as those shown in FIGS. 14B and 14D.

Figure 16A:
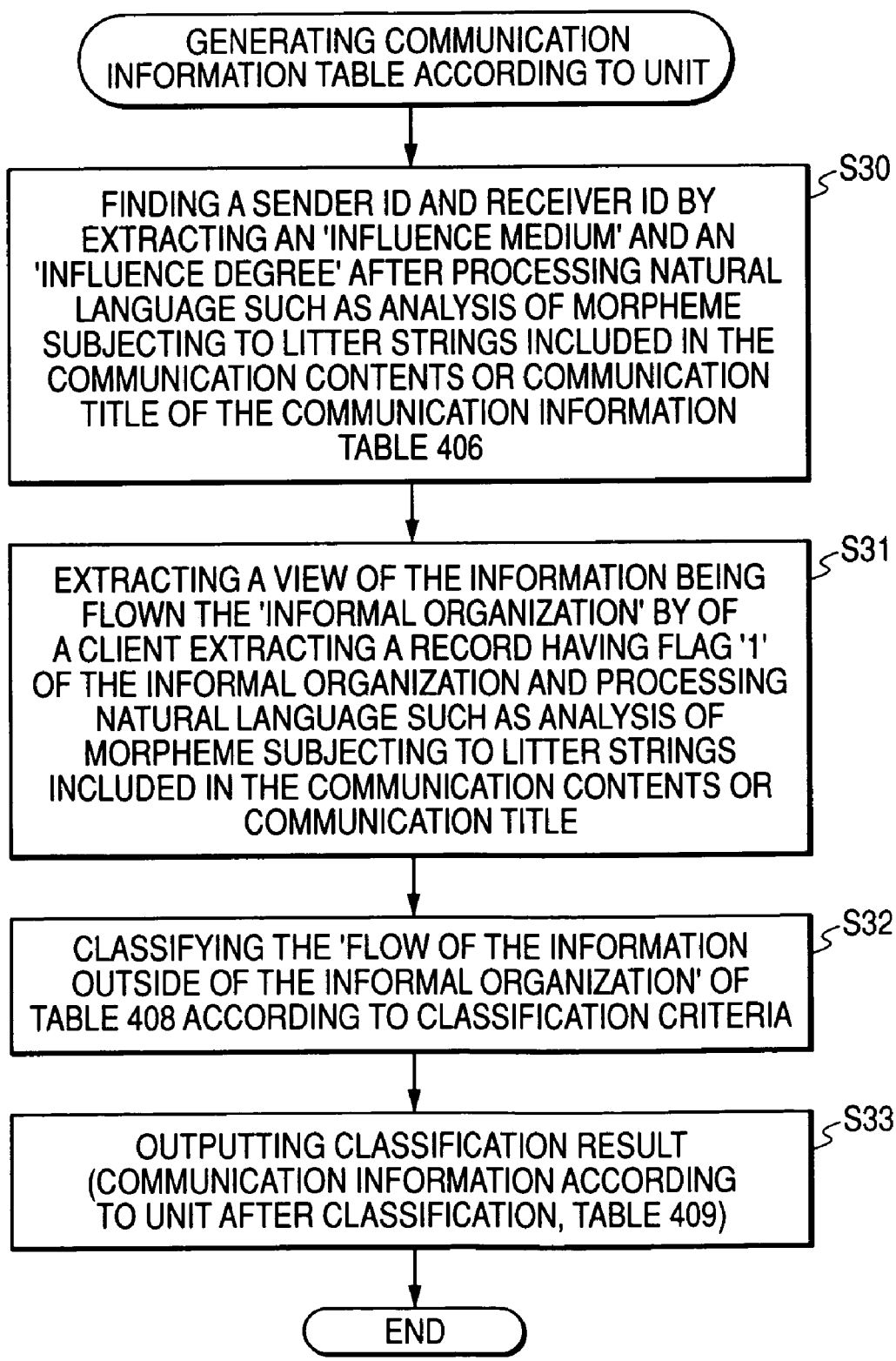
FIG. 16A is a view illustrating a method for classifying communication information according to a unit by occupation.

FIG. 16A shows an example of acquiring a communication information according to unit after classification table 409 (FIG. 18A) by using the communication information table according to occupation ID 406 acquired in FIG. 15A. FIG. 16A does not show accurate before and after relation and the order may be changed. It applies to the communication information table for the organization ID or the job class ID or something else. In FIG. 16A, a conventional natural language processing method is applied to the communication contents or communication title of the communication information table 406 to understand influencing medium, conventionally contents of the information, and the degree of influence (S30). Then the list 407 of the information being flown in 'the informal organization' is computed (S31). FIG. 16B shows an embodiment of the list 407 of the information being flown in 'the informal organization'. According to a classification standard table 408 of 'the flow of the information outside of the informal organization' shown in FIG. 17, the communication information according to unit after classification table 409 is calculated from the communication information such as the organization ID, the occupation kind ID, and job class ID (S32, S33). The communication information according to unit after classification table 409 includes a sender ID, a receiver ID, the influence medium, and the degree of influence. The sender and the receiver ID include the organization ID, the occupation kind ID, and the job class ID.

The classification standard table 408 of 'the flow of the information outside of the informal organization' shown in FIG. 17A determines whether including the information being flown in 'the informal organization' in the communication contents by the list of the information 407 being flown in 'the informal organization' (FIG. 16B). The part including the information being flown in 'the informal organization' in the communication contents is displayed by broken lines of FIG. 17A. When a member transmits information to the user who is not a member, the letter strings, for example, 'IN'(Informal Network), is written in a field named as 'information which is flown from informal organization?' in the communication information according to unit after classification table 409 (FIG. 18A). The letter strings 'IN' mean that the information flown in 'the informal organization' is transmitted to the user who is not a member of 'the informal organization' by a member of 'the informal organization'. If the member is included in 'the informal organization' is determined by a field 'information of the informal organization' in the communication information table 404, 406 (1 means a member, 0 means a user who is not included in the member). when the user who is not included in the member transmits the information to the user who is not included in the member, the sender ID and the receiver ID are set identically. Specifically, the exchange of the information outside of 'the informal organization' between members included in 'the informal organization' may be defined as the individual communication. The individual communication may have a condition for checking if a person of the receiver ID sent contents (information) same with the information included in 'the flow of the information outside of the informal organization' to 'the informal organization'.

Figure 17B:
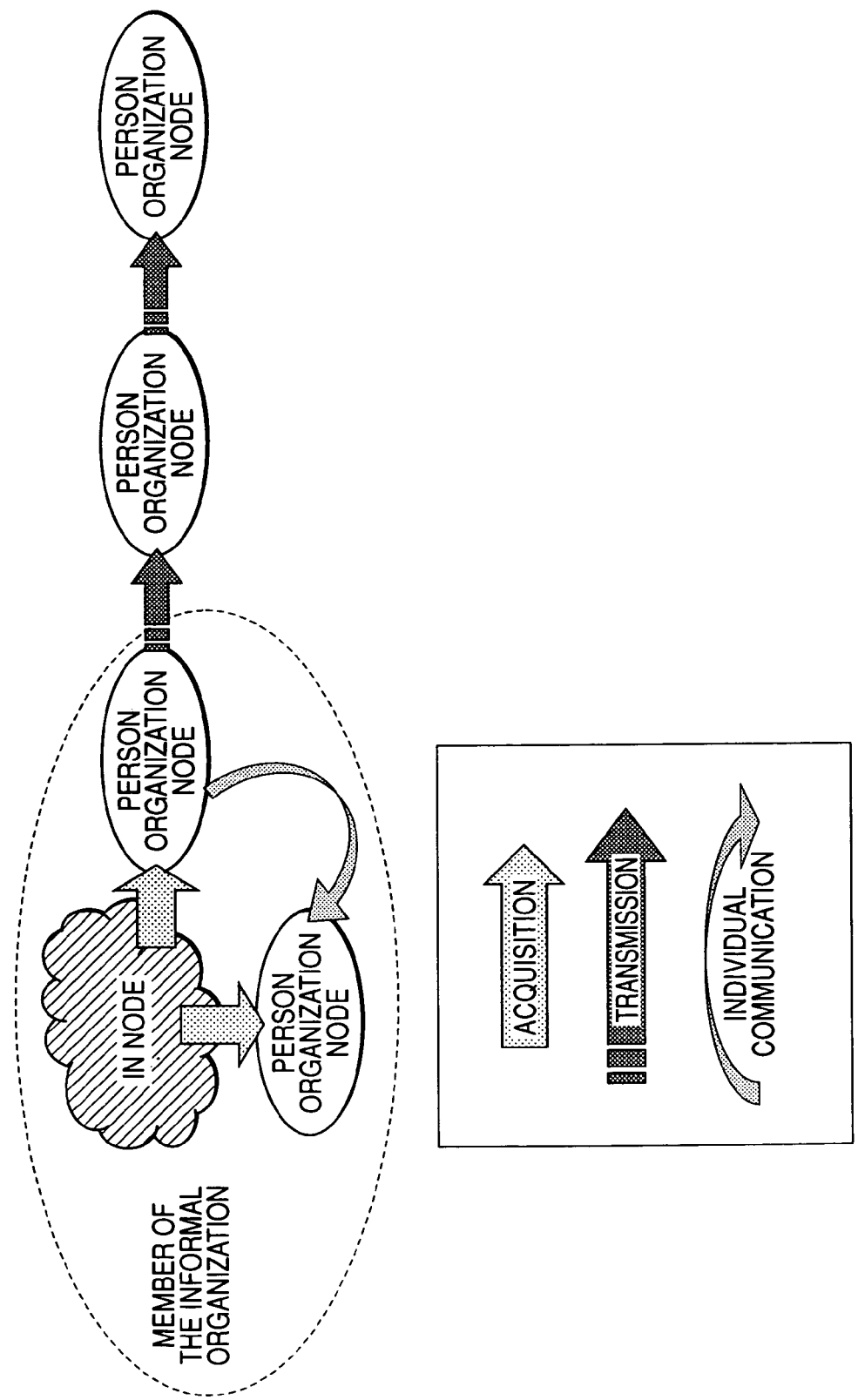
FIG. 17B is a view illustrating an embodiment for displaying flow of information classified by criteria for classification.

When focusing on the organization after identifying 'the flow of the information outside of the informal organization' and classifying into the 'transmission' and the 'individual communication', as shown FIG. 17B, the relationship between the 'IN node' and the 'person organization node' is displayed.

Figure 18B:
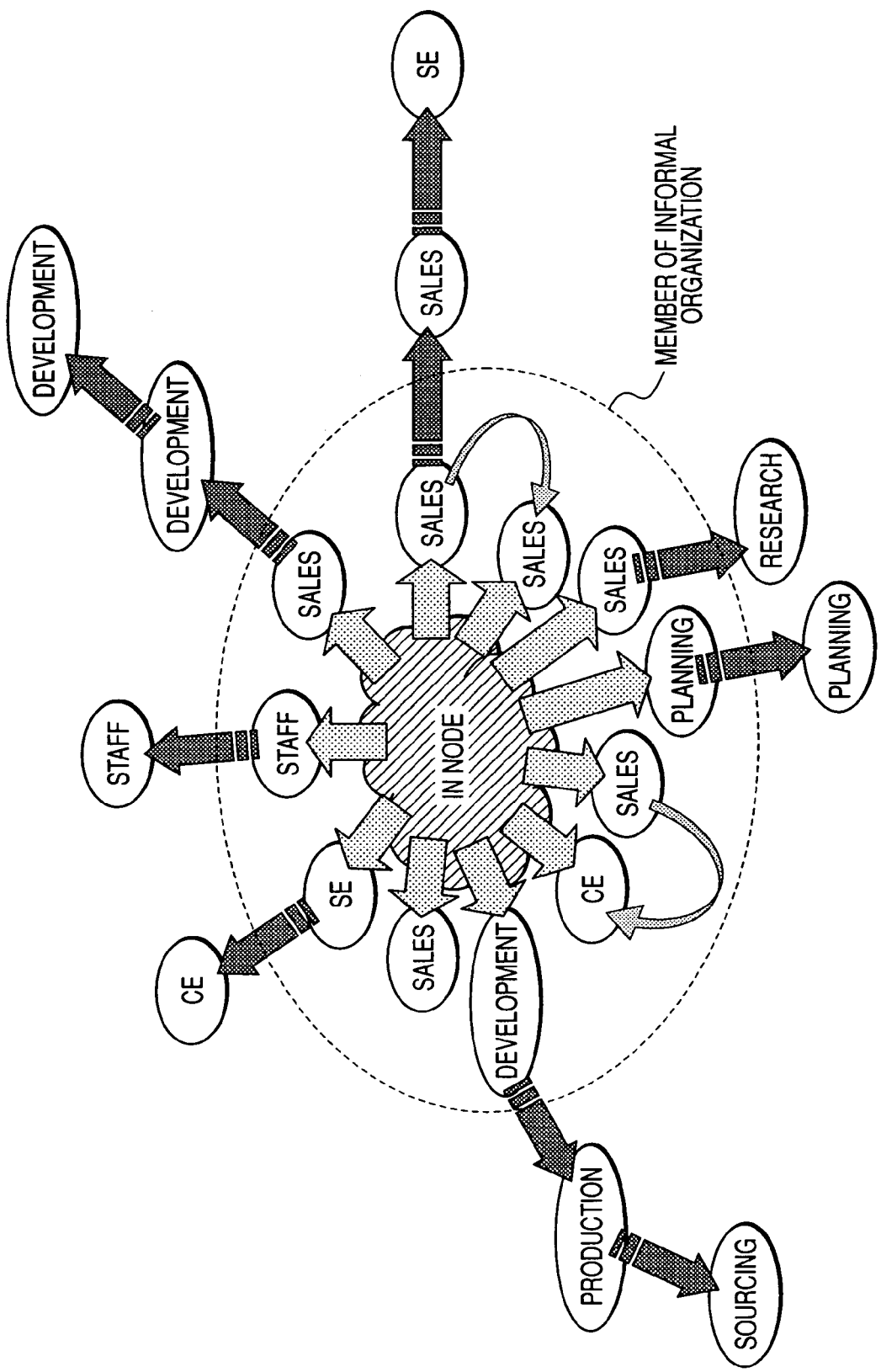
FIG. 18B is a view illustrating an embodiment of flow of information using communication information among units after adding classification result.
Figure 19:
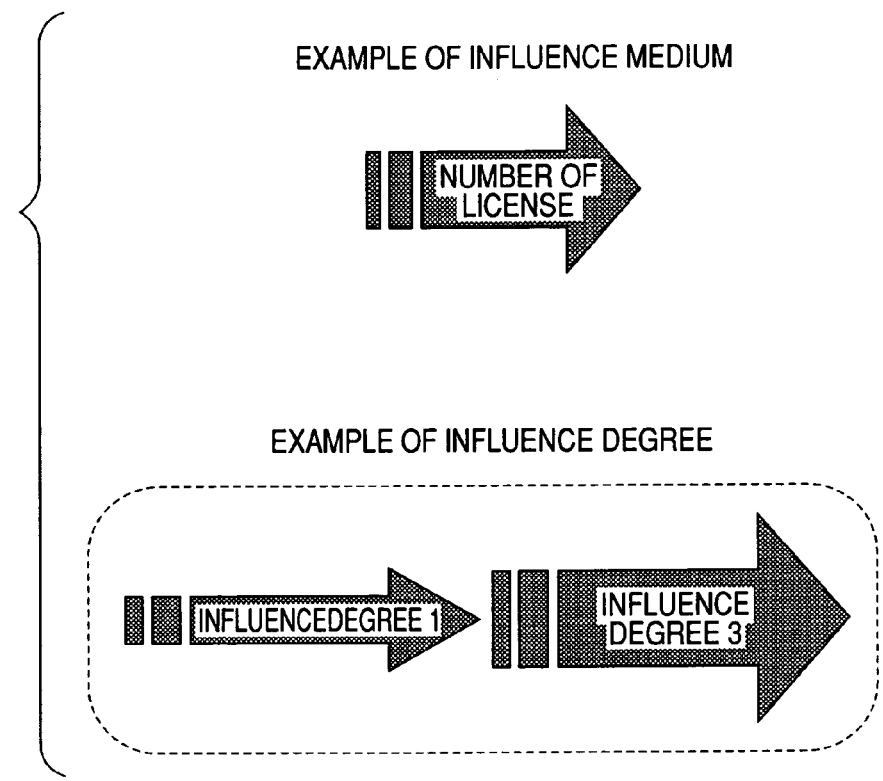
FIG. 19 is a view illustrating an embodiment for writing influence degree and influence mediums in flow of information.

When focusing on the kind of the occupation, as shown in FIG. 18A, the communication information according to the unit after classification table focused on occupation ID is created, and the information is classified and displayed as shown FIG. 18B based on the table. The chain of transmission of the information according to the same influence medium is displayed as chain of arrows. The arrows may be changed by corresponding to the classification or width of the line may be changed according to the influence degree as shown below of FIG. 19. In this embodiment, the widths of lines at the influence degree 1 and the influence degree 3 are different from each other. As shown above of FIG. 19, the influence medium may be written on the arrows. In this embodiment, 'number of license' means the influence medium. While being displayed in the line, the influence medium may be written near the arrows. Likewise, the member of 'the informal organization', as shown in FIG. 17B and FIG. 18B, is closed by dotted lines. Other symbols, colors, and litter strings may be used for representing the member of 'the informal organization'.

[Example Using Questionnaire Analysis]

Hereinafter, a method for specifying and classifying 'the flow of the information outside of the informal organization' derived from 'the informal organization' by analyzing the questionnaire is explained.

First, the questionnaire is analyzed corresponding to a member registered in 'the informal organization'. It is questioned how the corresponding member uses the information, which is acquired from 'the informal organization', outside of 'the informal organization', and the information is specified and classified as 'the flow of the information outside of the informal organization'. The influence of 'the flow of the information outside of the informal organization' may be specified in detail by asking a reason of the utilization, transmission, or the individual communication, and result according to the activity in addition to the above basic question The questionnaire may be executed by a web questionnaire system or a paper (the embodiment of the form does not matter)

First, the questionnaire is analyzed corresponding to a member registered in 'the informal organization'. It is questioned how the corresponding member uses the information, which is acquired from 'the informal organization', outside of 'the informal organization', and the information is specified and classified as 'the flow of the information outside of the informal organization' (answered result table 410). Basic attributes of answerers (the included organization, the kind of occupation, the job class, the age, the sex, and the number of worked years) may be referred to the database of the individuals or the organizations or asked by the questionnaire.

The 'flow of the information outside of the informal organization' is classified according to below questions (indispensable).

(1) An example of the utilization: 'Have you ever used the information got from the informal organization?';

(2) An example of the transmission 'Have you ever consulted the information got from the informal organization with someone or transmitted the information to someone else in outside of the informal organization?';

(3) An example of the individual communication: 'Have you ever individually made a contact with someone who sent something to the informal organization about the information got from the informal organization?'.

The questions (indispensable) corresponding to the object (influence medium) and frequency of the utilization, the transmission, and the individual communication includes following.

(1) 'What (informal) information did you utilize, transmit, and individually communicate?' The other side also may be asked about the transmission and the individual communication (indispensable).

(2) 'With whom did you transmit and individually communicate?' As the result of the utilization, the transmission, and the individual communication, who gets what kind of the influence may be questioned (option). In case that the person, whom the information is transmitted to, is not included in the member of 'the informal organization', asking the questionnaire to the person enables to trace the chain of the information in 'the flow of the information outside of the informal organization'.

(3) 'About the information received from the member A of 'the informal organization', did you utilize, transmit, or individually communicate to the person who sent the information, and so on.

Figure 21:
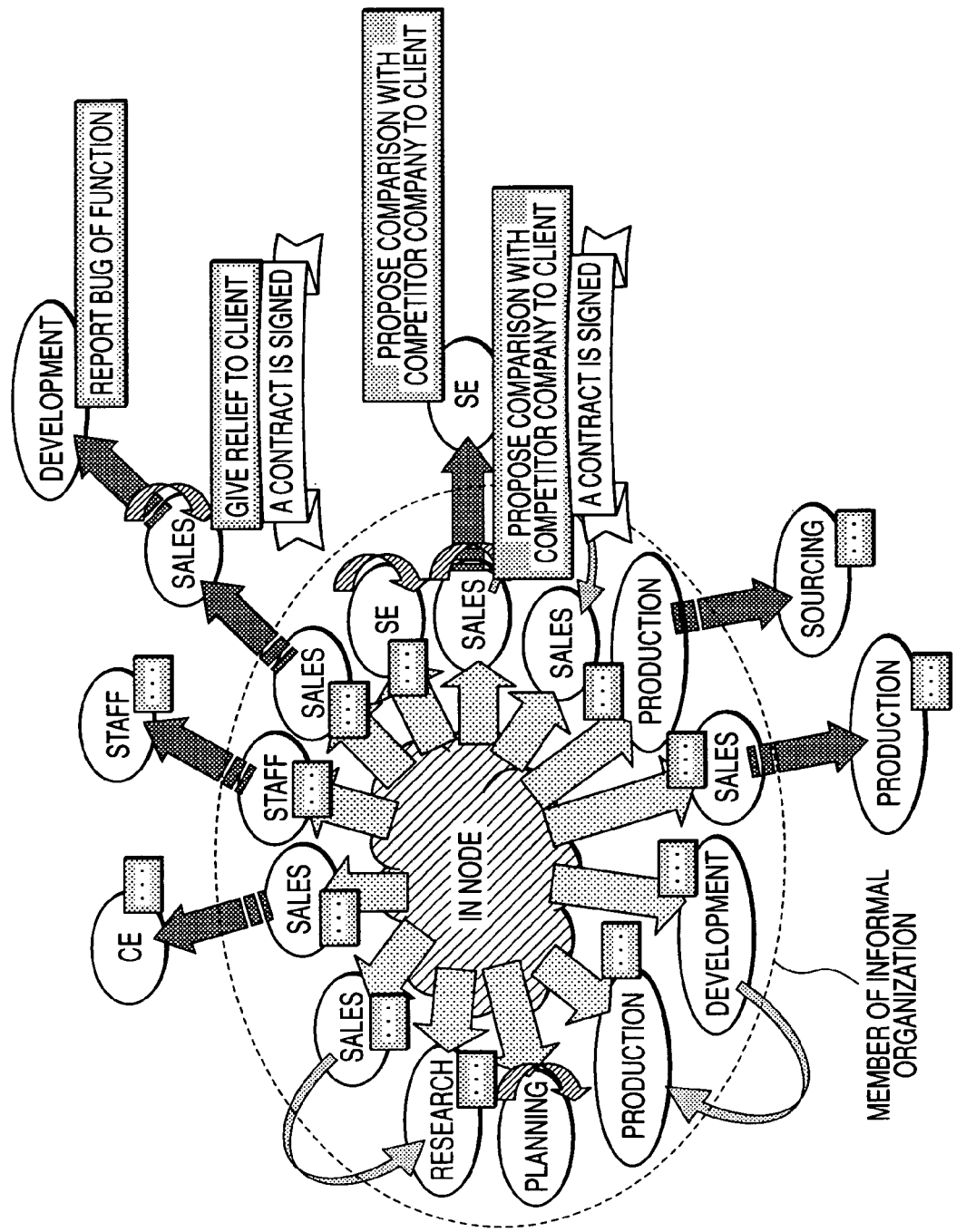
FIG. 21 is a view illustrating an embodiment of questionnaire result table and flow of information using the questionnaire result table.

'The flow of the information outside of the informal organization' may be visualized based on the answered result table 410 of the questionnaire as shown in FIG. 21.

FIG. 22 shows examples of visualization of 'the flow of the information outside of the informal organization'. As shown in FIG. 22, the information in 'the flow of the information outside of the informal organization' may be classified and visualized by using various component materials. The flow of the information corresponding to the classification is displayed with different color, different arrows, or a series of chains such that the flow of the information and the influence according to the flow may be understood at one view.

Algorithm of each allocation, generally, centers 'the informal organization', allocates the person organization node in radial shape ordered by attribute like time, and displays the flow of the associated information. The allocation of the nodes and arcs may use the conventional arrangement algorithm based on the graph theory or the spring model.

For example, a method for allocating the nodes and the arcs may use a public technology written in following document. JP-A-1993-61984 includes an example that shows a directed graph allocating minimally the summation of link length by neural network. Japanese Patent No. 3088253 explains a method for describing a network view corresponding to large amount of data and a method for easy understanding by centering groups of high density nodes. Japanese Patent No. 3506922 explains a method for displaying a graphic symbol of data having parent-child relation. JP-A-2003-16465 explains a method for rearrangement using the spring model when representing the hierarchical graph data.

The human or the organization to be an object of the log analysis or questionnaire analysis is optional. For example, they may be limited to the person and the organization which can access 'the informal organization' or may includes a person included in the same organization (upper level) of the accessible person. In the case of a business organization, all employees (all organizations) may be the object.

In case that the object of analysis includes with the exception of the human or organization capable of accessing 'the informal organization' in the questionnaire analysis, the next human or organization to be asked the questionnaire may be specified and the 'utilization', 'transmission', and the 'individual communication' of the information at 'the flow of the information outside of the informal organization' may be specified with the same way according to the question about a human or organization to whom the human or organization transmits the information in 'the flow of the information outside of the informal organization'. The analysis may be performed in more various areas by linking the questions.

The log analysis may be combined with the questionnaire analysis. For example, the classification for utilizing as 'the flow of the information outside of the informal organization' in log analysis may not be performed. Also the 'practice (practical activity)' of the 'transmission' and 'individual communication' or the result of the practice may not be understood. The questionnaire for the human or organization specified and classified in the log analysis may be performed in order to make a data structure before the visualization by asking if the human or organization utilized the information or asking the effect thereof.

In the case of the various practices performed by same human or organization, the practices may be written as other human organization nodes. Otherwise, the various practices may be written (listed) beside of the human organization nodes.

The width, shape, and color of the lines between the 'IN node' and 'human organization node', or between the 'human organization nodes' may be changed according to the frequency.

The shape of the 'human organization node' may be changed by the scale or frequency of the economical value of accompanying events. The displaying size or color of the 'human organization node' which shows accompanying events may also be changed.

The shape of the 'IN node' may be, for example, a circle graph by a condition (percentage of remark or answer from the organization, occupation kind, and job class) of 'the informal organization' or by percentage of the classification of 'the flow of the information outside of the informal organization' extracted from 'the informal organization'.

The 'flow of the information outside of the informal organization' allocated in a radial shape from the 'IN node' may be displayed by collecting (establishing) each classification (utilization, transmission, individual communication).

[Detailed Explanation of Analysis and Visualization of Relationship Between 'Formal Organization Structure' and 'Informal Organization']

Hereinafter, the relationship between 'formal organization structure' and 'informal organization' is analyzed and visualized.

[Example of Component Material and Visualization of 'Formal Organization Structure']

Figure 23:
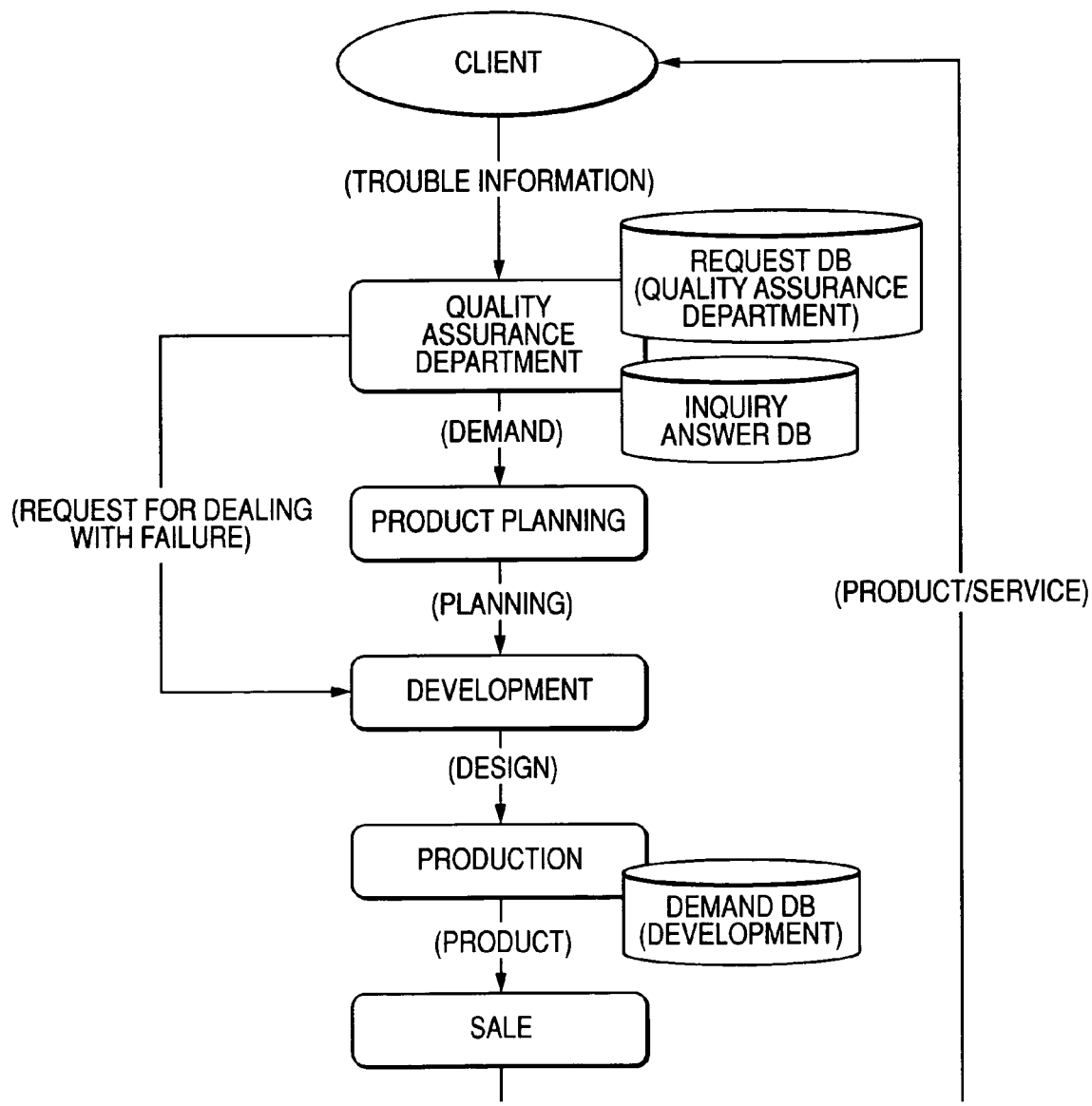
FIG. 23 is a view illustrating a process chart as a 'formal organization structure'.
Figure 24:
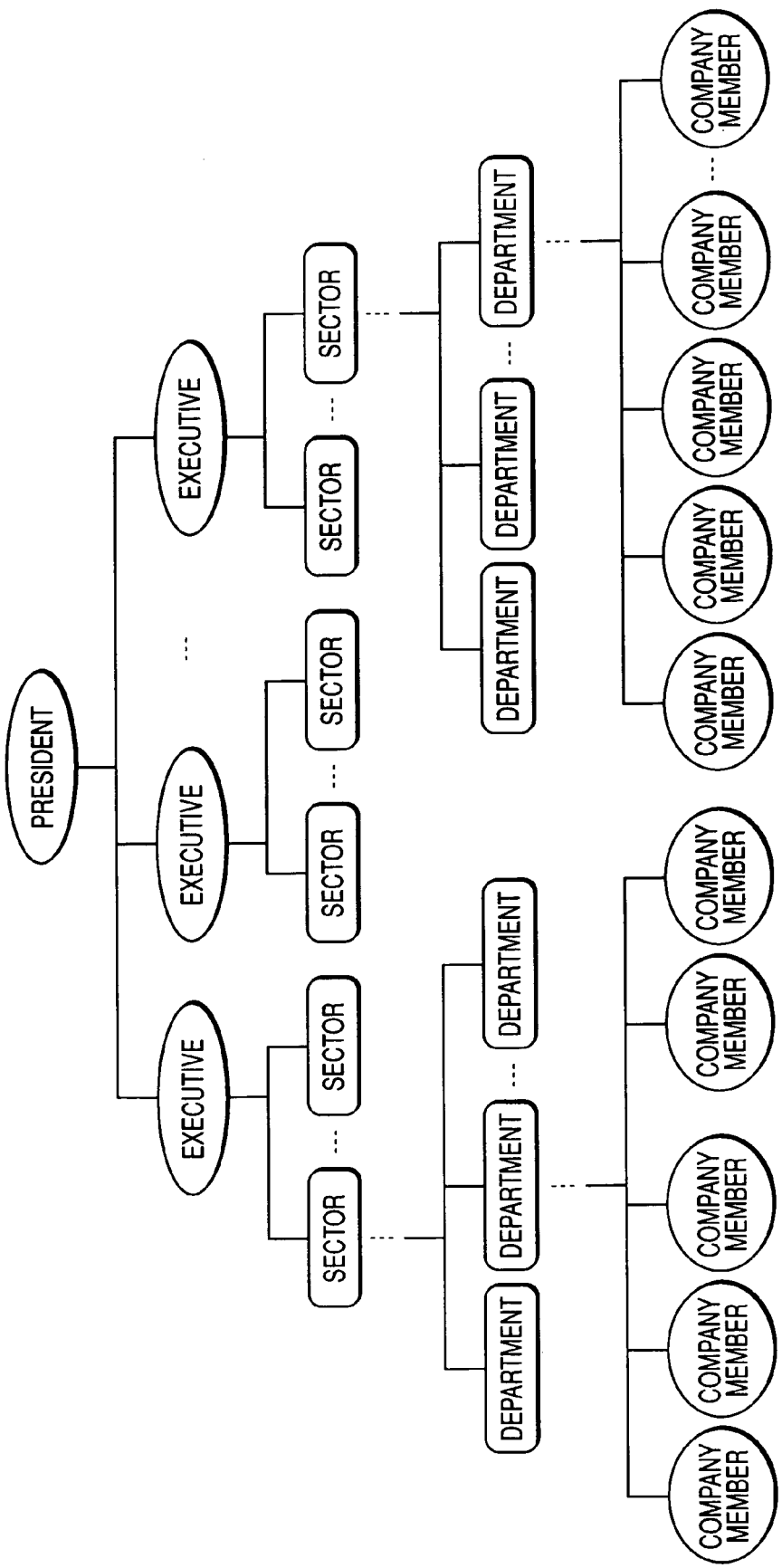
FIG. 24 is a view illustrating an organizational chart as 'formal organization structure'.
Figures 25, 26A:
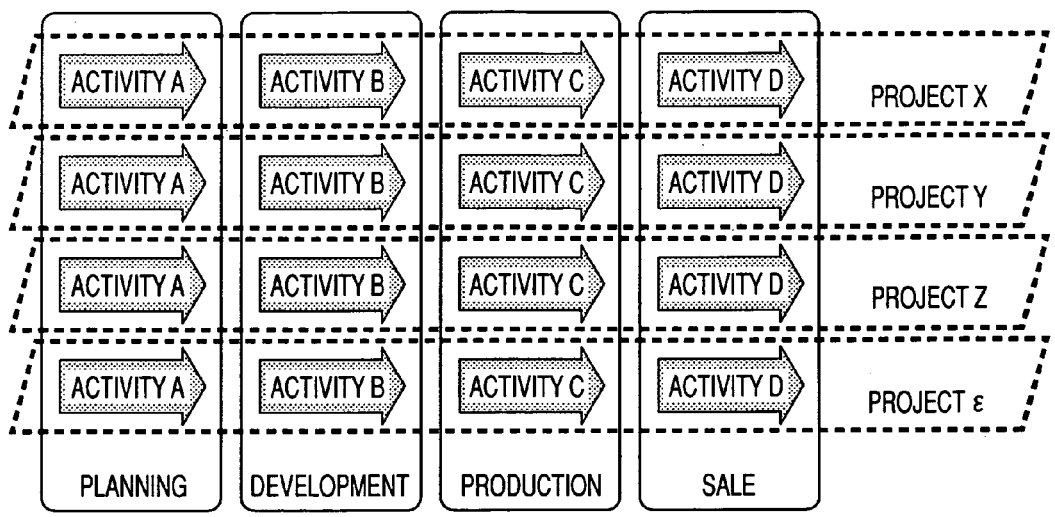
FIG. 25 is a view illustrating a matrix type organization as a 'formal organization structure'.
FIG. 26A is a view illustrating an embodiment of a process chart displayed based on an organization information table.

The visualization of the 'formal organization structure' may be anything which shows the structure and relation among the units, in which the information flows, such as the process, organizational chart, and matrix type organization (projects and functional organizations are displayed on grids of the network). FIG. 23 shows an example of the process. FIG. 24 shows an example of the organizational chart. FIG. 25 shows an example of the matrix type organization.

Figure 26B:
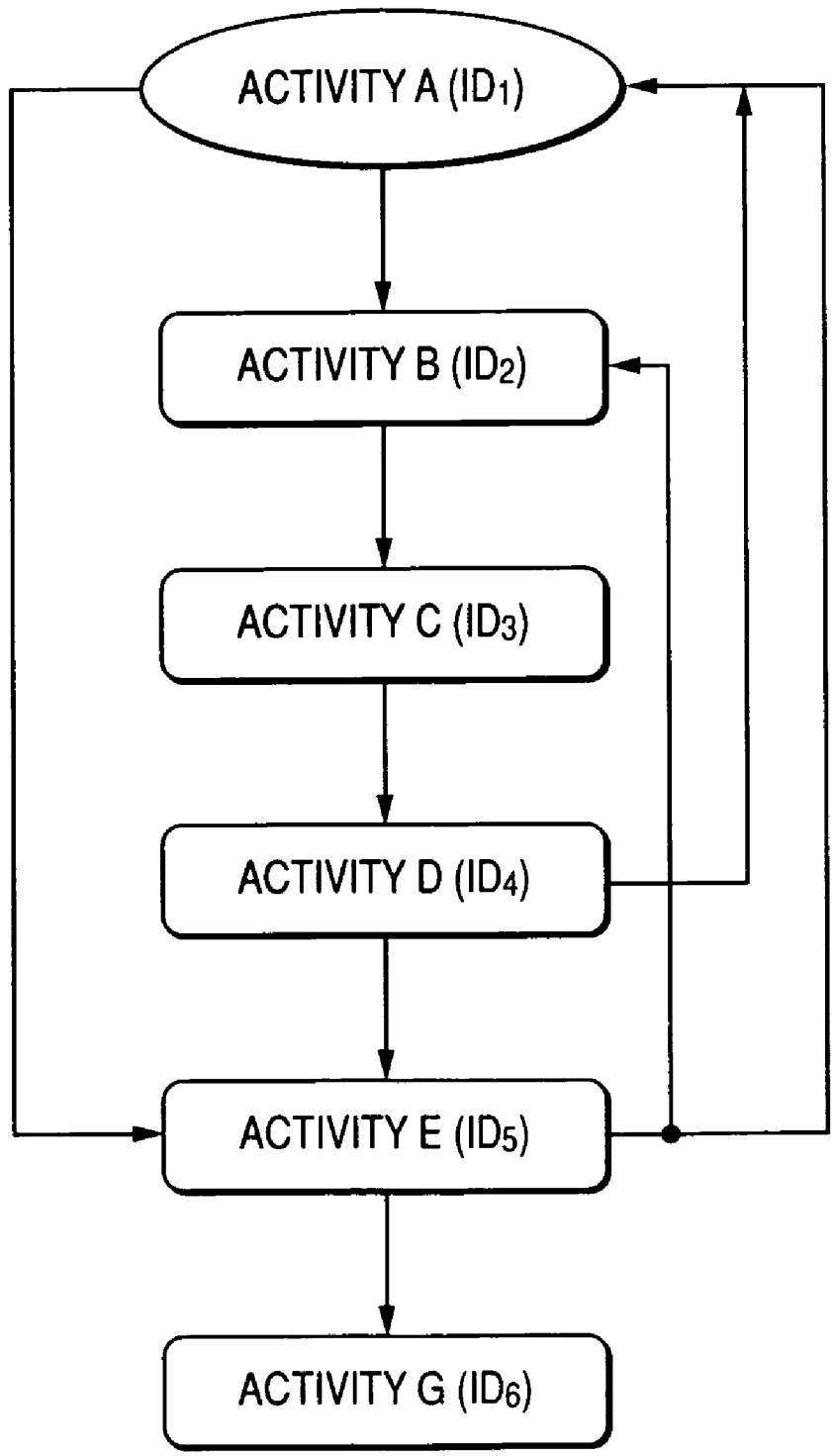
FIG. 26B is a view illustrating an embodiment of a process chart based on an organization information table.

The process chart (workflow chart), as shown in FIG. 26A, of an organization information table 412 (acquired from person organization database 108 in FIG. 3) includes an activity ID, corresponding activity ID (with a direction), and individual ID corresponding to the activity (identifying with the individual ID of individual database). FIG. 26B is displayed based on the organization information table 412.

Figure 27B:
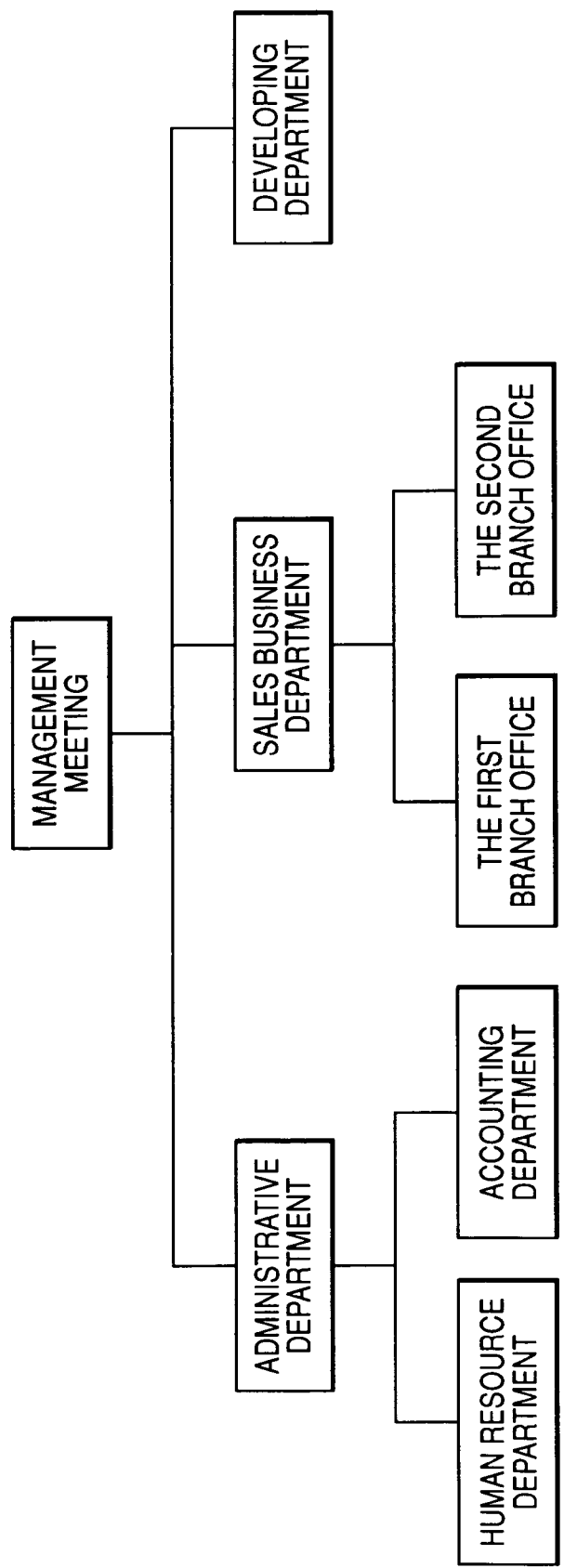
FIG. 27B is a view illustrating an embodiment of an organizational chart based on an organization information table.

The organizational chart is displayed as shown in FIG. 27B based on an organization information table 413 as shown in FIG. 27A (acquired from person organization database 108 in FIG. 3). A form of the organization information does not need to be one kind and may be divided, for example, a name of the organization and the organization ID, the organization ID and parent organization information, and the organization ID and member information. Generally, the organization chart has a tree structure and the number of the parent organization is almost 1. In the present invention, the number of the parent organization may be determined so as to construct the complicated relation of the organization. Also, the information related to the child organization may be added not only the parent organization.

Figure 28B:
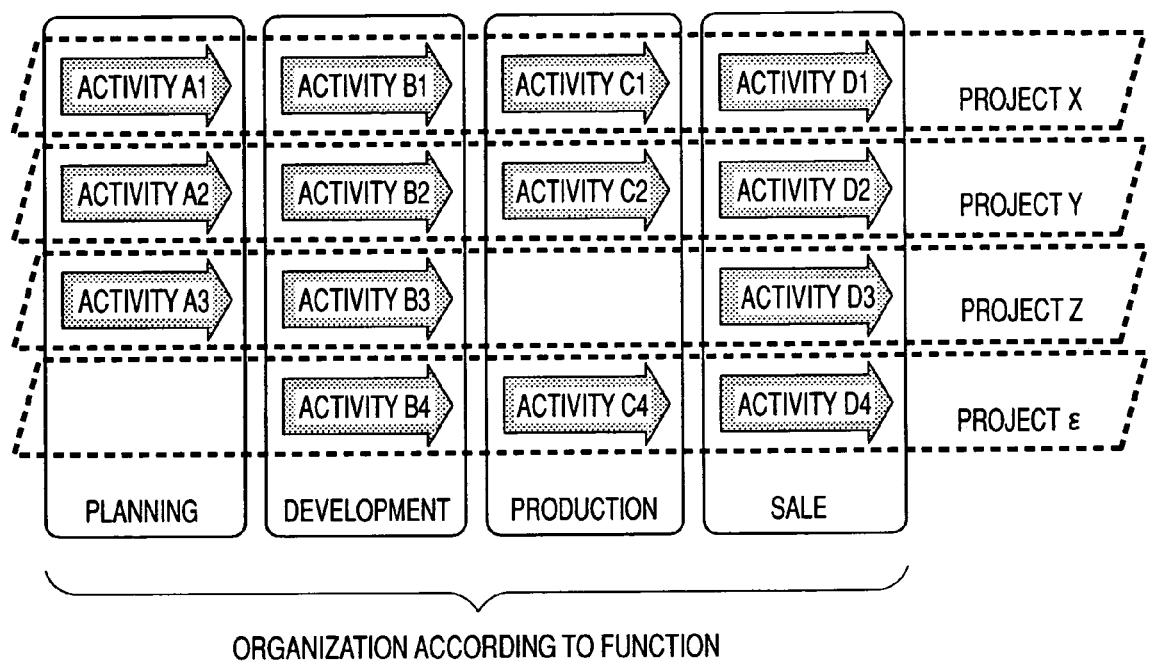
FIG. 28B is a view illustrating an embodiment of a matrix type organization based on an organization information table.

The matrix type organization is displayed as shown FIG. 28B based on an organization information table 414 as shown in FIG. 28A (acquired from person organization database 108 in FIG. 3).

Figure 29:
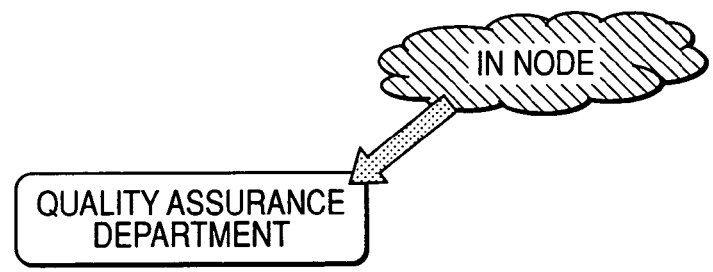
FIG. 29 is a view illustrating an embodiment of relationship between 'informal organization' and component material of 'formal organization structure'.
Figure 30:
FIG. 30 is a view illustrating another embodiment of relationship between 'informal organization' and component material of 'formal organization structure'.
Figure 31:
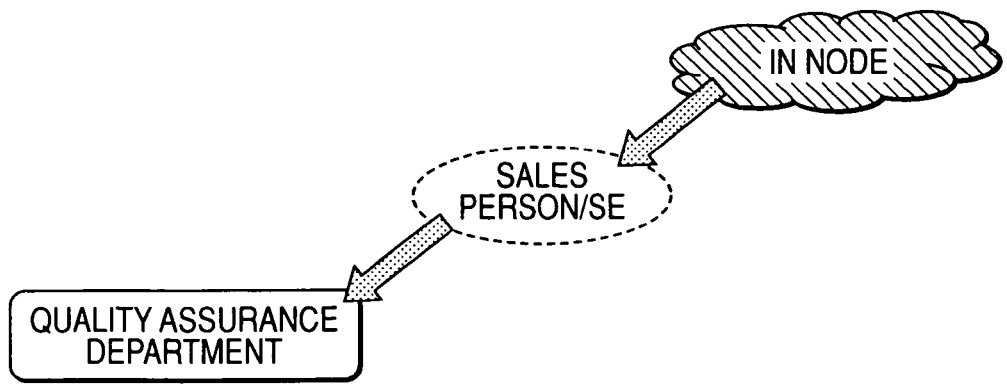
FIG. 31 is a view illustrating another embodiment of relationship between 'informal organization' and component material of 'formal organization structure'.
Figure 32:
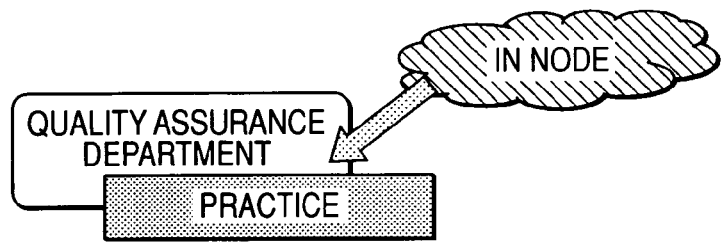
FIG. 32 is a view illustrating another embodiment of relationship between 'informal organization' and component material of 'formal organization structure'.
Figure 33:
FIG. 33 is a view illustrating another embodiment of relationship between 'informal organization' and component material of 'formal organization structure'.
Figure 34:
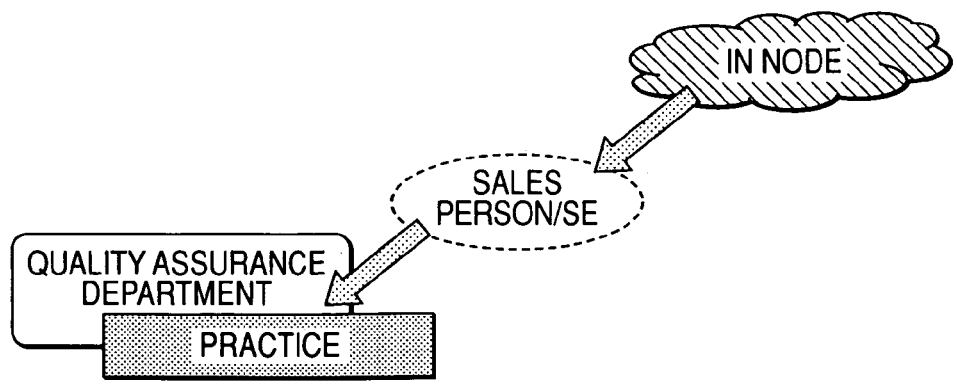
FIG. 34 is a view illustrating another embodiment of relationship between 'informal organization' and component material of 'formal organization structure'.

FIG. 29 to FIG. 34 show an example of the visualization of each expressed component material. FIG. 29 shows an example of the relationship between the component material of 'the informal organization' and the component material of the 'formal organization structure'. FIG. 30 shows an example showing the relationship between the component material of 'the informal organization' and the component material of the 'formal organization structure' (an example including the member of the 'formal organization structure'). FIG. 31 shows an example of the relationship between the component material of 'the informal organization' and the component material of the 'formal organization structure' (an example including the human organization node). FIG. 32 shows an example in case that the information of 'the flow of the information outside of the informal organization' generates the practice in 'formal organization structure'. FIG. 33 shows an example in case that the information of 'the flow of the information outside of the informal organization' generates the practice in 'formal organization structure' (an example including the member of the 'formal organization structure'). FIG. 34 shows an example in case that the information of 'the flow of the information outside of the informal organization' generates the practice in 'formal organization structure' (an example including the human organization node).

[Method for Specifying 'Flow of Information on a Formal Organization Structure']

There are following two method for specifying 'the flow of information on a formal organization structure'. That is, one method is to understand the information flow in the 'formal organization structure' (process, relation among organizations (organizational chart), matrix type organization) from the conventional organization information. The other method is to understand the information flow in the 'formal organization structure' by analyzing the log or analyzing and evaluating the questionnaire. The second method uses the method included in JP-A-2004-252946.

For understanding the information being flown in the 'formal organization structure (process, relation among organizations (organizational chart), matrix type organization, and so on) from the conventional organization information, the representative information being flown in each component material (each activity in the case of the process, each organization in the case of the organizational chart, each functional organization and project in the case of the matrix type organization) written in a workflow (process) chart, information flow chart, conventional organizational chart, or the matrix type organizational chart defined in the ISO 9000 series.

An example of FIG. 35 shows well-known organization information related to the workflow (process) one of the 'formal organization structure'. From this well-known organization information, an activity (activity ID: stored in organization database) which is an component thereof is specified, and the information of 'the flow of the information on the formal organization structure' being flown among the activities are specified as shown in FIG. 36. It is desired to describe 'the flow of the information on the formal organization structure' corresponding to each component material by a same method in the relationship between the organizations (organizational chart) and the matrix type organization.

Figure 37A:
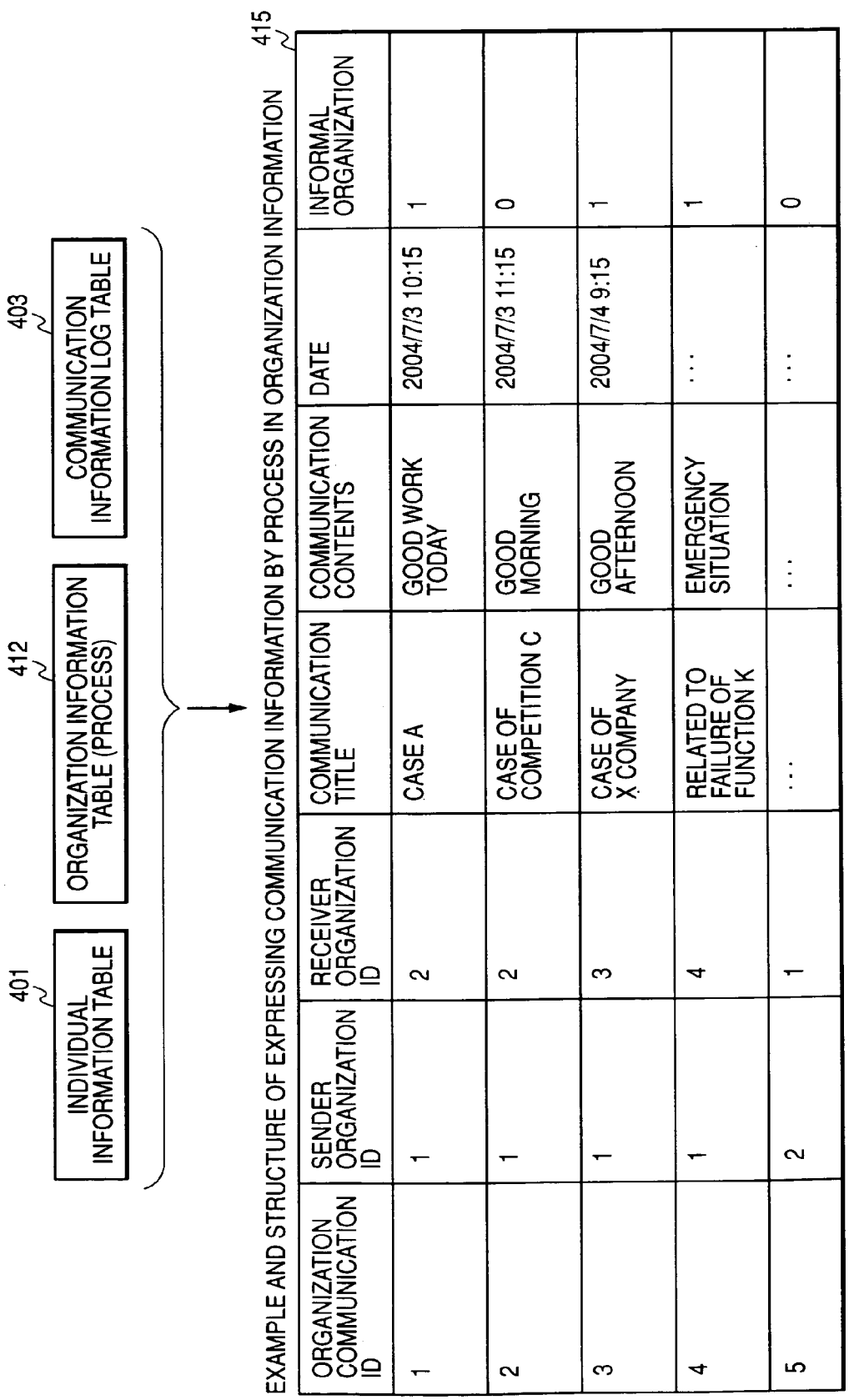
FIG. 37A is a view illustrating a method for acquiring information among process activities in order to specify information being flown process chart of 'formal organization structure' using log information.

An organization information table 412 (FIG. 37B, acquired from the person organization database 108 of FIG. 3) is used, as shown in FIG. 37A, in order to understand the information being flown in the 'formal organization structure' by analyzing the log or analyzing and evaluating the questionnaire. While this example is related to process as a 'formal organization structure', tables 413 or 414 may be used according to a kind of the 'formal organization structure'. The organization information table 412 of the process includes correspondence of each component material of the organization information and a person, or the component material (group) related to the formal organization. An example of FIG. 37A includes 'activity ID2 as an activity related to the activity ID1', ' . . . ', ' . . . ', 'activity ID1, 2, 4 or the like' as an activity related to the activity ID5' (directed graph). Referring to FIG. 14 and FIG. 15, as a method for specifying and classifying the information of 'the flow of the information outside of the informal organization', the communication information (communication information table 415) among units (in this example, among activities of the process) of the component materials of organization information is calculated from the individual information table 401 (FIG. 14B), the organization information table 412, and the communication information log table 403 (FIG. 14D). For example, each activity receives an ID in the process, and information of the person related to the activity is stored in the organization information database (process). Accordingly, the information being flown in the corresponding activity may be specified.

Figure 38:
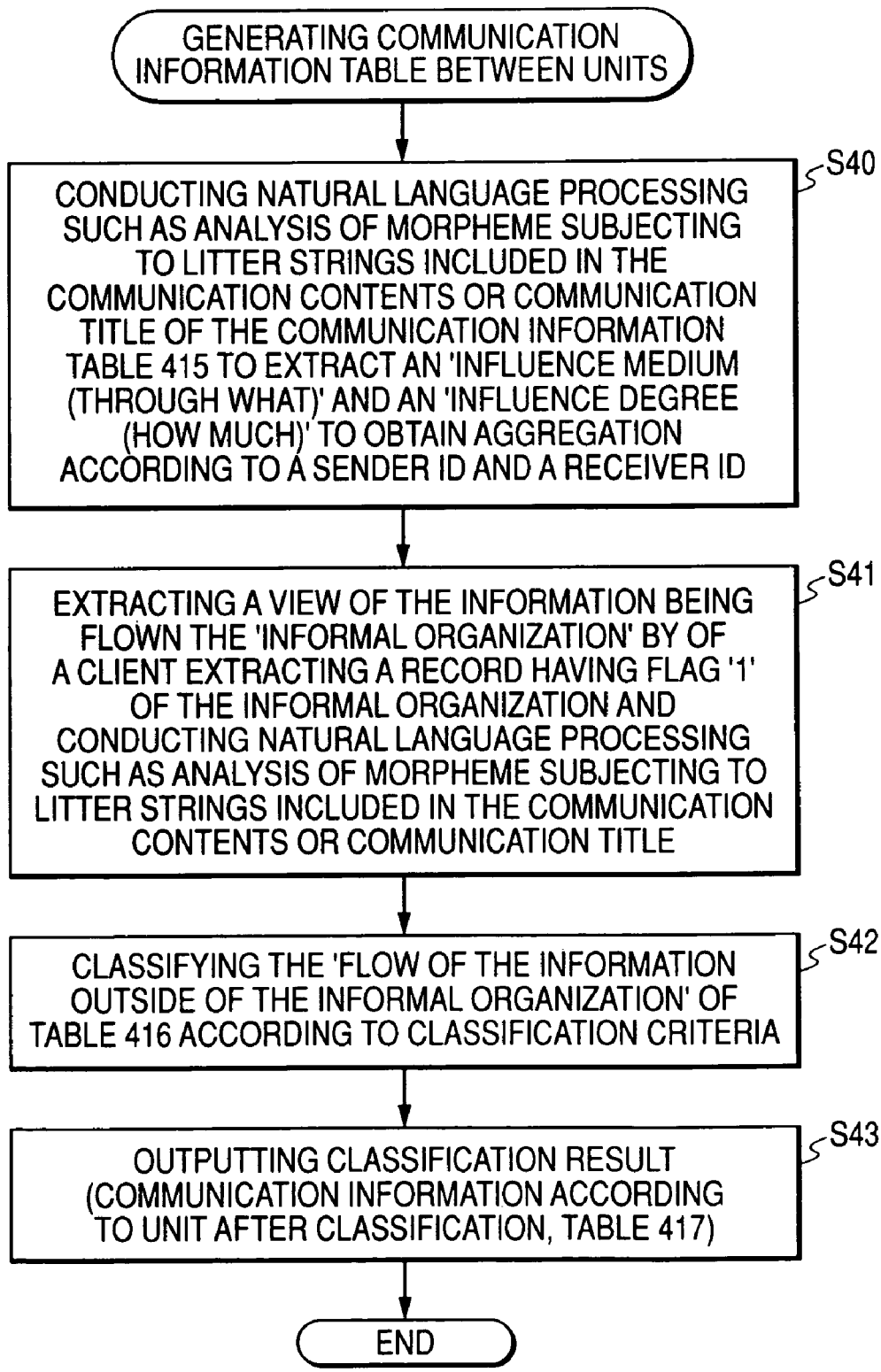
FIG. 38 is a view illustrating a method for classifying information among process activities on FIG. 37A.

As shown in FIG. 38, by applying the conventional natural language processing technique in the communication contents or the communication title of the communication information table 415, while defining the influence medium and the influence degree (S40), the list 407 of the information being flown in 'the informal organization' (FIG. 16B) is worked out (S41). According to a classification criteria 416 of the relationship between the 'formal organization structure' and 'the informal organization', as shown in FIG. 39A, the propagation of the information, as shown in FIG. 40A, is calculated as the communication information according to the unit (communication information table 417 according to a unit) (S42, S43) from the communication information such as the organization ID, the occupation type ID, and the job class ID. The communication information table 417 includes an information about the sender from whom the information is transmitted (a sender ID such as the organization ID, the occupation type ID, the job class ID, and so on), an information about the receiver to whom the information is transmitted (a receiver ID such as the organization ID, the occupation type ID, the job class ID, and so on), an influence medium, and the influence degree. An example of the information kind d1, d2, d3 of the classification criteria 416 in FIG. 39A is shown in FIG. 39B. In an example of FIG. 39B, information called 'demand to function z' from 'the informal organization' is supplied to the 'formal organization structure', and then supplied from a 'quality assurance' process to a 'product planning' process at the 'formal organization structure'.

Incase that the information in 'the flow of the information outside of the informal organization' is included in the flow of the information of the 'formal organization structure' if the 'formal organization structure' has a relation with 'the informal organization' (specification of information corresponding to d1 of FIG. 39A), '1' is written to a field of 'the information is flown from the informal organization?' at the communication information table 417 according to a unit in FIG. 40A. The sender activity ID has a blank (write '-') and the receiver activity ID has the activity ID of the receiver. And, a line is drawn from 'the informal organization' to corresponding component material of the 'formal organization structure' (activity in this example) so as to visualize the relation. And then, communication contents are written above the line (refer to FIG. 39B).

The relation showing the information in 'the flow of the information outside of the informal organization' is flown to the 'formal organization structure' may displayed by a line and the communicated contents may be written above the line (refer to FIG. 39B)

In the case of formal information of the 'formal organization structure' is flown (corresponding to d3 of FIG. 39A), a field of 'the information is flown from the informal organization?' at the communication information table 417 according to a unit (FIG. 40A) is to be a blank (write '-') Each activity ID is written in the sender activity ID and the receiver activity ID. The communicated contents are written in the relation of each component material of the 'formal organization structure' (refer to FIG. 39B).

Figure 40B:
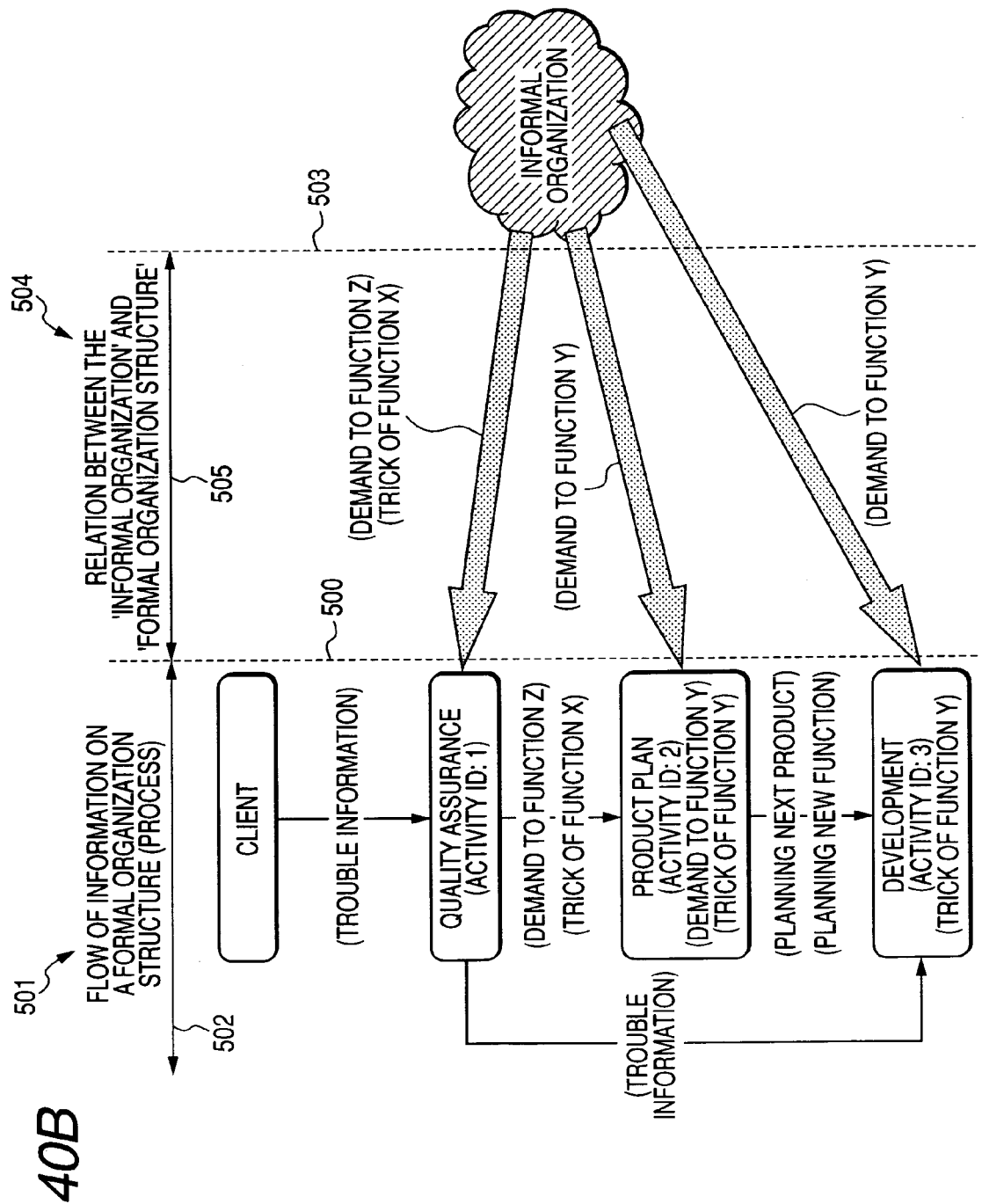
FIG. 40B is a view illustrating an embodiment displaying information which indicates finish of classification among process activities.

As explained above, the width of the line may be changed according to the influence degree. As shown in FIG. 40B, a line 500 (dotted line in this example), the letter strings 501, and the arrows 502 are drawn to separate 'the flow of the information on the formal organization structure', respectively. A boundary line 500, 503 (dotted line in this example), the letter strings 504, and arrows 505 may be drawn to show the relationship between 'the informal organization' and the 'formal organization structure'.

Figure 41B:
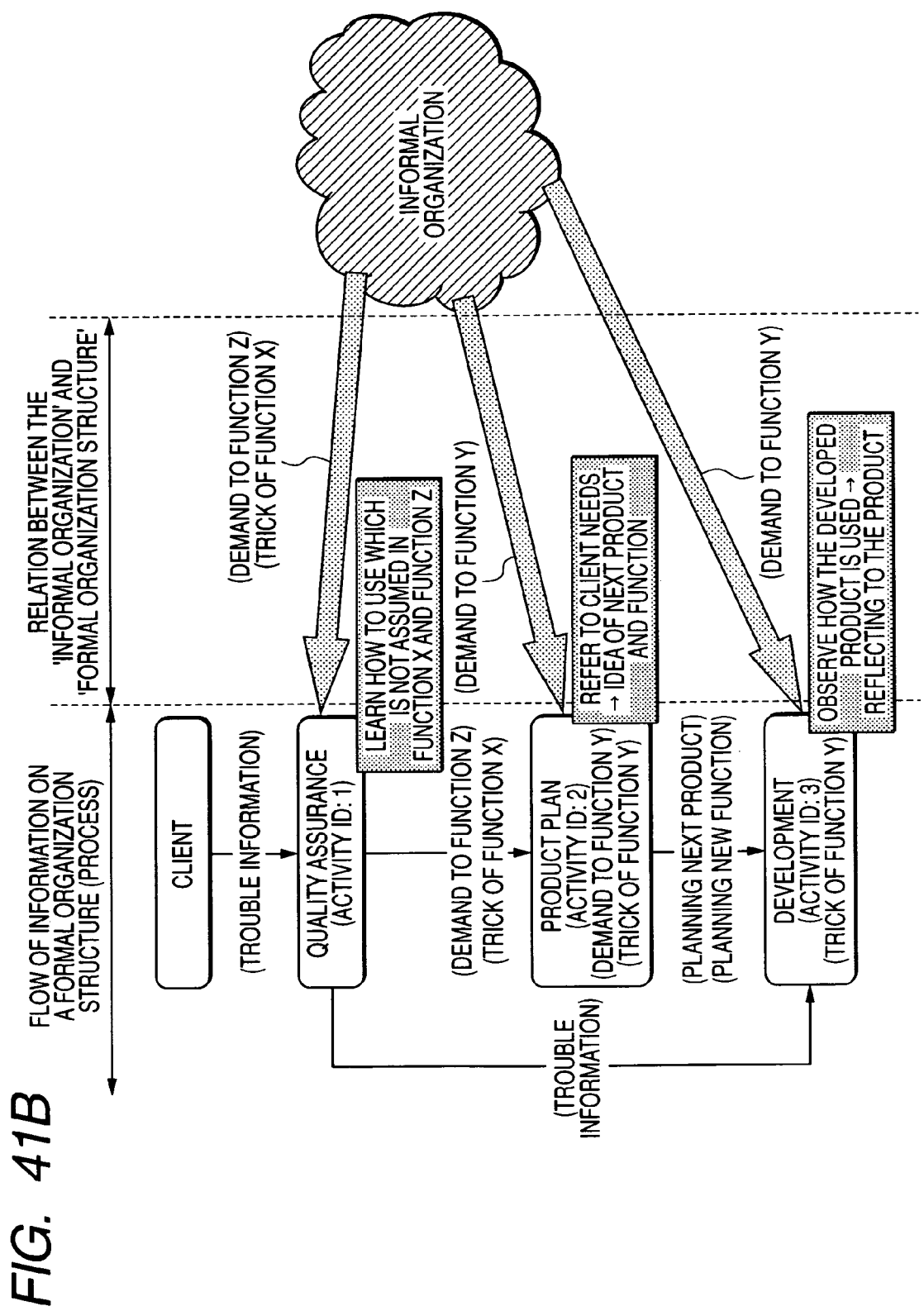
FIG. 41B is a view illustrating an embodiment using written information indicating finish of classification among process activities with 'practice' acquired from result of a questionnaire.

According to the analysis of the questionnaire, the practice generated in the 'formal organization structure' which used the information in 'the flow of the information outside of the informal organization' may be specified. The corresponding practice may be written in the communication information table 417 according to a unit in FIG. 40A. FIG. 41A shows a communication information table 418 according to a unit and FIG. 41B visualizes the communication information table 418 according to a unit.

In order to avoid complicated result of the visualization of 'the informal organization' and the 'formal organization structure', the member of the 'formal organization structure' may be displayed by a dotted ellipse as shown in FIG. 42. At that time, the boundary line (dotted line), the arrow, and the letter strings for showing the relationship between 'the informal organization' and the 'formal organization structure' may be overlapped on the ellipse nodes as shown in FIG. 42.

The information of 'the flow of the information outside of the informal organization' may be acquired through a person organization node 'sales person/SE' who is not a member of the 'formal organization structure' and may be transmitted to the 'formal organization' without acquiring the information of 'the flow of the information outside of the informal organization' by the member of the 'formal organization structure' directly from 'the informal organization' as the ellipse of the person organization node 'sales person/SE'.

The example of visualizing 'the formal organization structure' and 'the informal organization' is one embodiment of the present invention, and the present invention is not limited to the above embodiment. The person organization node connecting the information of 'the flow of the information outside of the informal organization' being flown in the component material of the 'formal organization structure' may be preferentially allocated in coordinates displayed by the 'formal organization structure'. The simplest example is displayed beside of the component material (anyone from right, left, up, or down). In case that the one information of 'the flow of the information outside of the informal organization' is flown in a plurality of component materials of the 'formal organization structure', the information may be connected with the person organization nodes corresponding to the component materials of 'the formal organization structure' by a plurality of lines. Or the information may be displayed by adding priority such as the relation with the component material of the 'formal organization structure' having highest frequency of 'the flow of the information outside of the informal organization'.

The person organization node may be allocated beside of the component material of the 'formal organization structure' having the highest frequency, or may be allocated according to the difference of the frequency.

Not only analyzing and displaying the organization which is actually running, the information which is not flown or hard to be flown on the 'formal organization' necessary for smoothly performing operations after designing and installing 'the informal organization' is examined to expose a desired 'informal organization' and input a desired component material of 'the formal organization structure'. It may be applied to a designing and installing device (editor) of 'the informal organization'.

It is possible to determine if the 'informal organization structure' is pertinently operated or if merit or demerit which is not expected is generated while comparing the evaluated result to the contents, structure, or amount of the information being flown when actually setting 'the informal organization'.

[Integrated Analysis and Visualization]

The influence of the information of 'the flow of the information outside of the informal organization' may be displayed in the same time of classifying and visualizing 'the flow of the information outside of the informal organization'.

Figure 43:
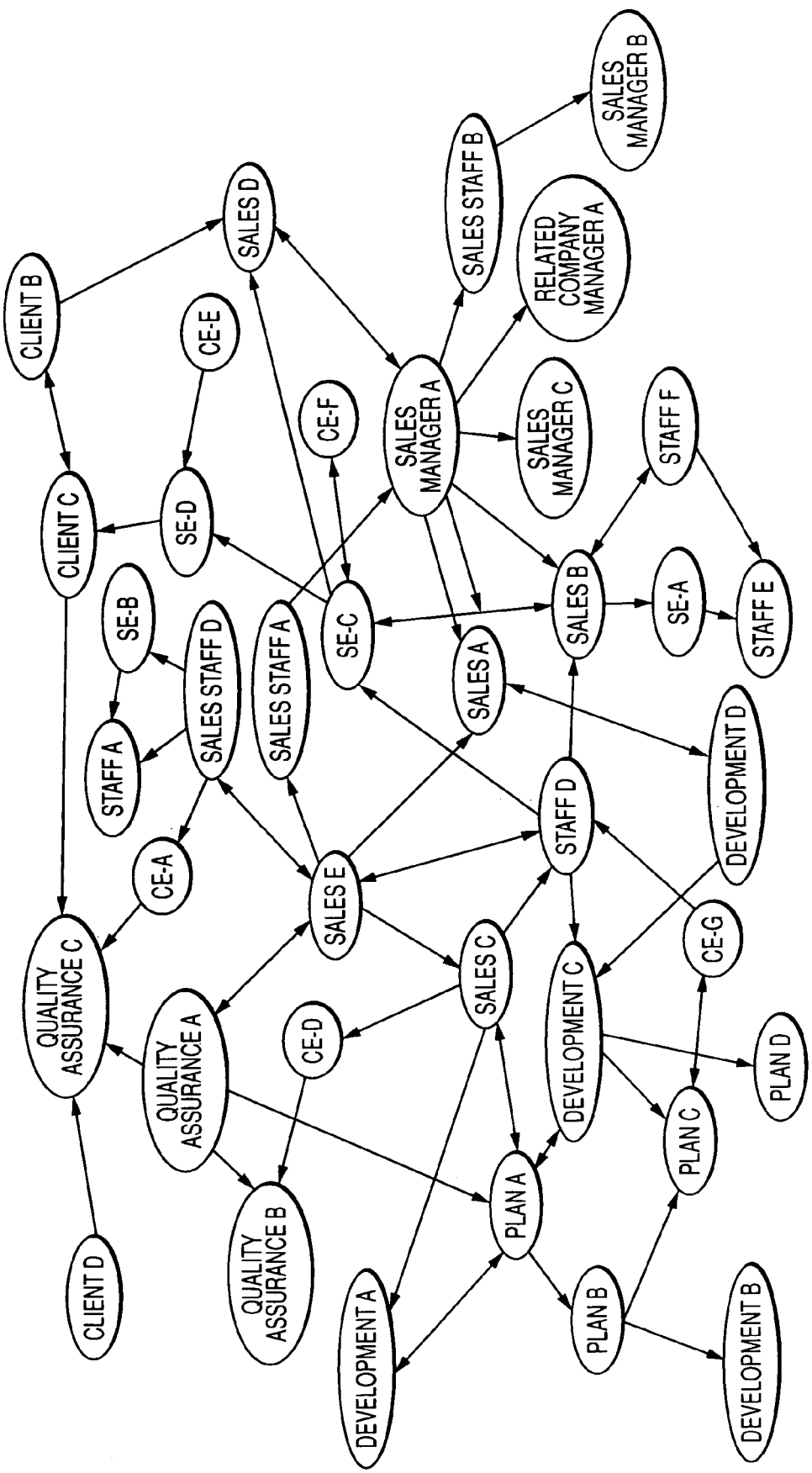
FIG. 43 is a view illustrating an embodiment visualizing flow of information using a conventional method.

FIG. 43 is an embodiment using the conventional method. In FIG. 43, it is not possible to understand the 'formal organization structure'. Because that 'the flow of the information on the informal organization' is not separated from 'the flow of the information outside of the informal organization' of the information at 'the informal organization', the influence and a role of 'the informal organization' is not understood. Also, the relationship between 'the informal organization' and the 'formal organization structure' is hidden. The interpretation for the flow of the information is difficult, the effect acquired from the flow of the information is not understood, and the chart is getting complicated if the nodes increase.

Figure 44:
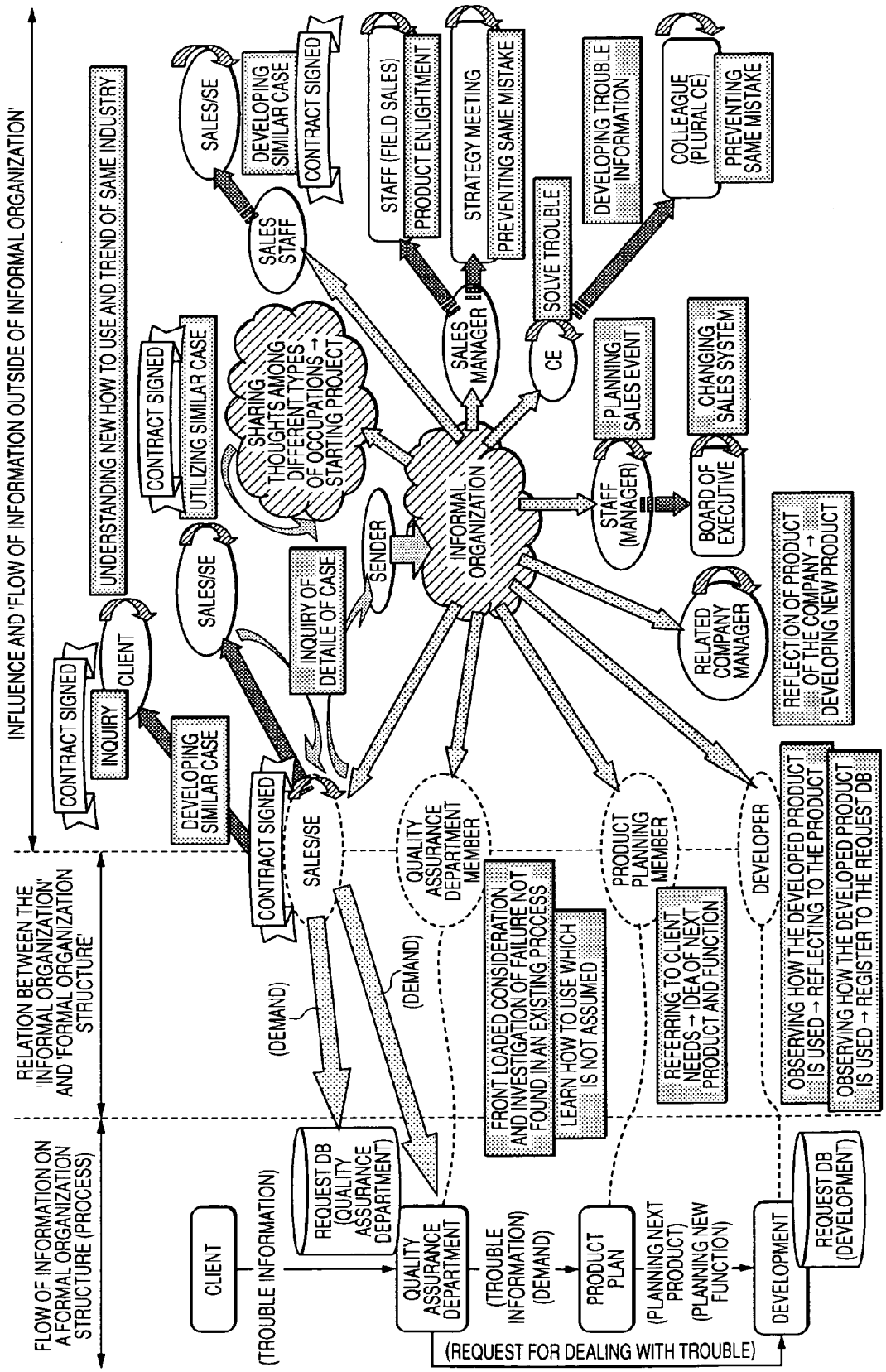
FIG. 44 is a view illustrating an embodiment classifying and visualizing 'flow of information outside of informal organization' while displaying influence according to the information in 'the flow of information outside of informal organization' to 'formal organization structure' by focusing on process.

FIG. 44 is focused on the process. The 'flow of the information outside of the informal organization' of the information of 'the informal organization' is classified and visualized. At the same time it is shown how the information on 'the flow of the information outside of the informal organization' being flown on 'the informal organization' has influence on the 'formal organization structure'. As shown in FIG. 44, the boundary line (dotted line), the arrows, and the letter strings may be used for displaying 'the flow of the information on the formal organization structure', the relationship between 'the informal organization' and the 'formal organization structure', and 'the flow of the information outside of the informal organization'.

Figure 45:
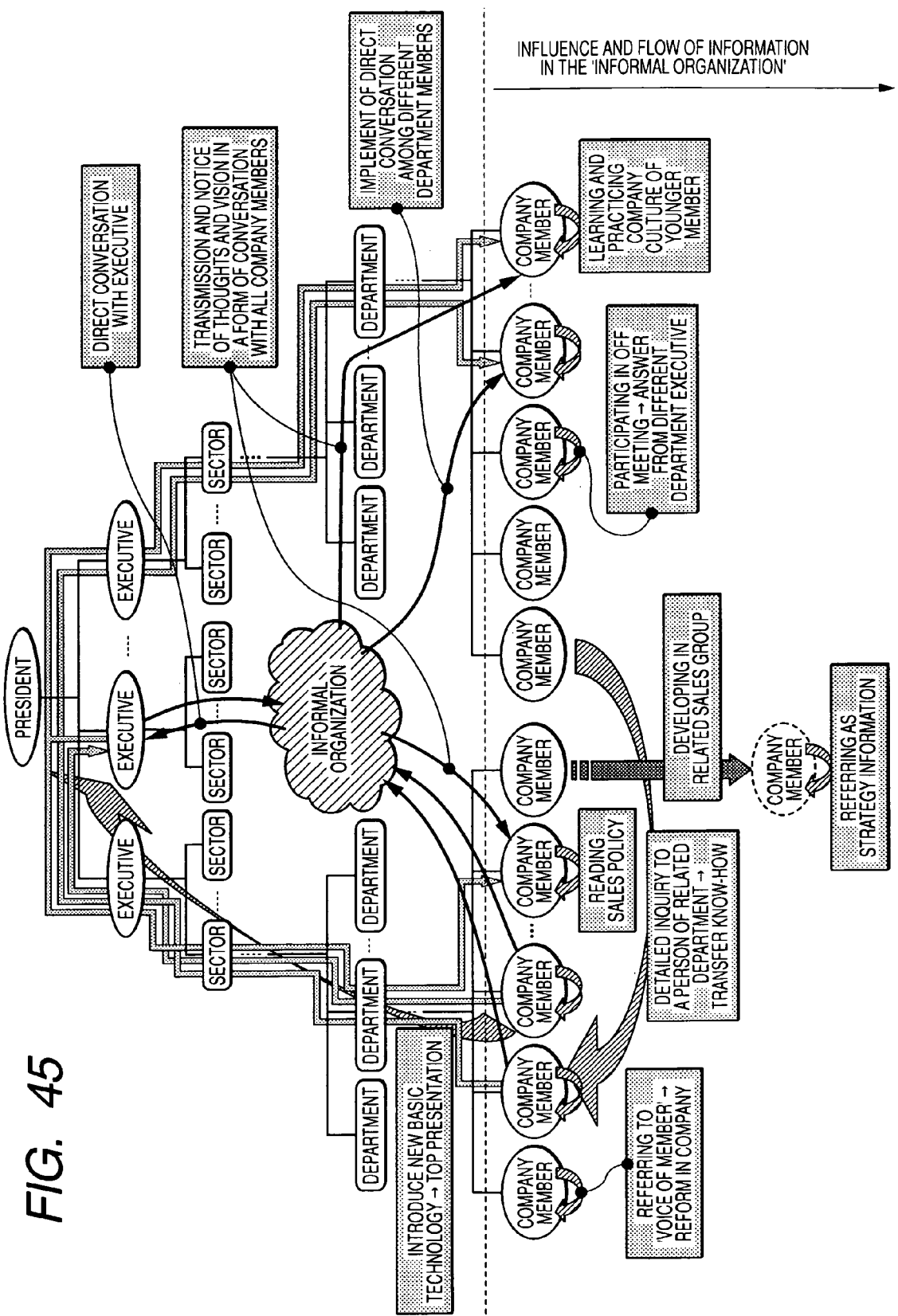
FIG. 45 is a view illustrating an embodiment classifying and visualizing 'flow of information outside of informal organization' while displaying influence according to the information in 'the flow of information outside of informal organization' to 'formal organization structure' by focusing on an organizational chart.

FIG. 45 focused on the organizational chart. The 'flow of the information outside of the informal organization' of the information of 'the informal organization' is classified and visualized. At the same time, it is shown how the information on 'the flow of the information outside of the informal organization' being flown on 'the informal organization' has influence on the 'formal organization structure'.

Figure 46:
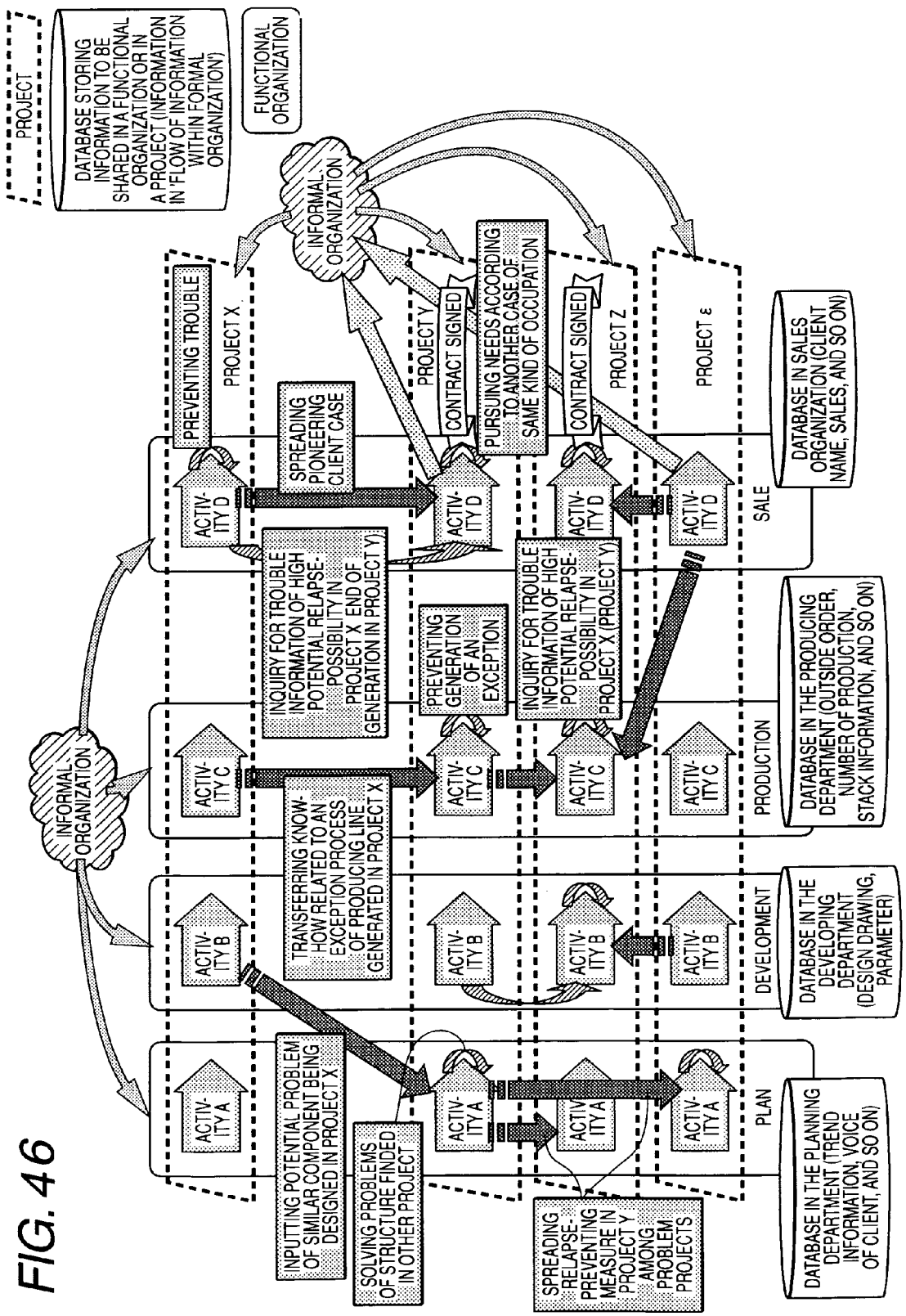
FIG. 46 is a view illustrating an embodiment classifying and visualizing 'flow of information outside of informal organization' while displaying influence according to the information in 'the flow of information outside of informal organization' to 'formal organization structure' by focusing on a matrix type organization.

FIG. 46 focused on the matrix type organization. The 'flow of the information outside of the informal organization' of the information of 'the informal organization' is classified and visualized. At the same time, it is shown how the information on 'the flow of the information outside of the informal organization' being flown on 'the informal organization' has influence on the 'formal organization structure'.

As above, by classifying and visualizing 'the flow of the information outside of the informal organization' of the information of 'the informal organization' and displaying the influence according to the information on 'the flow of the information outside of the informal organization' being flown on 'the informal organization' affecting the 'formal organization structure', the 'formal organization structure' may be easily understood. Also the effect and the role of 'the informal organization' may be cleared because that 'the flow of the information on the informal organization' may be separated from 'the flow of the information outside of the informal organization'. In addition, the relationship between 'the informal organization' and 'formal organization structure' is easily understood. The flow of the information is easily interpreted and the effect acquired by the flow of the information may be recognized, and the chart is not extremely complicated though the nodes increase.

What is claimed is:

1. An apparatus comprising:
a processor; and
a usage condition displaying unit, wherein
the apparatus analyzes and displays a usage condition that corresponds to a piece of information which was transmitted within a mailing list to be evaluated, and indicates how the piece of information is used outside the mailing list,
the processor includes a usage condition collecting unit that acquires usage condition information as to each usage condition and stores said usage condition information in a memory,
the usage condition displaying unit displays the usage conditions based on the usage condition information,
the usage condition displaying unit expresses, as nodes, (a) the mailing list to be evaluated, (b) transmitting sources that transmit the information within the mailing list to be evaluated, and (c) individual communicating units that each receive the information via the mailing list and individually communicate with a corresponding one of the transmitting sources,
the usage condition displaying unit displays the individual communications as the usage conditions by drawing first arcs from the node of each individual communicating unit to the node of the corresponding one of the transmitting sources,
each first arc is displayed as an arrow,
the usage conditions collecting unit calculates usage frequencies at which the information is used outside the mailing list, to display the usage frequencies using display attributes of the first arcs, and
the mailing list is a particular network having a boundary that is specified at a predetermined point of time;
wherein the usage condition collection unit acquires usage condition information related to communications transmitted by the transmitting sources outside of the mailing list, and acquires usage condition information related to communications transmitted by sources other than the transmitting sources outside of the mailing list;
wherein the usage frequencies comprise a frequency of keywords contained in information transmitted outside of the mailing list.

2. The apparatus according to claim 1,
wherein the mailing list distributes the information inside of an organization assumed of voluntary participation in a human organization.

3. The apparatus according to claim 1, wherein the mailing list distributes the information inside of an organization which is not prescribed in an organizational chart defining contents of a human organization.

4. The apparatus according to claim 1,
wherein the mailing list to be evaluated browses posted information.

5. The apparatus according to claim 4,
wherein the mailing list includes an electronic bulletin board system.

6. The apparatus according to claim 1,
wherein the usage condition displaying unit classifies into the usage conditions to respectively display (d) an individual communication outside of the mailing list to be evaluated, to a transmitting source that transmits the information using the mailing list, (e) a transmission of corresponding information outside of the mailing list to be evaluated, to the destination other than the transmitting source that transmits the corresponding information via the mailing list, and (f) a utilization of the information by a destination which receives the information via the mailing list.

7. The apparatus according to claim 1,
wherein the usage condition displaying unit respectively expresses as nodes the mailing list to be evaluated, a transmitting source that transmits corresponding information outside the mailing list to a destination other than the transmitting source, and the destination; and
the usage condition displaying unit displays the transmission of the corresponding information to the destination outside the mailing list to be evaluated, by drawing a second arc from a node of the transmitting source of the corresponding information to a node of the destination of the corresponding information.

8. The apparatus according to claim 7,
wherein the second arc is displayed as an arrow.

9. The apparatus according to claim 7,
wherein the usage conditions collecting unit calculates usage frequencies to display the usage frequencies using display attributes of the corresponding second arc.

10. The apparatus according to claim 7,
wherein the usage condition displaying unit expresses the mailing list to be evaluated and the destination of the information which receives and utilizes the information via the mailing list as nodes so as to display the usage conditions at the destination with a third arc drawn from the destination returning thereto.

11. The apparatus according to claim 10,
wherein the third arc is displayed as an arrow.

12. The apparatus according to claim 10,
wherein the usage conditions collecting unit calculates usage frequencies to display the usage frequencies using display attributes of the corresponding third arc.

13. The apparatus according to claim 10,
wherein the information distribution inside of the mailing list includes an information transmission to the mailing list from the transmitting source and an information collection from the mailing list by a destination;
the mailing list, the transmitting source, and the destination is expressed as nodes;
the information distribution is expressed as a fourth arc drawn from a node of the transmitting source to a node of the mailing list; and
the information collection is expressed as a fifth arc drawn from a node of the mailing list to a node of the destination.

14. The apparatus according to claim 1,
wherein the usage condition collecting unit includes an information transmission detecting unit that detects a transmission of corresponding information outside the mailing list to be evaluated, the mailing list transmitting the information that corresponds to the corresponding information; and
the usage condition collecting unit acquires the usage condition information with respect to (d) an individual communication outside of the mailing list to be evaluated, to a transmitting source that transmits the information using the mailing list, and (e) a transmission of corresponding information outside of the mailing list to be evaluated, to a destination other than the transmitting source that transmits the corresponding information via the mailing list.

15. The apparatus according to claim 14,
wherein the information transmission detecting unit discriminates a correlation of the information transmitted via the mailing list to be evaluated based on a keyword representing the information.

16. The apparatus according to claim 15,
wherein the keyword is selected from at least one of words and concepts included in the information transmitted using the mailing list to be evaluated.

17. The apparatus according to claim 15,
wherein an influence degree of the mailing list to be evaluated in outside thereof is determined based on a frequency of the use of the keywords included in information transmitted outside of the mailing list.

18. The apparatus according to claim 17,
wherein usage condition collecting unit that acquires the usage condition information based on response information of an electronic questionnaire concerning the usage condition of the information transmitted using the mailing list to be evaluated; and
the usage condition information relates to (d) an individual communication outside of the mailing list to be evaluated, to a transmitting source that transmits the information using the mailing list, (e) a transmission of corresponding information outside of the mailing list to be evaluated, to the destination other than the transmitting source that transmits the corresponding information via the mailing list, and (f) a utilization of the information by a destination which receives the information via the mailing list.

19. The apparatus according to claim 1, wherein
the usage condition displaying unit displays as the usage condition at least one of (d) an individual communication outside of the mailing list to be evaluated, to a transmitting source that transmits the information using the mailing list, (e) a transmission of corresponding information outside of the mailing list to be evaluated, to a destination other than the transmitting source that transmits the information corresponding to the corresponding information via the mailing list, and (f) a utilization of the information by a destination which receives the information via the mailing list.

20. The apparatus according to claim 1,
wherein the usage condition displaying unit displays an organization representation for describing contents of the human organization correlated with the usage condition.

21. The apparatus according to claim 20,
wherein the organization representation includes at least one of an information flow chart, a process chart, an organizational chart, a location chart, and a matrix organizational chart, to describe the contents of human organization.

22. The apparatus according to claim 20,
wherein the mailing list includes an organization assumed of voluntary participation in the human organization.

23. The apparatus according to claim 1,
wherein the mailing list includes a plurality of mailing lists.

24. The apparatus according to claim 1,
wherein a transmitting source and a destination of the information represent at least one of a user and a user group.

25. The apparatus according to claim 1,
wherein the transmitting source and the transmitting destination of the information are represented by organization names.

26. The apparatus according to claim 1,
wherein the transmitting source and the transmitting destination of the information are displayed by occupation names.

27. A method for analyzing and displaying a usage condition that corresponds to a piece of information which was transmitted within a mailing list to be evaluated, and indicates how the piece of information is used outside of the mailing list, the method comprising:
acquiring, by a processor, a usage condition information as to the usage condition of the information outside of the mailing list to be evaluated; and
displaying the usage conditions based on the usage condition information, wherein (a) the mailing list to be evaluated, (b) transmitting sources that transmit the information within the mailing list to be evaluated, and (c) individual communicating units that each receive the information via the mailing list and individually communicate with a corresponding one of the transmitting sources, are expressed as nodes;

displaying the individual communications as the usage conditions by drawing first arcs from the node of each individual communicating unit to the node of the corresponding one of the transmitting sources, wherein each first arc is displayed as an arrow;

calculating usage frequencies at which the information is used outside the mailing list, to display the usage frequencies using display attributes of the first arcs, wherein the usage frequencies comprise a frequency of keywords contained in information transmitted outside of the mailing list, wherein the mailing list is a particular network having a boundary that is specified at a predetermined point of time; and wherein the acquiring comprises acquiring usage condition information related to communications transmitted by the transmitting sources outside of the mailing list, and acquires usage condition information related to communications transmitted by sources other than the transmitting sources outside of the mailing list.

28. A tangible computer readable storage medium storing a computer executable program for causing a computer to analyze and display a usage condition that corresponds to a piece of information which was transmitted within a mailing list to be evaluated, and indicates how the piece of information is used outside of the mailing list, said program comprising the steps of:

acquiring a usage condition information as to the usage condition of the information outside of the mailing list to be evaluated; and displaying the usage conditions based on the usage condition information, wherein (a) the mailing list to be evaluated, (b) transmitting sources that transmit the information within the mailing list to be evaluated, and (c) individual communicating units that each receive the information via the mailing list and individually communicate with a corresponding one of the transmitting sources, are expressed as nodes;

displaying the individual communications as the usage conditions by drawing first arcs from the node of each individual communicating unit to the node of the corresponding one of the transmitting sources, wherein each first arc is displayed as an arrow;

calculating usage frequencies at which the information is used outside the mailing list, to display the usage frequencies using display attributes of the first arcs, wherein the usage frequencies comprise a frequency of keywords contained in information transmitted outside of the mailing list, wherein the mailing list is a particular network having a boundary that is specified at a predetermined point of time;

wherein the acquiring comprises acquiring usage condition information related to communications transmitted by the transmitting sources outside of the mailing list, and acquires usage condition information related to communications transmitted by sources other than the transmitting sources outside of the mailing list.

29. The apparatus according to claim 1, wherein an extent of the boundary is specified by a header, a title or a mail account of the information within the mailing list.

\* \* \* \* \*